Figure 2A:
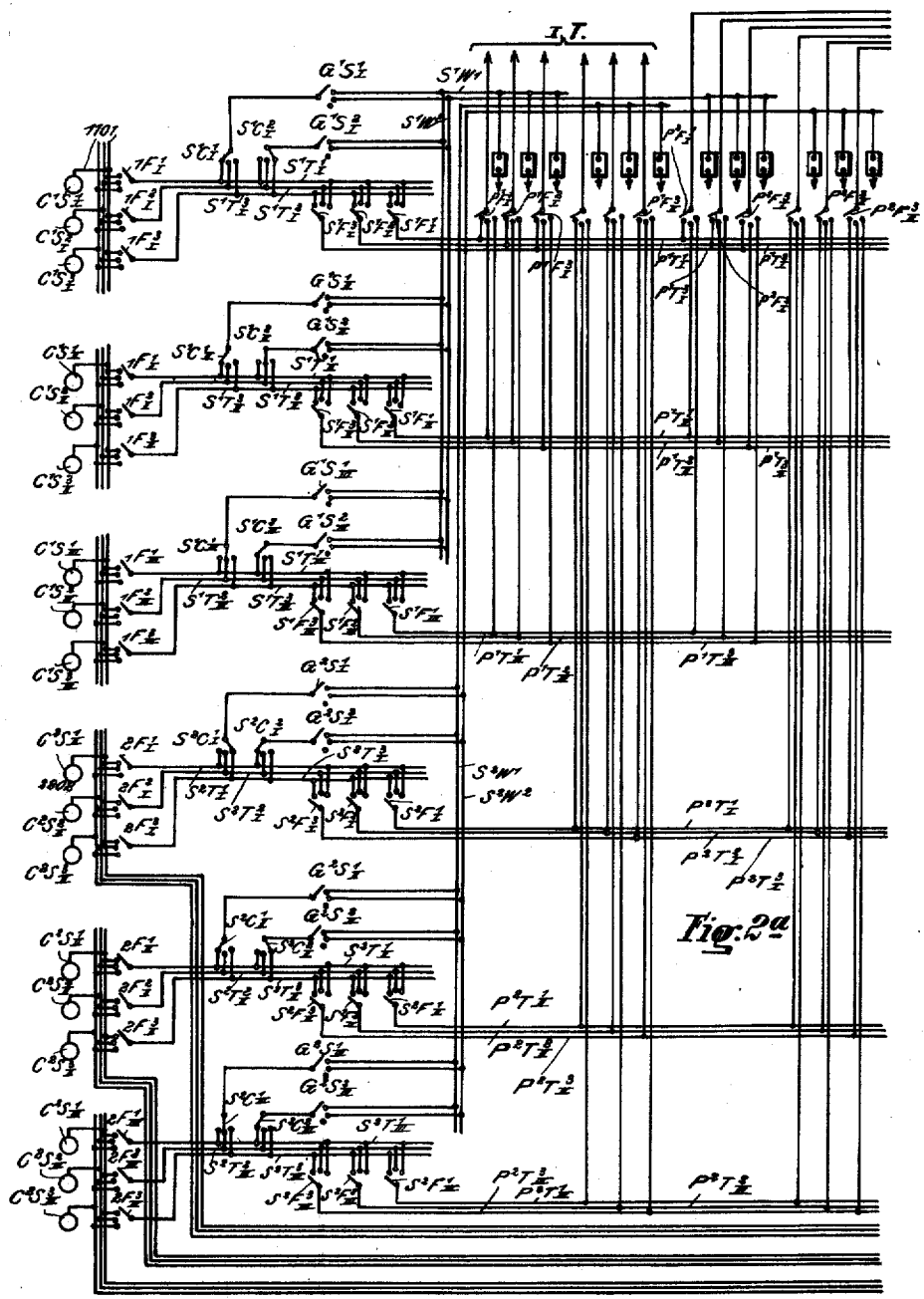

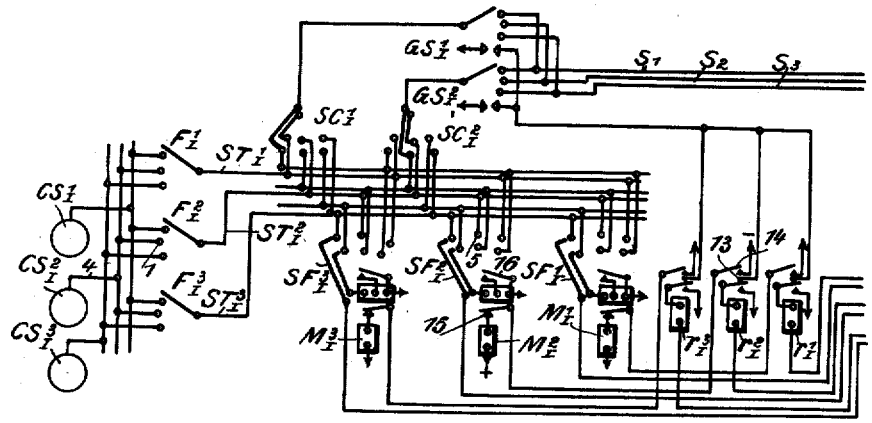
Fig. 1a
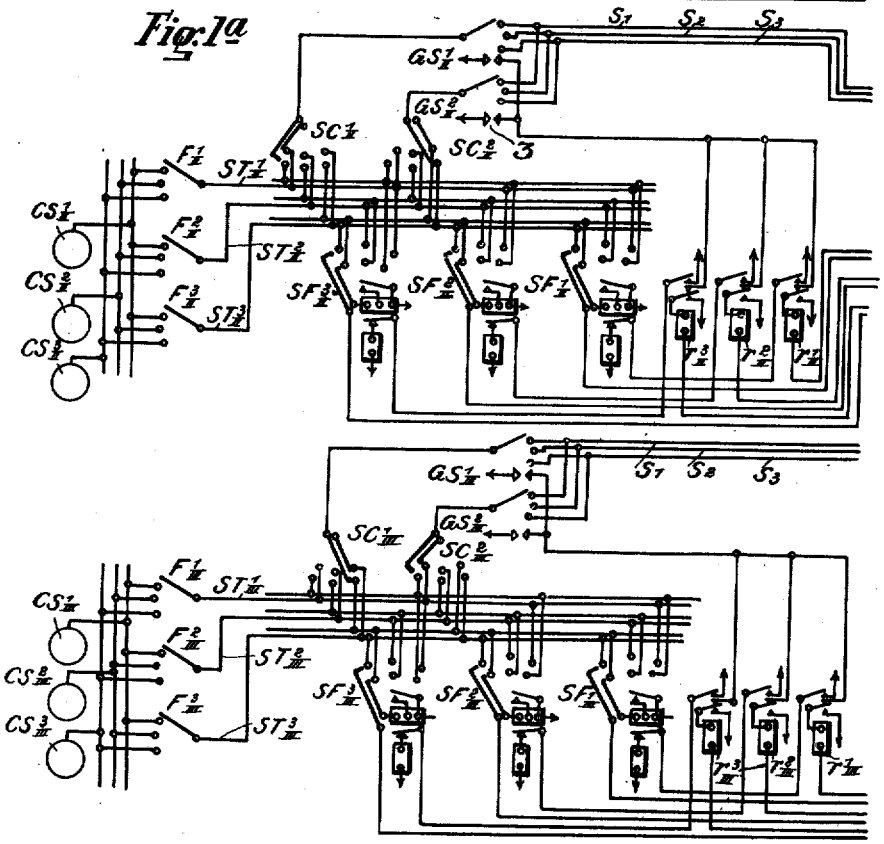

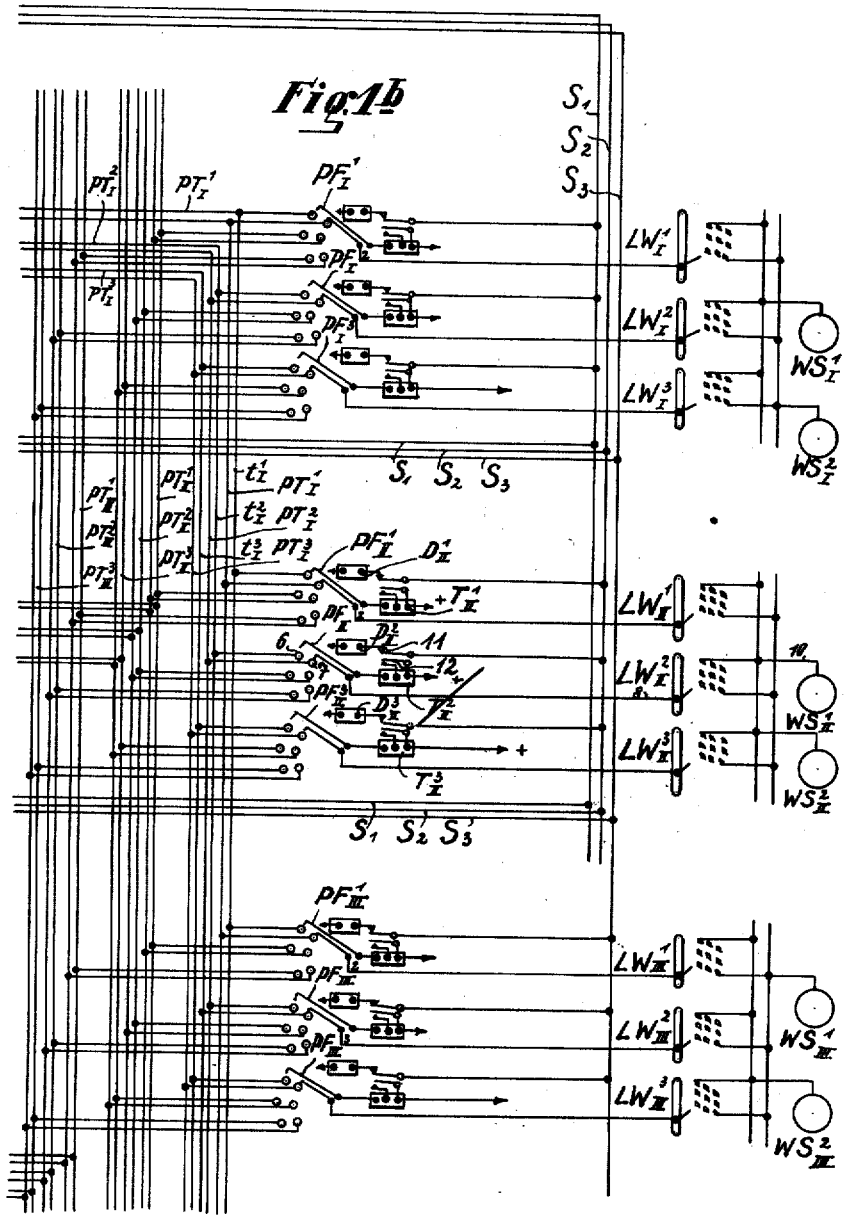

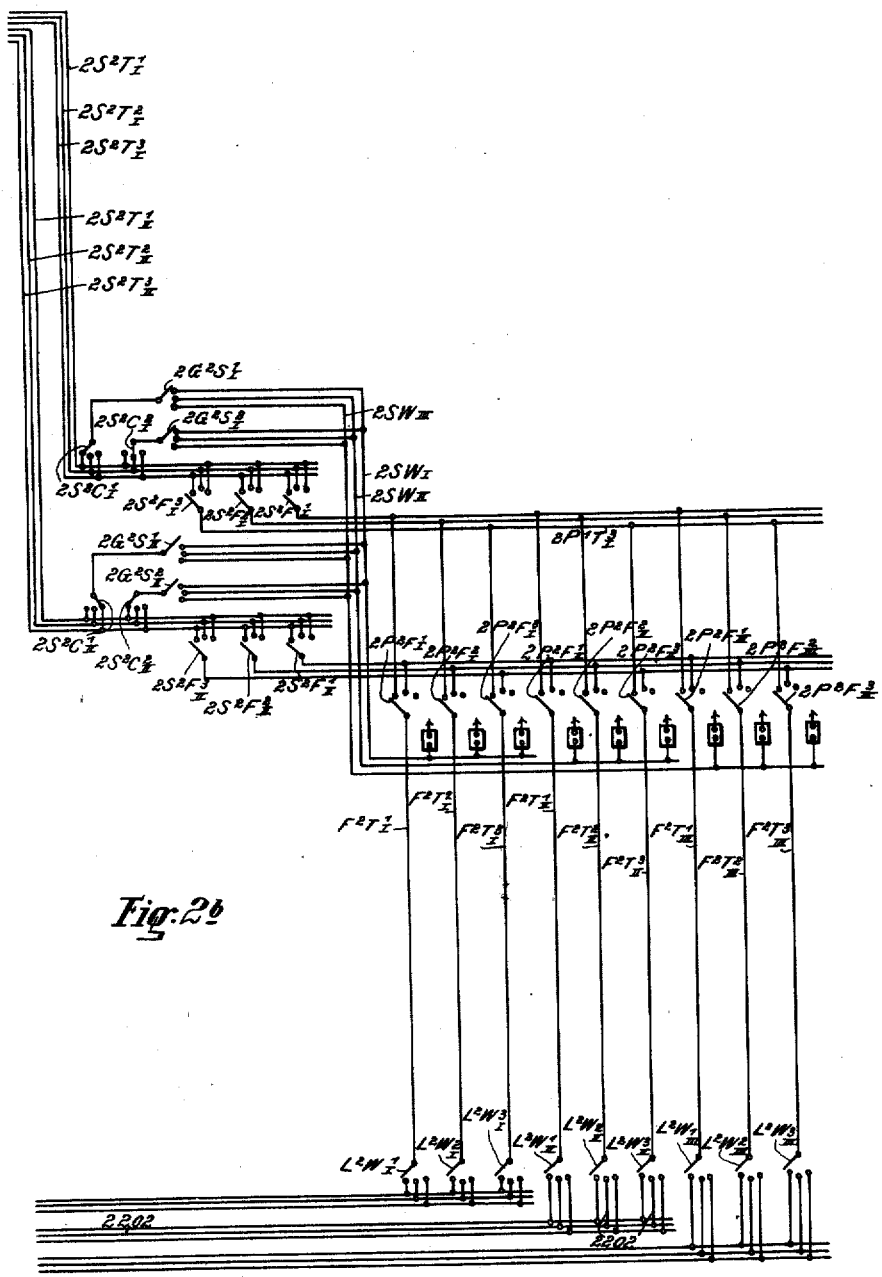

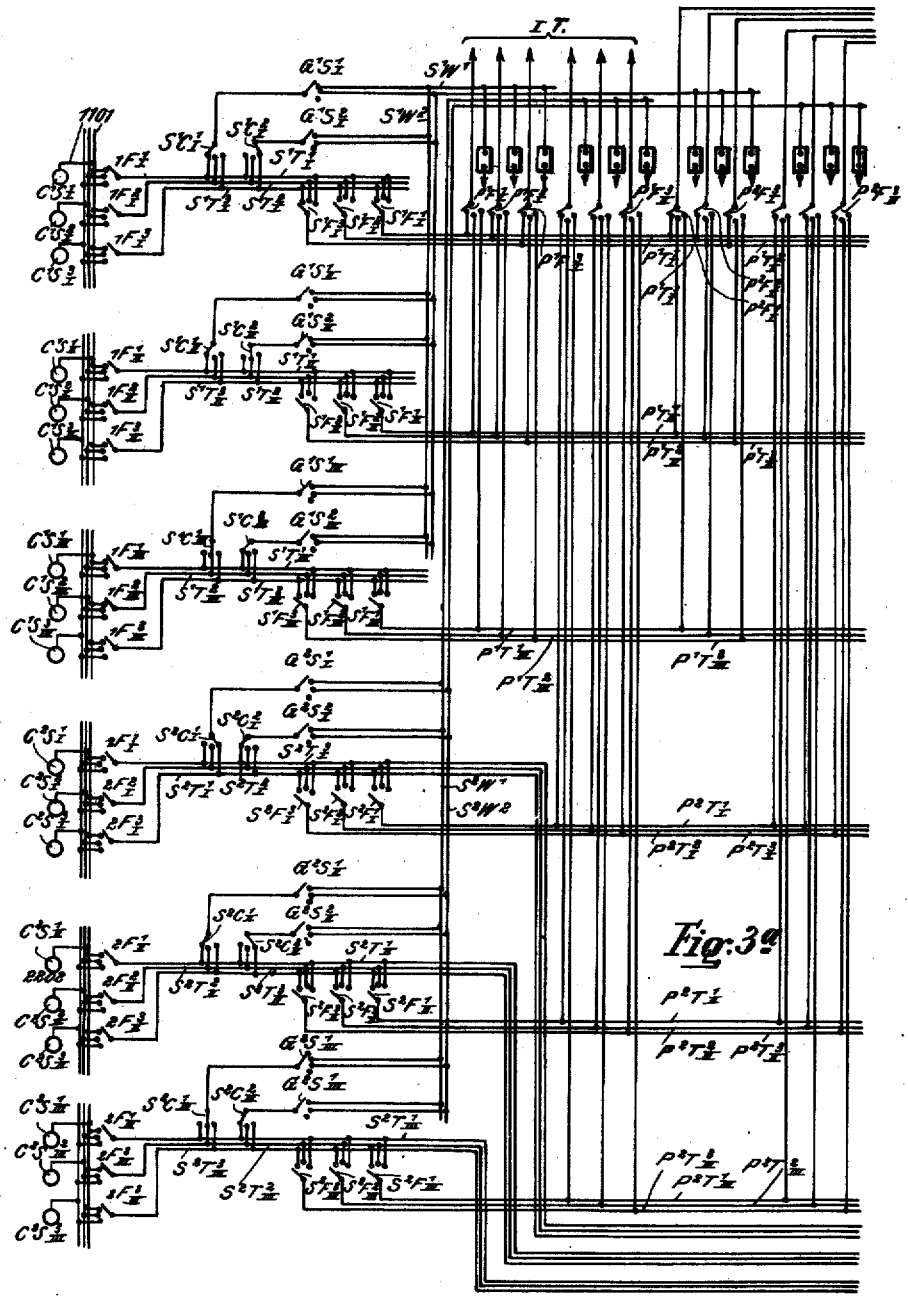

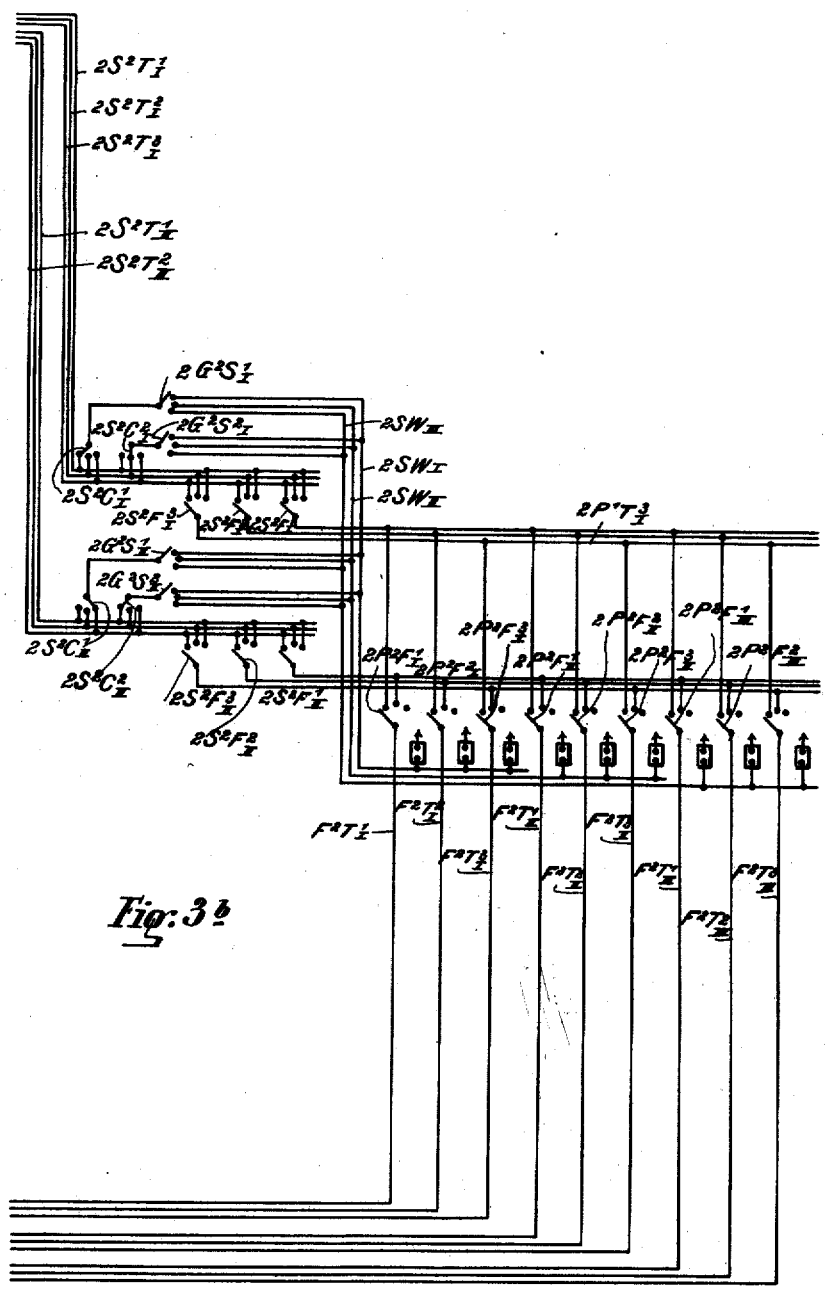

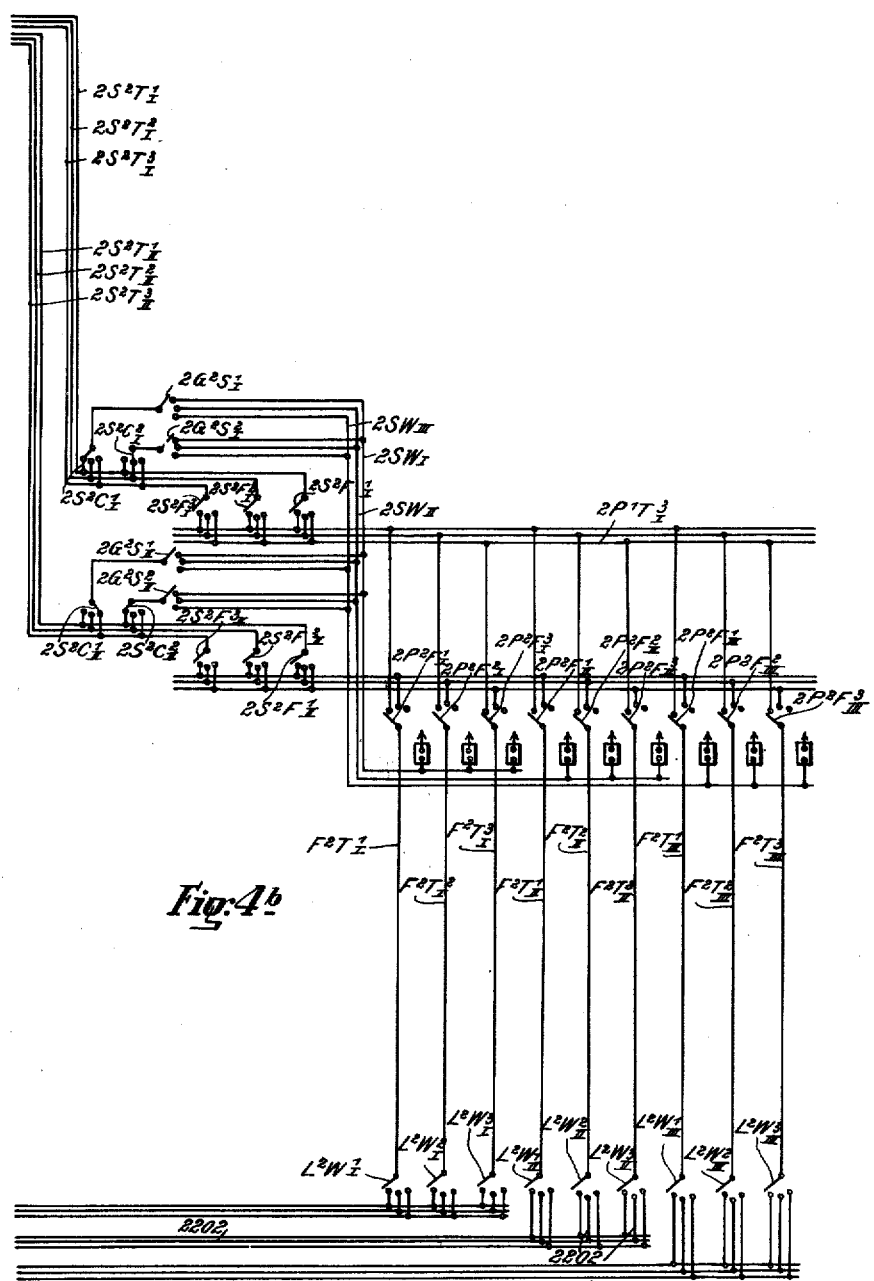

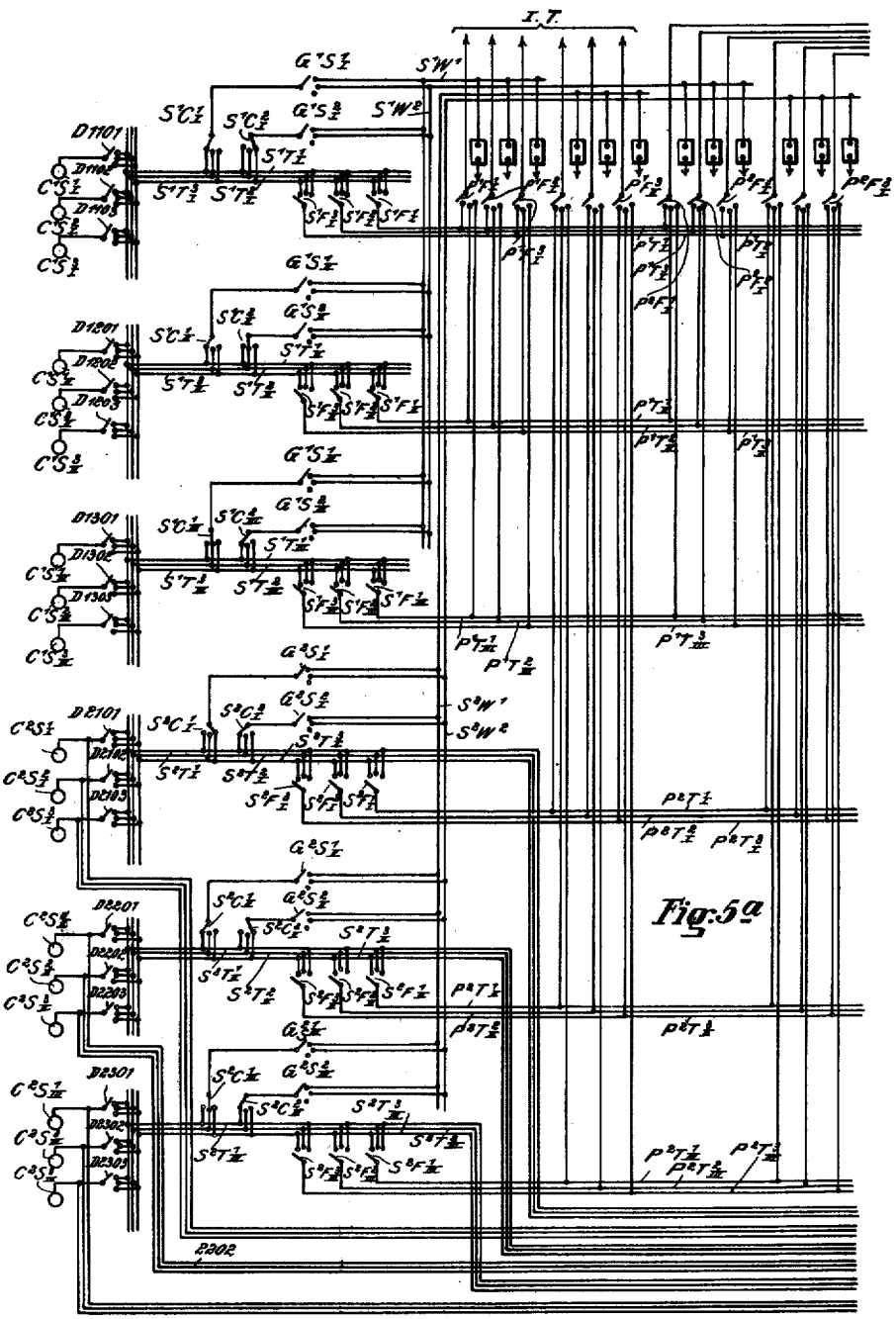

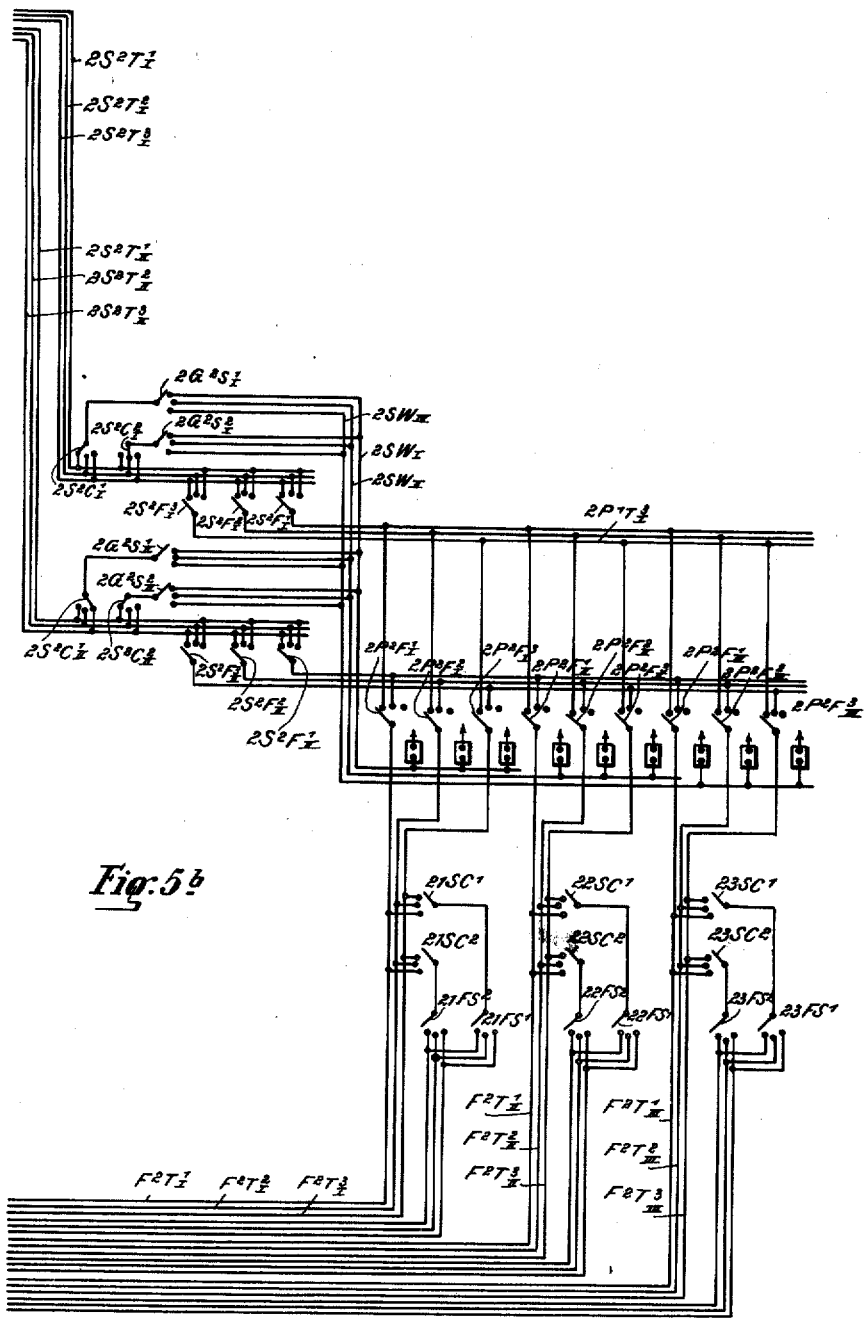

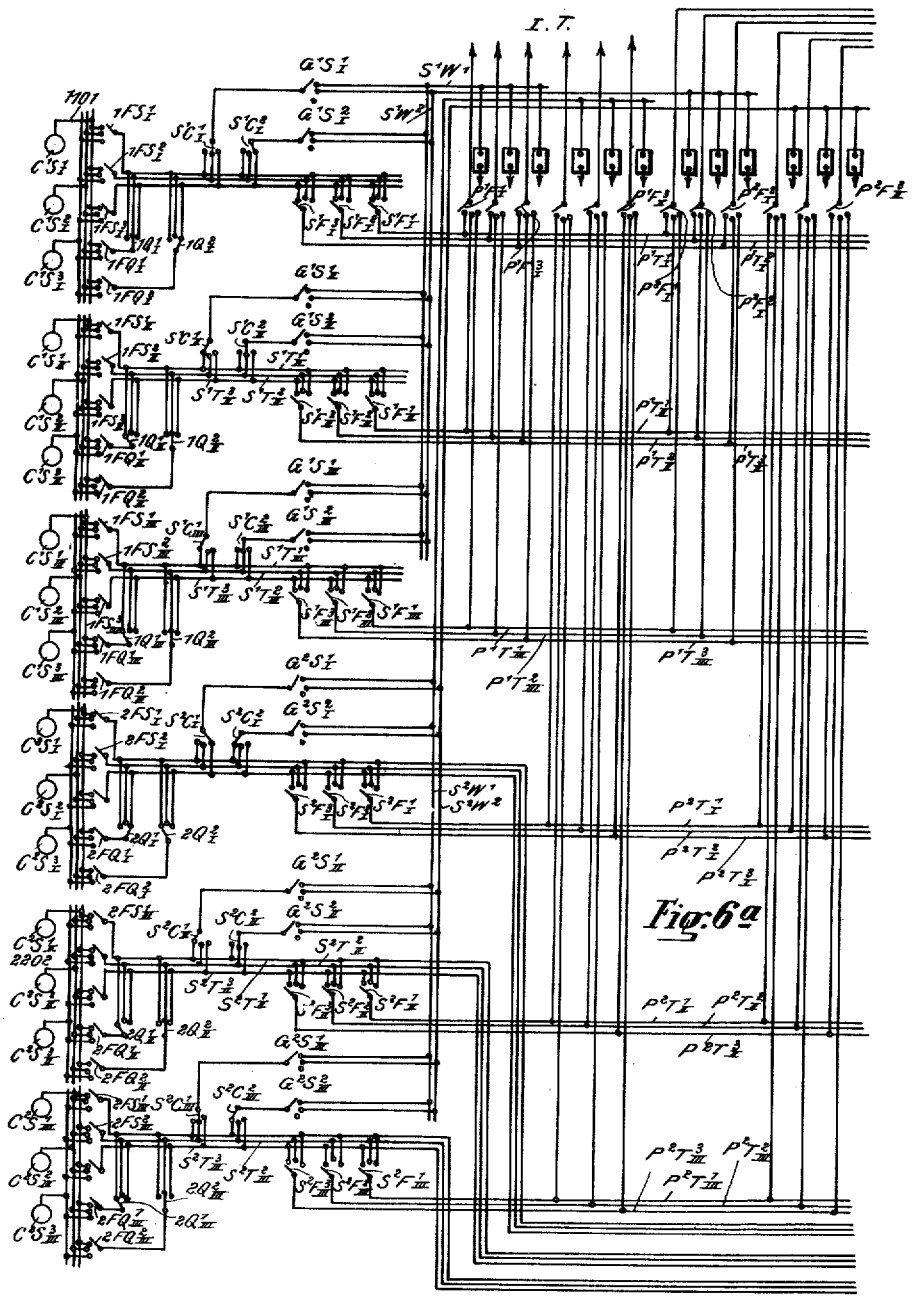

F. ALDENDORFF.
INTERCONNECTING LINES BY ELECTROMECHANICALLY CONTROLLED SWITCHES.
APPLICATION FILED SEPT. 4, 1914.

1,321,795.

Patented Nov. 11, 1919.
29 SHEETS—SHEET 13.

F. ALDENDORFF.
INTERCONNECTING LINES BY ELECTROMECHANICALLY CONTROLLED SWITCHES.
APPLICATION FILED SEPT. 4, 1914.

1,321,795.

Patented Nov. 11, 1919.

29 SHEETS—SHEET 16.

Fig. 10.

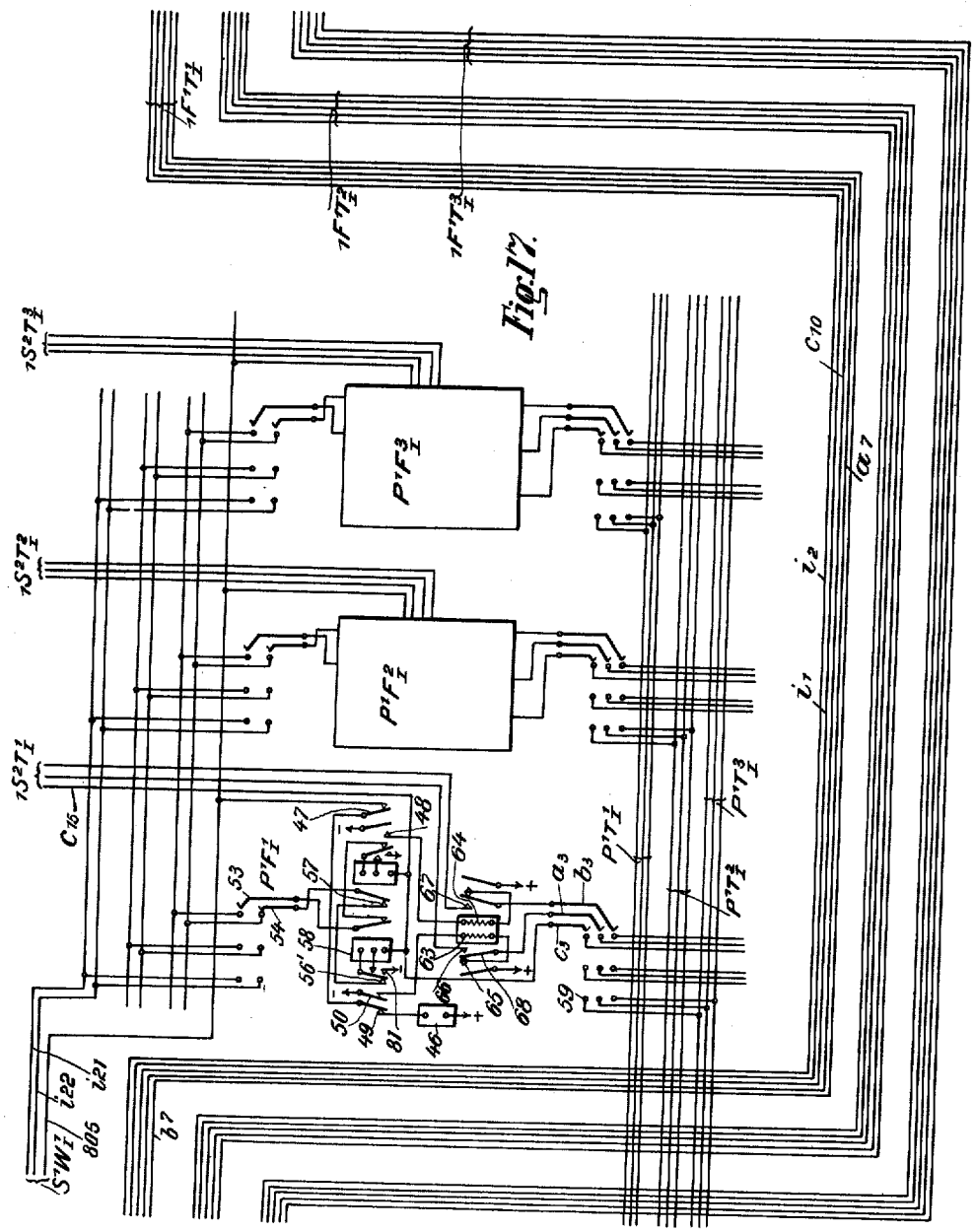

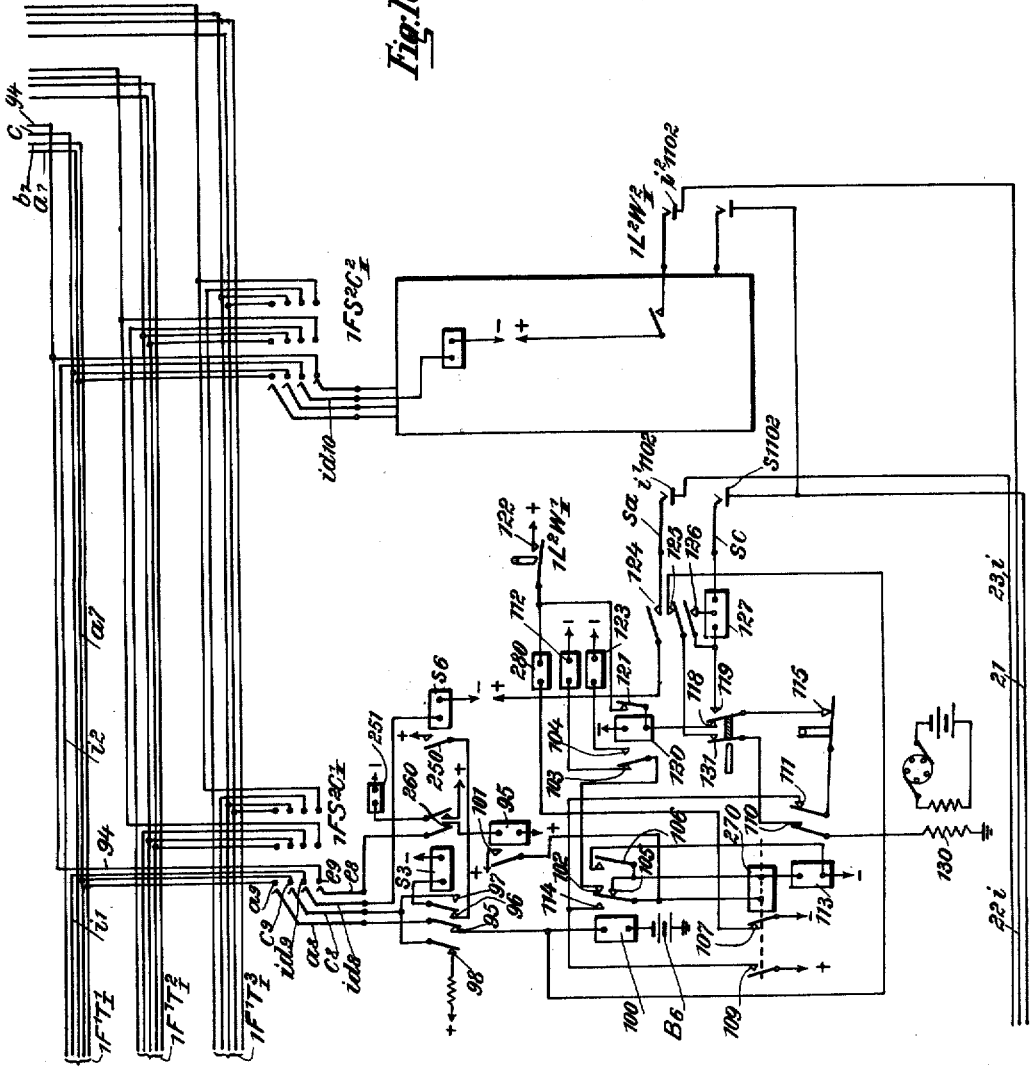

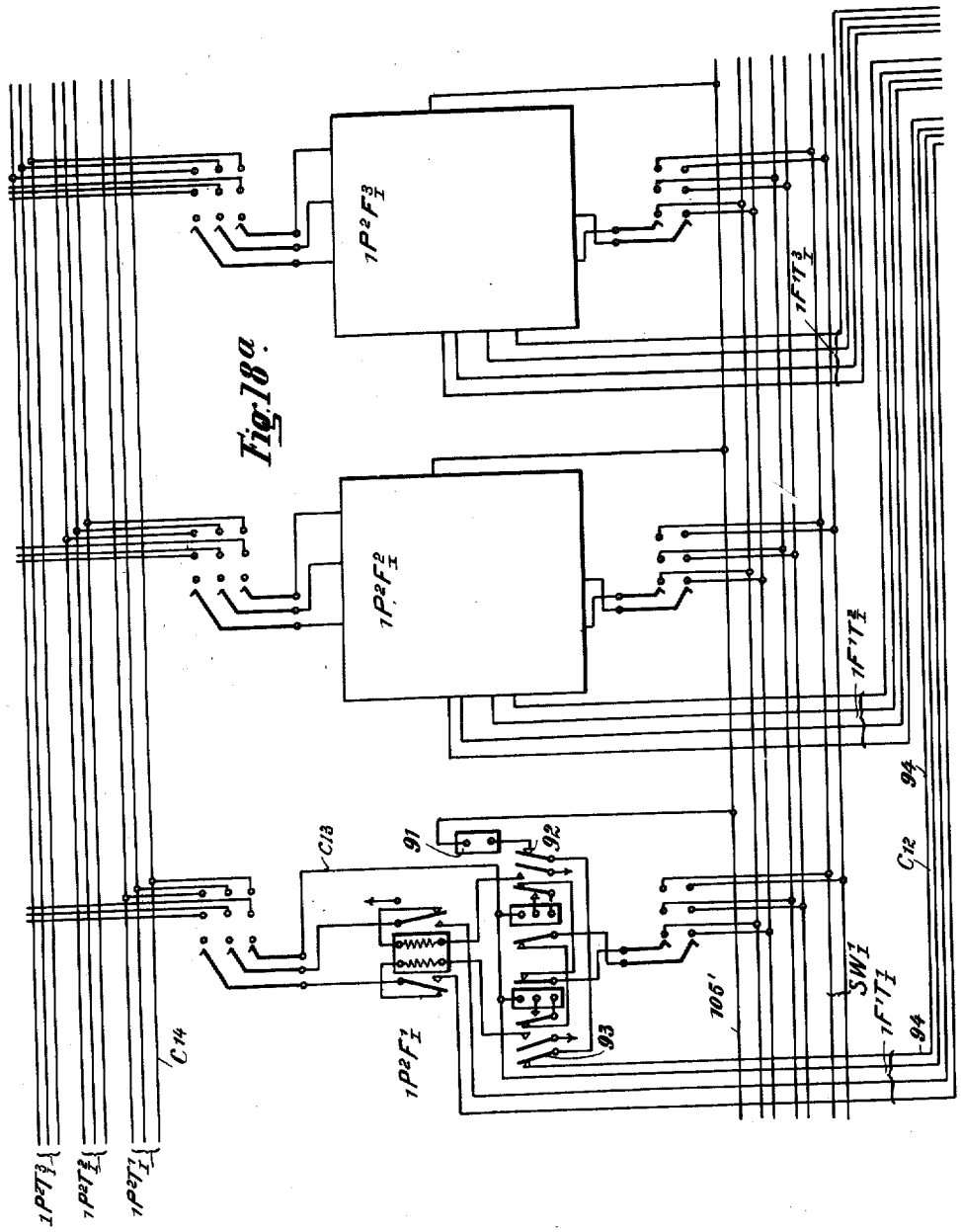

F. ALDENDORFF.
INTERCONNECTING LINES BY ELECTROMECHANICALLY CONTROLLED SWITCHES.
APPLICATION FILED SEPT. 4, 1914.
1,321,795.
Patented Nov. 11, 1919.
29 SHEETS—SHEET 26.
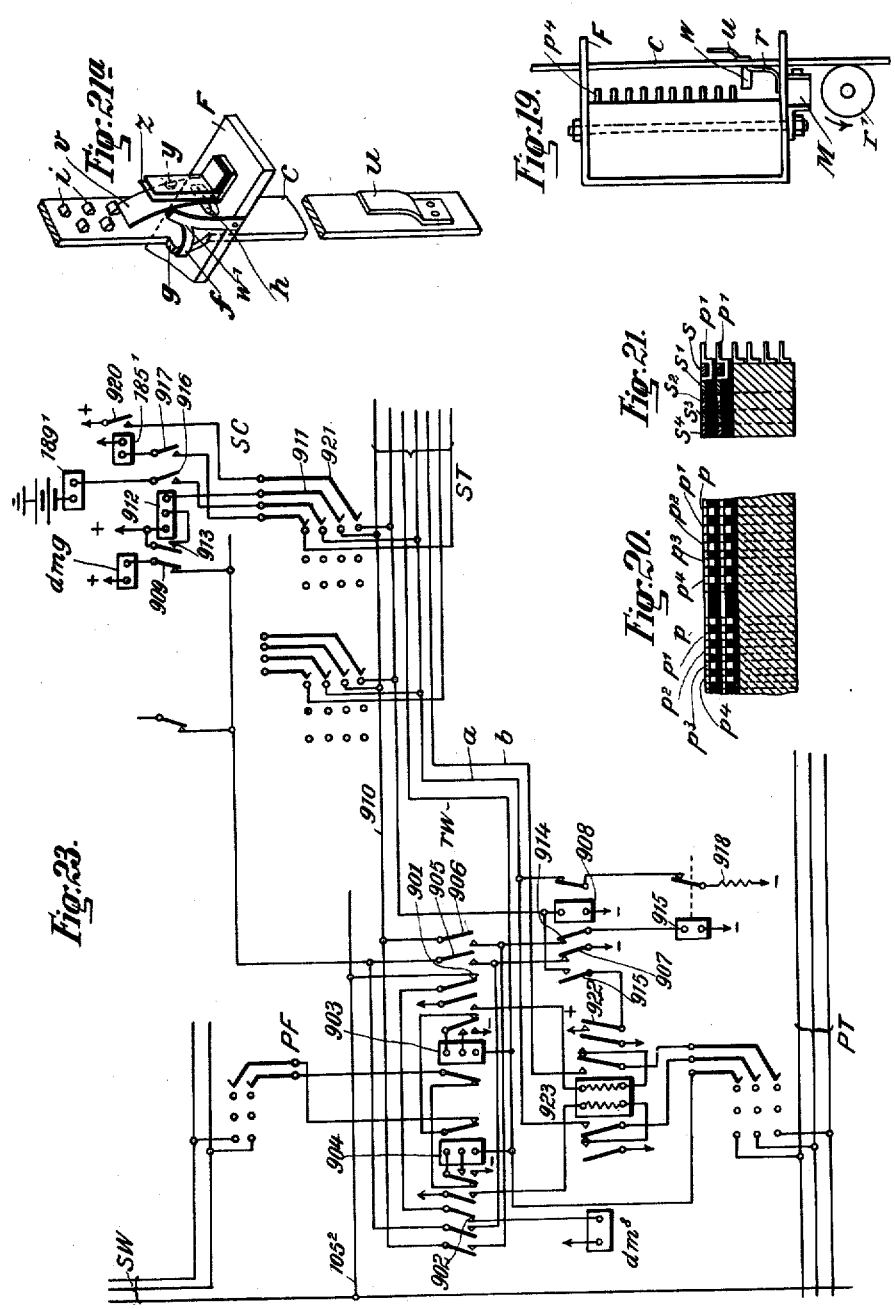

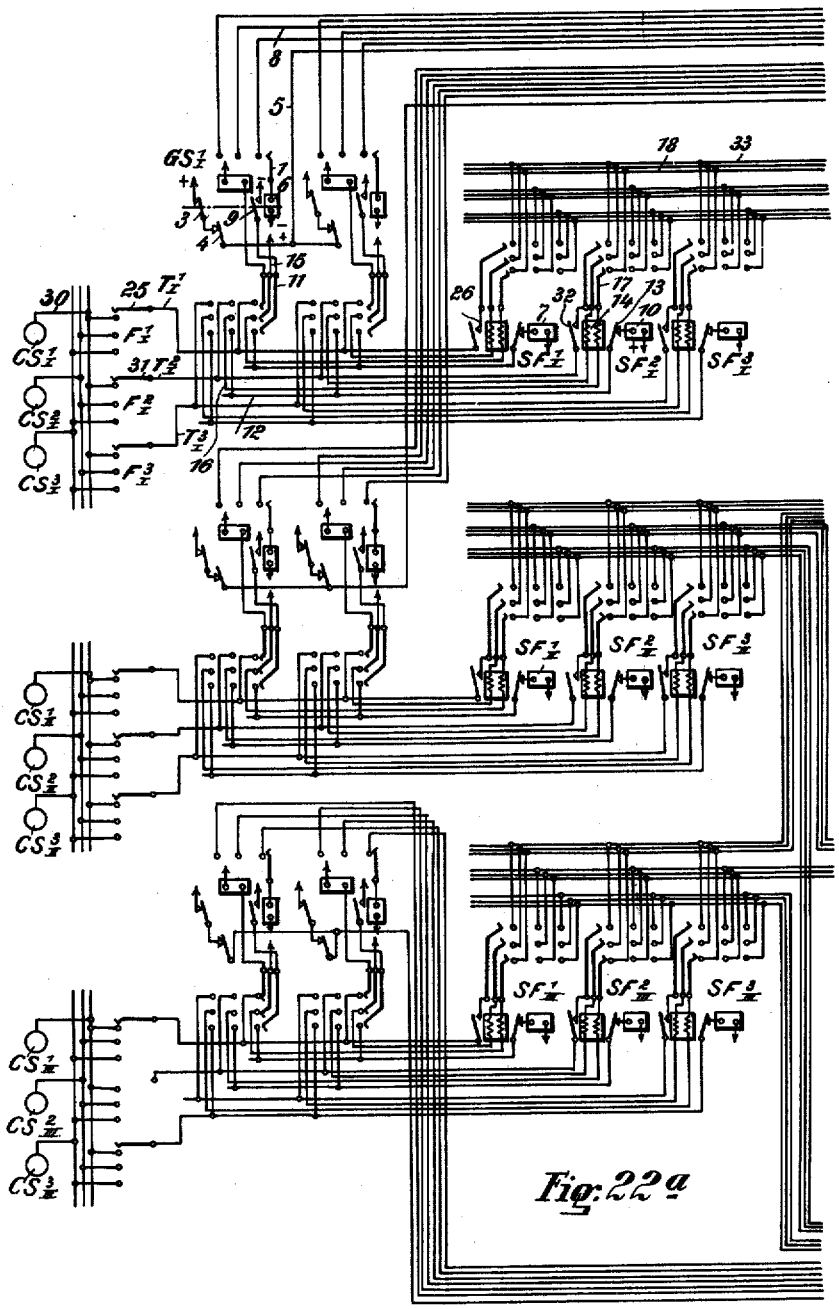

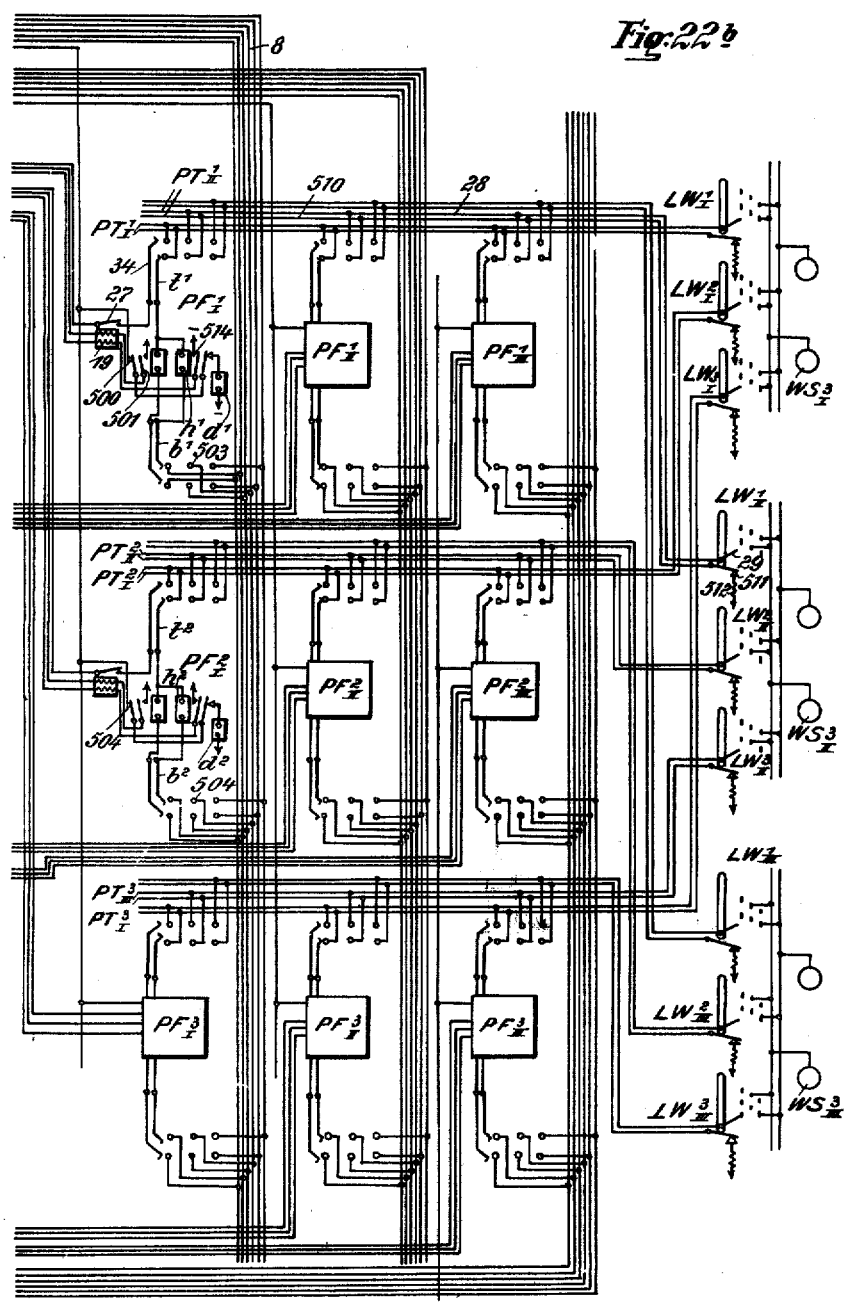

F. ALDENDORFF.
INTERCONNECTING LINES BY ELECTROMECHANICALLY CONTROLLED SWITCHES.
APPLICATION FILED SEPT. 4, 1914.

1,321,795.

Patented Nov. 11, 1919.
29 SHEETS—SHEET 29.

UNITED STATES PATENT OFFICE.

FRITZ ALDENDORFF, OF WILMERSDORF, BERLIN, GERMANY.

INTERCONNECTING LINES BY ELECTROMECHANICALLY-CONTROLLED SWITCHES.

1,321,795.     Specification of Letters Patent.     Patented Nov. 11, 1919.

Application filed September 4, 1914. Serial No. 860,298.

*To all whom it may concern:*

Be it known that I, FRITZ ALDENDORFF, residing at 32 Mannheimerstrasse, Wilmersdorf, Berlin, Germany, have invented new and useful Interconnecting Lines by Electromechanically-Controlled Switches, of which the following is a specification.

This invention relates in general to machine switching telephone systems or to telephone systems in which the connections are established by means of electromechanically controlled switches. An object of the invention is to provide an improved method of group selecting by which smaller switches than have been hitherto employed are used for selecting a wanted group of subscribers and for extending a calling line to an idle selecting switch or trunk in that group. Another object of the invention is to build up electromechanically controlled telephone exchanges principally or entirely of switches whose movable parts or brushes do not execute a plurality of coördinate motions, as for example the well known switches with upward and rotary motions, but which move always along one and the same straight line or around one and the same circular path. This second object has already been attained in a known system, but the present invention provides means for saving a very considerable number of the switches used in the known system.

Another object of the invention is to provide an improved method of establishing connections by switches which extend the connections from the calling line to a further line or trunk or to a wanted group of lines and which revert to common use as soon as their selecting functions or connection-extending functions have been performed, the established connection being maintained by other switches, which may be called connection-maintaining switches, until the end of the conversation or connection. The switches which revert to common use immediately they have caused the connection or connections to be extended or completed to a certain point may be called transitorily-engaged switches. These transitorily-engaged switches may take the form of group selectors, final selectors, two-way switches which act both as line-finders and as final selectors, or of the quick-acting line finders described in the following specification. They may also assume other forms and the claims are intended to cover all forms of transitorily-engaged switches in conjunction with which the identifying means explained in this specification is or are used.

The object first mentioned is attained by providing separate switches for the group selecting and trunk extending operations. A calling line is first connected to an idle trunk to which a group selector is connected. The group selector is then caused to select a group of primary trunk finders that give access to trunks in the wanted group. The primary trunk finders continue operating until a free trunk is found and then another trunk finder, a secondary trunk finder, starts operating and connects the idle trunk in the wanted group to the trunk upon which the calling subscriber is waiting. As the trunks upon which calling lines wait to be extended to an idle trunk in the wanted group are extended to the wanted groups by secondary trunk finders, they may be called for convenience, "secondary trunks". Each group of subscribers is provided with a set of secondary finders that are capable of extending any secondary trunk to any one of a set of intermediate or "primary" trunks that lead to the fixed contacts of revertively acting primary finders in all of the divisions or groups of the next lower order which may be reached by the particular group of switches from which the call or connection is extended.

The fixed contacts of the revertively acting primary finders in a wanted group are connected to a set of primary trunks of which each one leads to a different calling group. Thus if the primary trunk leading from a certain primary trunk finder to a certain calling group is engaged this primary trunk finder will not be available for a connection with that calling group. The other primary trunk finders in the wanted group will have a fixed contact set connected to different trunks leading to the calling group, so if the trunk from the one primary finder to the calling group is engaged the connection will be established by some other primary finder whose trunk that leads to the calling group, is not engaged.

Each finder of each set of primary trunk finders has as many contact points or contact sets as there are calling groups and it has already been said that each contact set leads to a different calling group. Therefore when a set of primary finders is set in motion these finders will travel over contacts leading to different calling groups. It will happen in a practical exchange that calls will be sent out from one and the same calling group to different wanted groups at practically the same time. Thus two different callers in the same calling group will be waiting together for their connection to be extended to different wanted groups. It will be evident that there will be a danger in a case like this of the one caller being extended to the group wanted by the other caller and vice versa unless some effectual means is provided for preventing such confusion. A means of this kind forms a feature of this invention.

Other features of this invention consist in modifications of the trunk finding method described above and in combining the improved method of group selecting and trunk finding with the systems described with reference to the accompanying drawings.

Figures 1ª and 1ᵇ show in a general way the layout of a system in which each connection between a calling and a called line requires the operation of the group selector and a final selector.

Figs. 2ª and 2ᵇ show the layout of a system in which two group selectors and a final selector are operated in establishing a connection between two lines. The system of Figs. 1ª and 1ᵇ would, for example, be suitable for an exchange for 1000 lines and Figs. 2ª and 2ᵇ show how by repetitions of the sets of group selecting and trunk finding switches the system may be extended for exchanges of practically any size.

In Figs. 3ª and 3ᵇ a system is outlined in which the new group selecting method is shown embodied in a system in which the connections proceeding from and toward the subscribers of each group are established through two-way switches that act both as subscribers' line finders, which extend a calling subscriber's line to a secondary trunk or to a first group selector and as final selectors which connect an extended calling line to a called line.

Figure 4A:
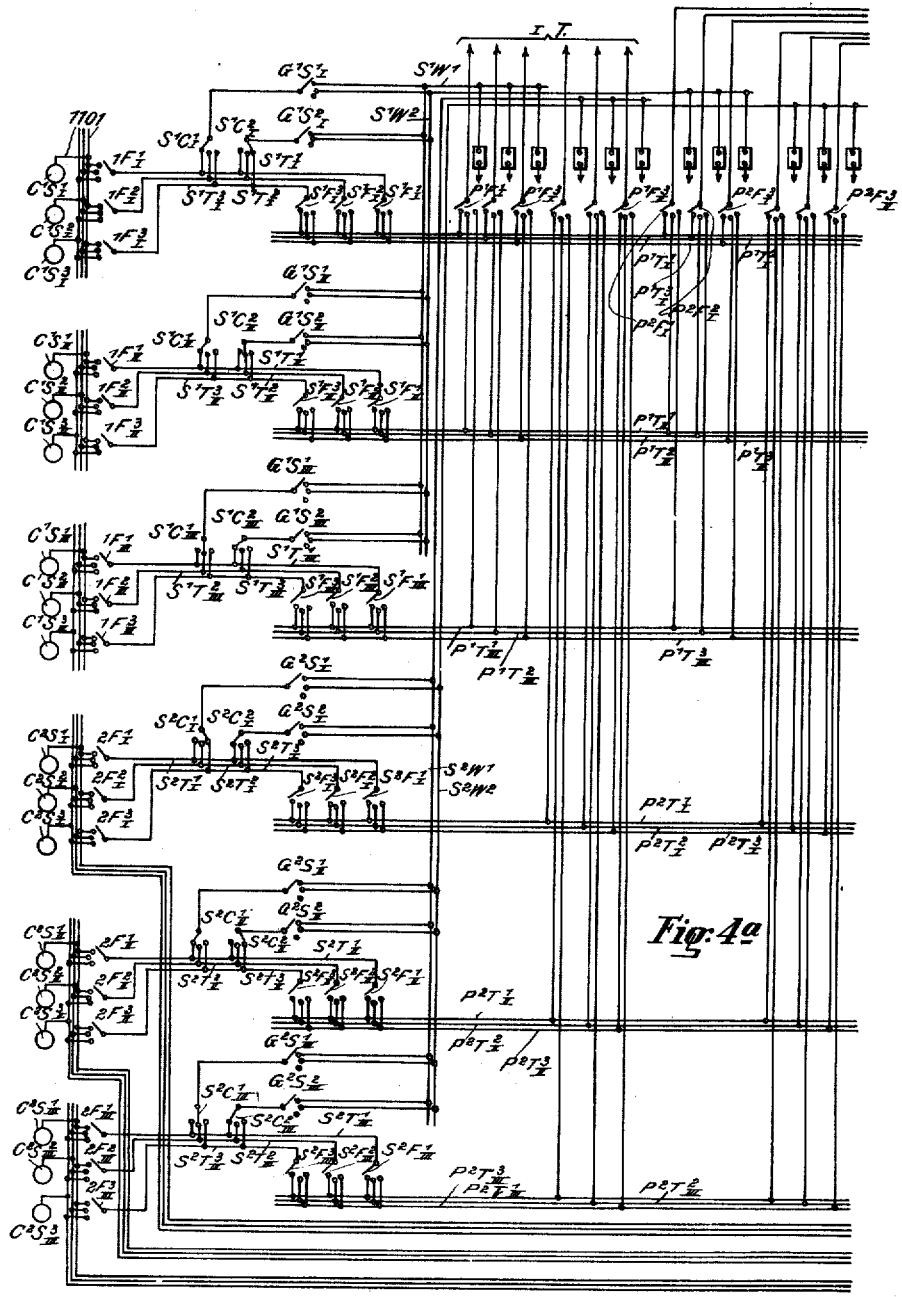

Figs. 4ª and 4ᵇ illustrate a system in which the secondary trunk finders are forwardly-acting finders instead of revertively-acting finders as shown in other figures of this specification.

Figs. 5ª and 5ᵇ show in outline a system in which both the first connecting functions consisting in connecting a calling subscriber's line to a secondary or compound trunk, and the last connecting function in a connection, consisting in connecting a calling line that has been extended to the wanted group to the wanted line, are performed by distributing switches associated with the subscribers' lines. In this system a final selector is not held in a connection during the conversation between the subscribers but is only seized and held by a calling subscriber, from the moment a trunk leading to the wanted group of subscribers is found, up to the moment when the wanted line in up that group has been selected and then connected by the distributing switch belonging to its line to said trunk. The transitorily-engaged final selector is then immediately released so as to revert to common use.

Figure 6B:
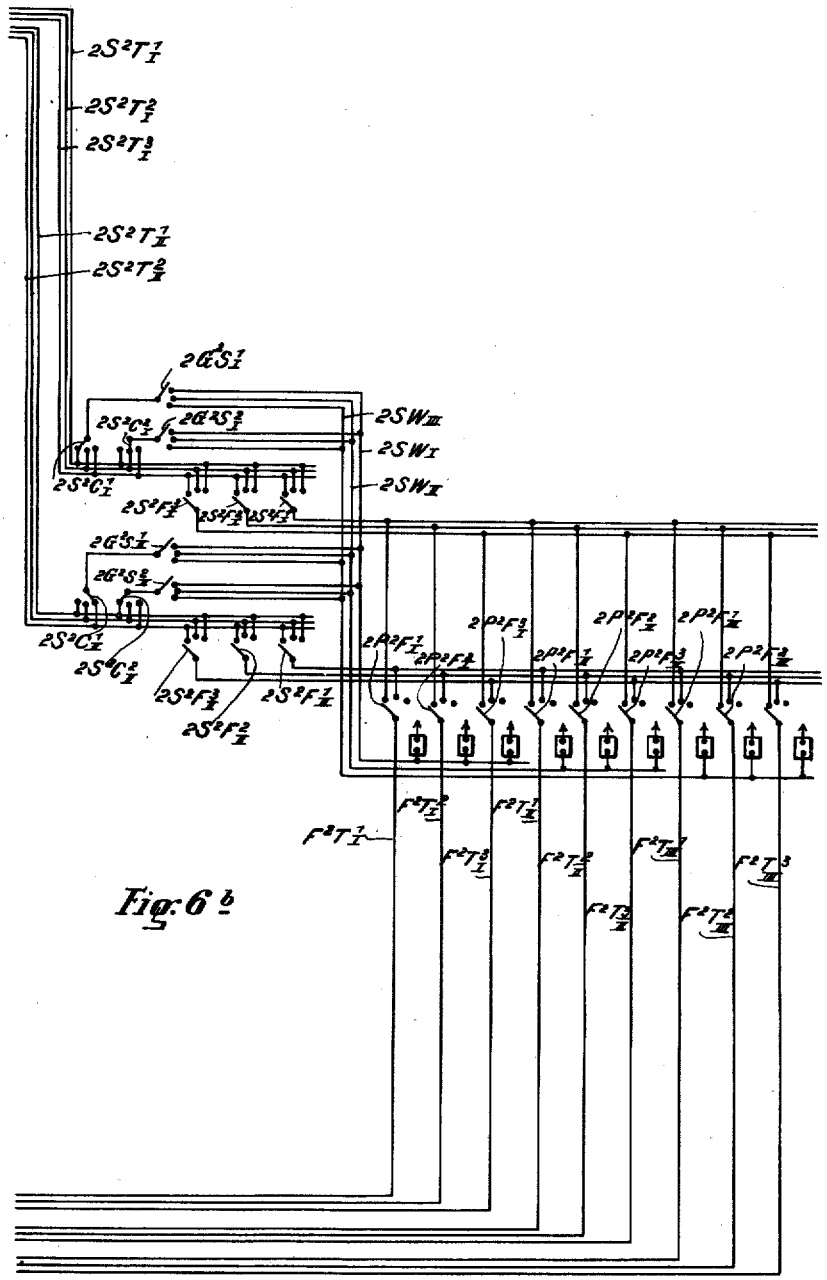

In Figs. 6ª and 6ᵇ a system is shown in which both the connections coming from and going toward a subscriber's line are established through two-way switches associated with the secondary trunks. In addition to the two way switches of each group a set of switches is provided which act as quick-acting finders in extending a connection from a calling line to a group selector and as final selectors in advancing a connection to a called line in the group.

Figure 7:
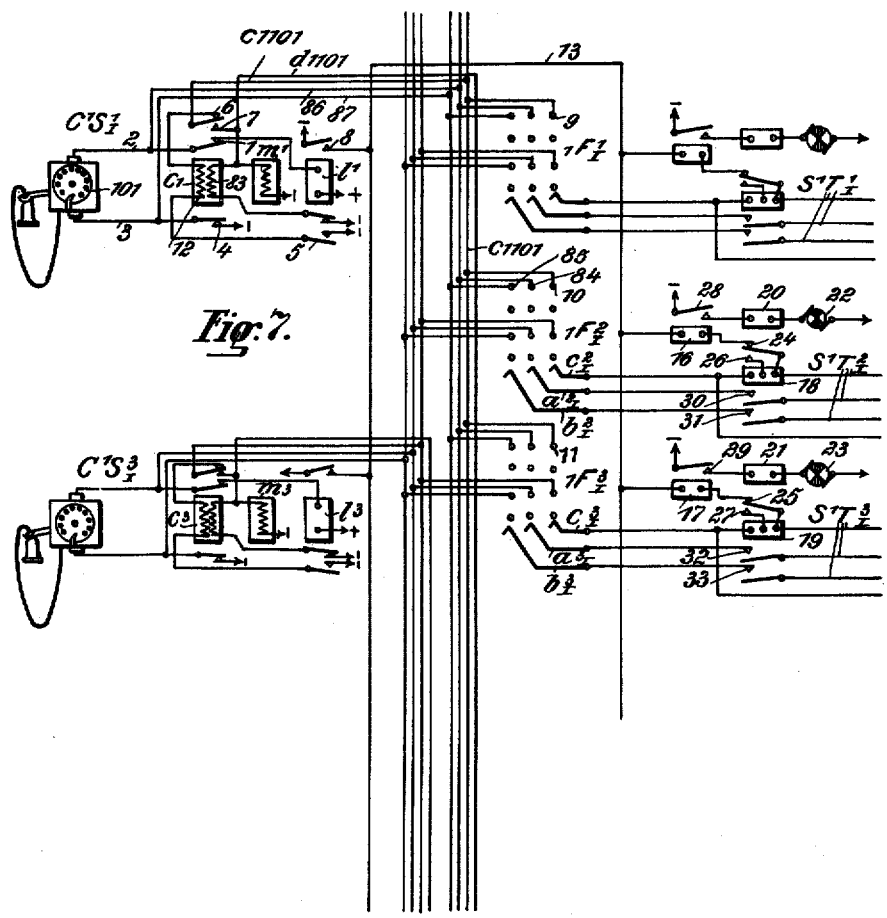

Fig. 7 shows the circuits of the line finders and subscribers' lines in systems of the kind outlined in Figs. 1ª, 1ᵇ, 2ª, 2ᵇ and 4ª, 4ᵇ.

Figure 8:
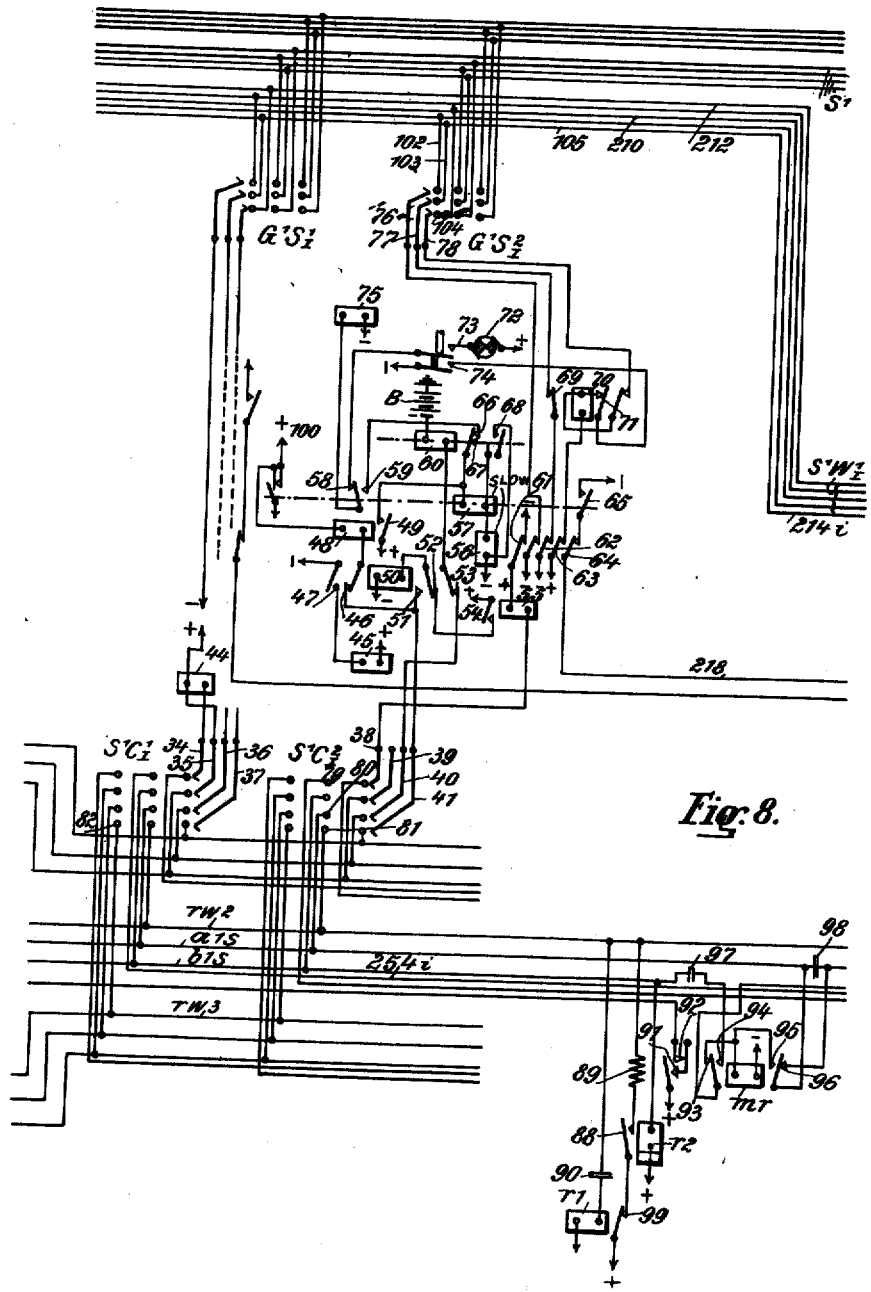
Figure 9:
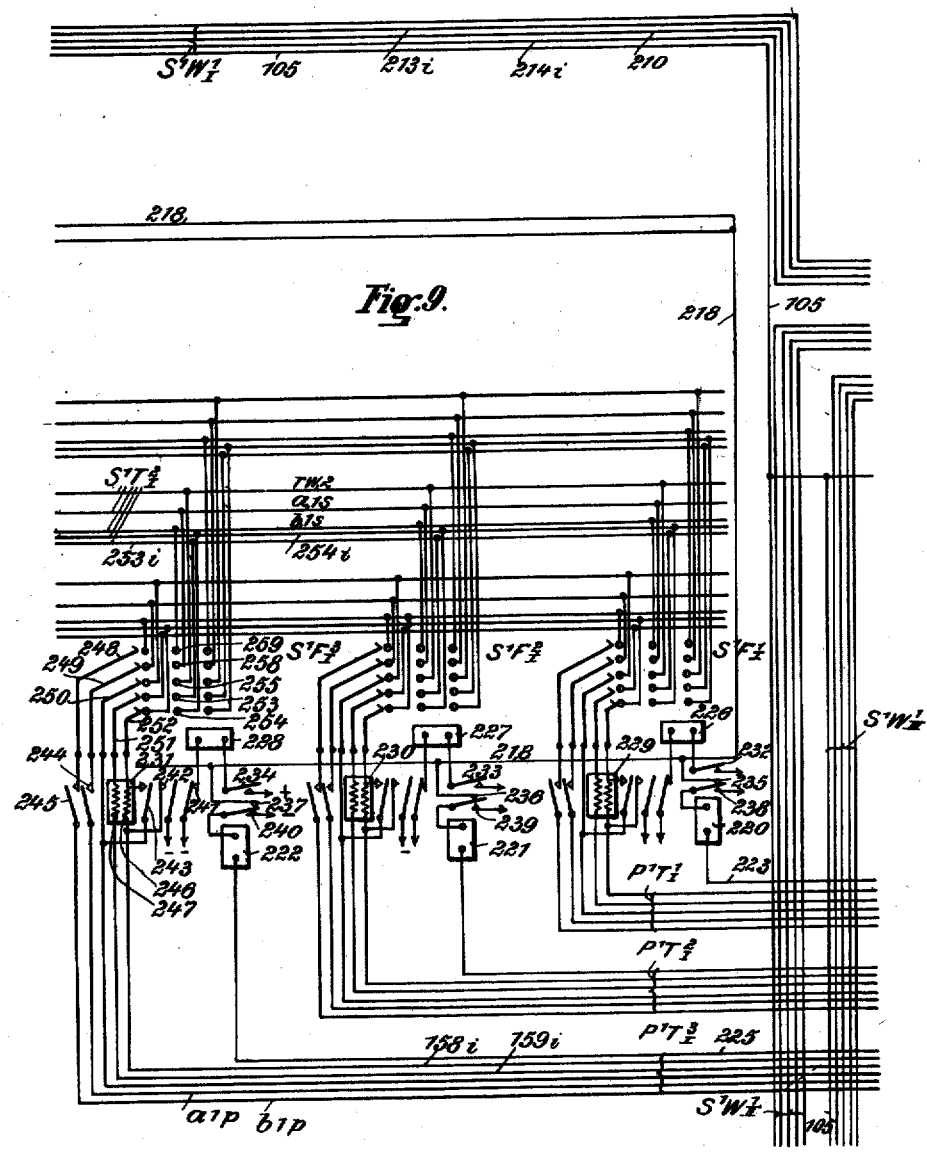
Figure 11:
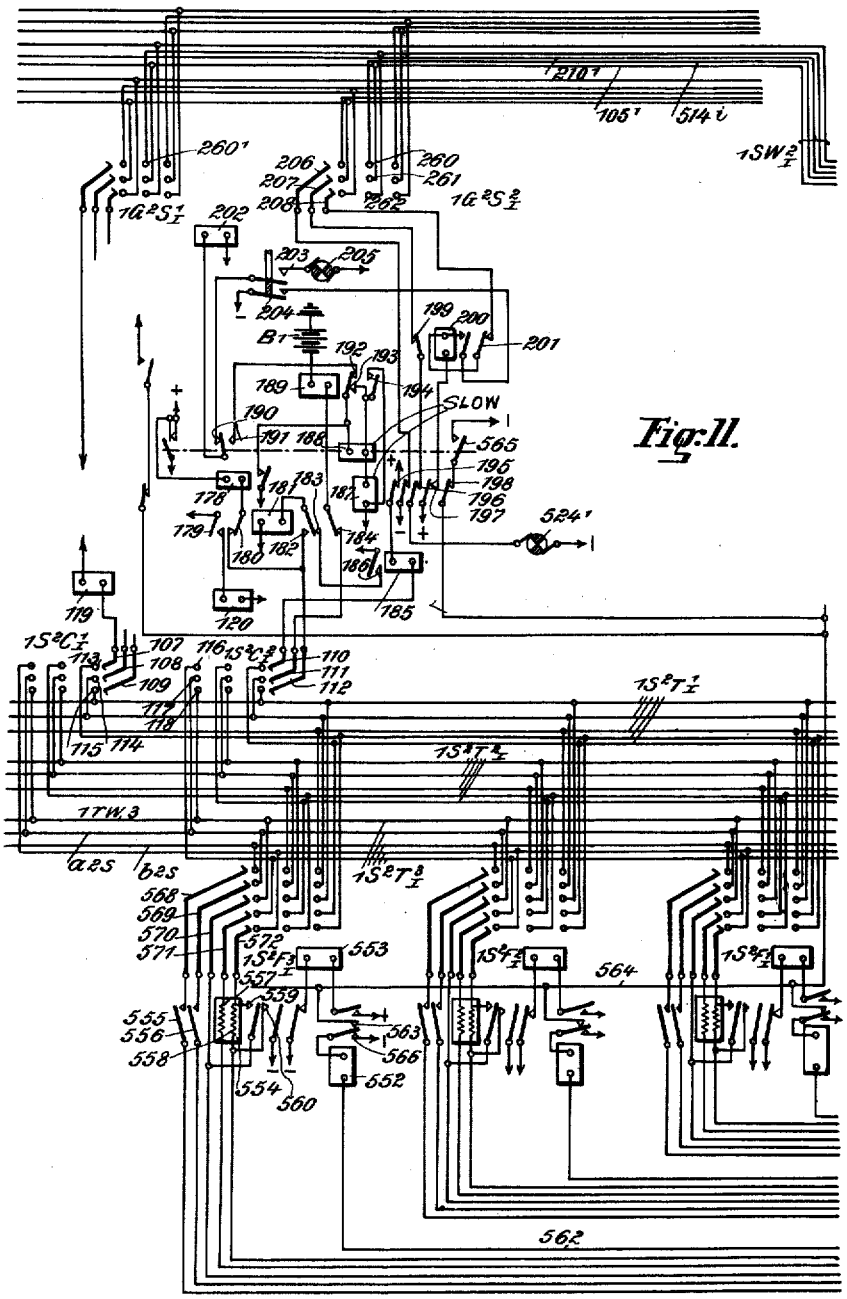
Figure 12:
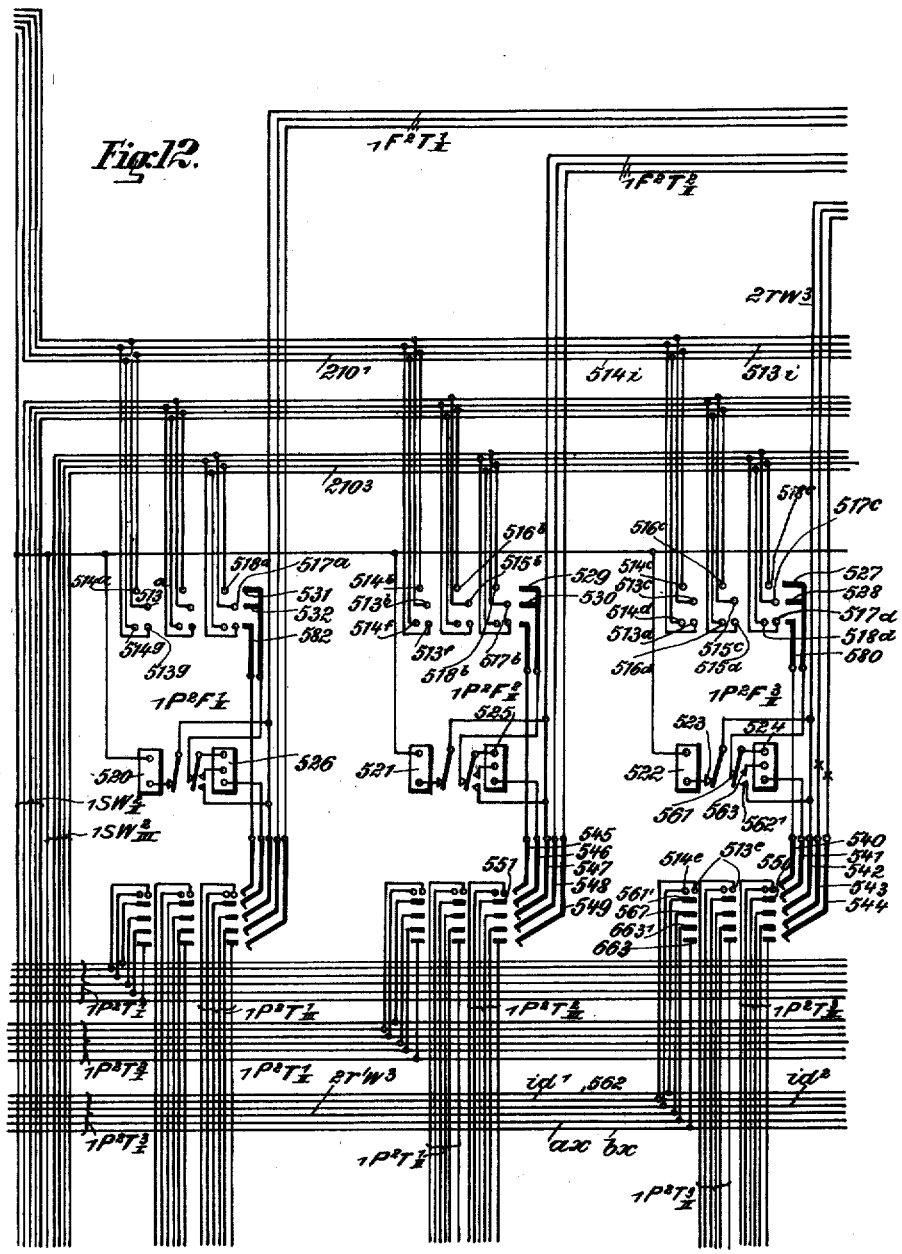

Fig. 8 shows the circuits of the first group selectors and secondary trunks, Fig. 9 the circuits of secondary trunk finders; Fig. 10 the circuits of primary trunk finders; Fig. 11 the circuits of second group selectors and second secondary trunk finders; Fig. 12 the circuits of second primary trunk finders and Fig. 13 the circuits of final selectors in a system according to Figs. 1ª and 1ᵇ, or 2ª and 2ᵇ.

Figure 14:
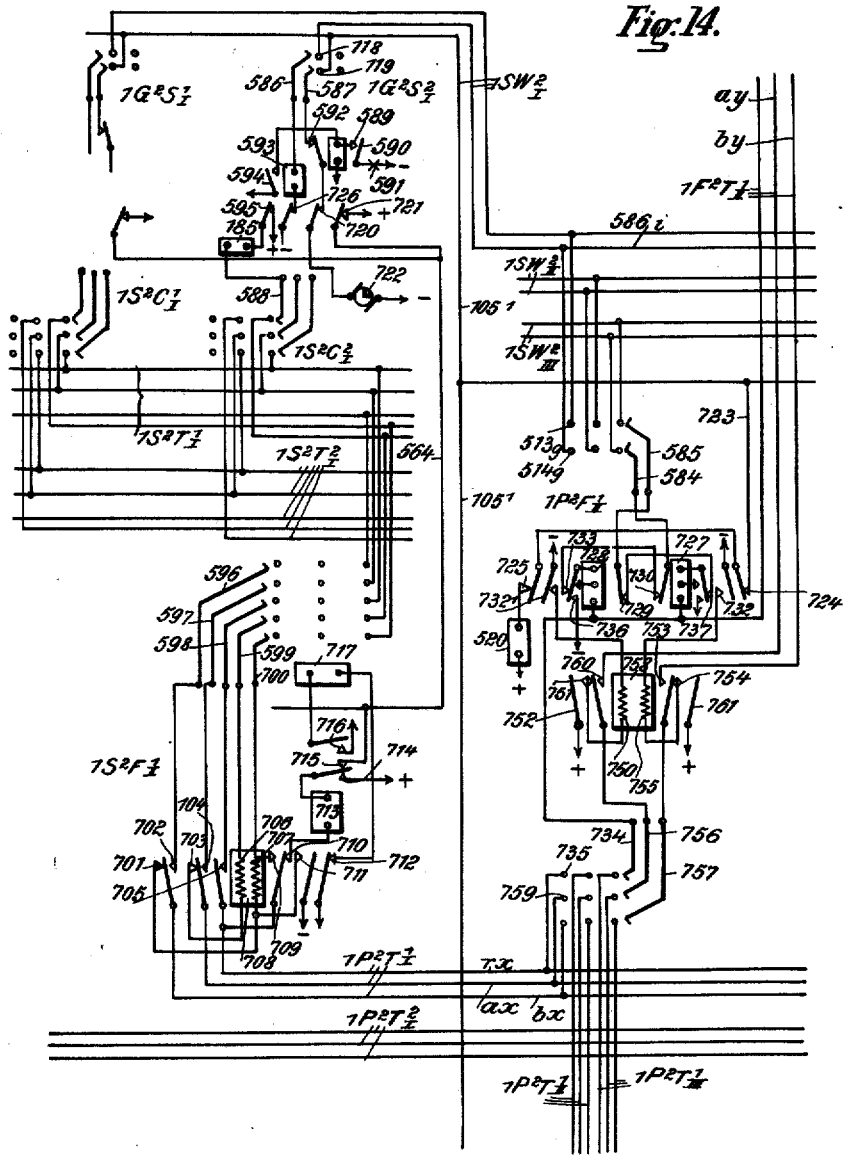

Fig. 14 shows circuits of the primary and secondary trunk finders that may be used instead of those shown in Figs. 9 and 10 or 11 and 12. With the circuits shown in Fig. 14 the number of fixed contacts in the contact banks of the primary trunk finders and the number of movable contacts or brushes is smaller than when the circuits of Figs. 9 and 10 or 11 and 12 are employed.

Figs. 15, 16, 17 and 18 when placed side by side with Fig. 18ª above Fig. 18. form a sufficiently detailed circuit diagram of the system outlined in Figs. 5ª and 5ᵇ to enable the working of all the details of this system to be fully explained. In the left half of Fig. 15 the circuit details of the distributing switches associated with the subscribers' lines are shown; in the right of this figure the circuits of a first group selector are illustrated. In the left half of Fig. 16 the apparatus associated with the trunks that are used both for outgoing and incoming calls from or to the particular group of subscribers are represented. These trunks will be referred to as "compound" trunks in the subsequent description of Figs. 15 to 18. In the right half of Fig. 16 a set of first secondary trunk finders is shown. Fig. 17 illustrates a set of first primary trunk finders. In the lower half of Fig. 18 a set of final selectors and in Fig. 18ª a set of second primary finders is shown, that is if the system is assumed to be for 10000 subscribers. In a system for 100000 or 1000000 subscribers the set of primary finders in Fig. 18ª would represent third or fourth primary finders.

Figs. 19, 20, 21 and 21ª illustrate roughly the mechanical design of parts of one of the sets of switches of which exchanges arranged according to the new system may be built up.

Figure 24:
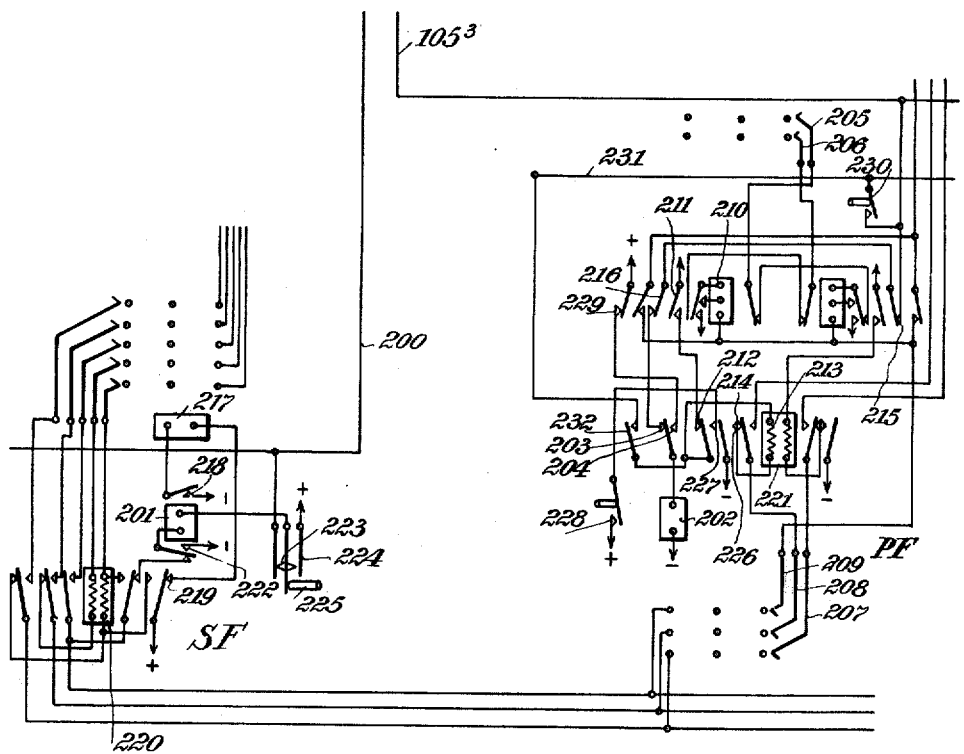

Figs. 22ª and 22ᵇ illustrate a method of grouping the primary trunk finders with which forwardly-acting primary trunk finders may be used instead of revertively-acting finders as shown in Figs. 1ᵇ and 2ᵇ for example. Fig. 23 shows modified circuits for starting and stopping the selector connectors SC. Fig. 24 shows modified restoring circuits for the primary and secondary trunk finders.

Before discussing the details of any of the systems outlined a general description of the methods by which connections are established in the systems illustrated in Figs. 1ª and 1ᵇ, 2ª and 2ᵇ, 3ª and 3ᵇ, 4ª and 4ᵇ, 5ª and 5ᵇ and 6ª and 6ᵇ will be given.

In Fig 1ª three groups of calling subscribers are represented by the groups of subscribers stations $CS^1_I$, $CS^2_I$, $CS^3_I$ ... $CS^1_{II}$, $CS^2_{II}$, $CS^3_{II}$ ... $CS^1_{III}$, $CS^2_{III}$, $CS^3_{III}$, and three groups of wanted subscribers shown separately in Fig. 1ᵇ are represented by the groups of stations $WS^1_I$, $WS^2_I$ ... $WS^1_{II}$, $WS^2_{II}$ ... $WS^1_{III}$, $WS^2_{III}$.

For each group of subscribers there is a group of revertively hunting primary trunk finders $PF^1_I$, $PF^2_I$, $PF^3_I$ ... $PF^1_{II}$, $PF^2_{II}$, $PF^3_{II}$, ... $PF^1_{III}$, $PF^2_{III}$, $PF^3_{III}$ and with each of those groups of primary trunk finders a group of final selectors $LW^1_I$, $LW^2_I$, $LW^3_I$, and $LW^1_{II}$, $LW^2_{II}$, $LW^3_{II}$ and $LW^1_{III}$, $LW^2_{III}$, $LW^3_{III}$ respectively, is associated.

Each group of subscribers has also a group of revertively hunting secondary trunk finders $SF^1_I$, $SF^2_I$, $SF^3_I$ and $SF^1_{II}$, $SF^2_{II}$, $SF^3_{II}$ and $SF^1_{III}$, $SF^2_{III}$, $SF^3_{III}$ respectively, and a group of line finders $F^1_I$, $F^2_I$, $F^3_I$ and $F^1_{II}$, $F^2_{II}$, $F^3_{II}$ and $F^1_{III}$, $F^2_{III}$, $F^3_{III}$ respectively.

In each group there is also a small percentage of group selectors $GS^1_I$, $GS^2_I$ and $GS^1_{II}$, $GS^2_{II}$ and $GS^1_{III}$, $GS^2_{III}$ respectively and corresponding groups of selector connectors $SC^1_I$, $SC^2_I$ and $SC^1_{II}$, $SC^2_{II}$ and $SC^1_{III}$, $SC^2_{III}$ respectively.

In Figs. 1ª and 1ᵇ three trunks per group and sets of three primary trunk finders and three secondary trunk finders per group are shown. The number of finders in each set corresponds to the number of trunks in a group. Thus if there are ten primary trunks such as $PT^1_I$, $PT^2_I$, $PT^3_I$ in each group there will be ten secondary finders such as $SF^1_I$, $SF^2_I$, $SF^3_I$, ten primary finders $PF^1_I$, $PF^2_I$, $PF^3_I$ and ten line finders $F^1_I$, $F^2_I$, $F^3_I$.

It will be supposed that subscriber $CS^2_I$ in the first group desires to be connected to the subscriber $WS^1_{II}$ in the second group. The calling subscriber by lifting his receiver causes a calling condition to appear on the fixed contacts of the line finders in his group and idle line finder, e. g. $F^2_I$, then connects an idle trunk $ST^2_I$ to the contact 1 of the calling line 4. The arrangement of the circuits and devices is such that an idle trunk which is connected with a calling line will be one that is connected by a selector connector to a group selector. Thus the trunk $ST^2_I$ is connected through a selector connector $SC^2_I$ to a group selector $GS^2_I$. As the calling subscriber wishes to be connected to a subscriber in the second group, he will send two selecting impulses in a known manner over his line to the exchange and these impulses cause the group selector to be moved around to its second contact which is connected to selecting wire $S_2$ leading to the primary trunk finders $PF_{II}$ in the wanted second group. After the selecting impulses have been sent, an interval ensues during which the change-over takes place, which has the effect of sending a current from the group selector $GS^2_I$ through the selecting wire $S_2$ and through the driving magnets $D_{II}$ of all the primary trunk finders $PF_{II}$ in the second group, that are not already engaged. The change-over also causes the contact 3 to be closed and thus connects battery through the relays $r^1_I$, $r^2_I$, $r^3_I$ to the test wires $t^1_I$, $t^2_I$, $t^3_I$ of the primary trunks leading to the first group. The idle primary trunk finder $PF_{II}$ in the wanted group now commences hunting for an idle trunk the test wire $t$ of which is connected to battery by the group selector $GS^2_I$. The brushes of the primary trunk finders are angularly displaced with respect to each other so that they will not strike trunks leading to one and the same calling group at the same moment. It will be supposed that the primary trunk finder $PF^2_{II}$ is the first to strike the contacts 6, 7 of an idle trunk $PT^2_I$ indicated by the group selector $GS^2_I$ as described. The stopping relay $T^2_{II}$ will be energized by a current flowing from the positive pole of the battery through $T^2_{II}$, 6, $t^2_I$, $r^2_I$, 13, 3 to the negative pole. The relays $r^2_I$, $T^2_{II}$ will be energized. The relay $r^2_I$ closes a locking circuit for itself which is independent of the contact 3 and the relay $T^2_{II}$ short circuits a part of its winding and thus lowers the potential on the test or stopping wire $t^2_I$ so as to prevent any other finder from stopping thereon.

The energization of the relay $r^2_I$ also results in the closure of a contact 14 whereby a circuit is completed from the negative pole of the battery through 14, 15, driving magnet $M^2_I$ to the negative pole. The driving magnet $M^2_I$ starts the secondary trunk finder $SF^2_I$ and this finder now moves its brushes until the contact 5 of the secondary trunk $ST^2_I$ is reached which is connected by the selector connector $SC^2_I$ to the group selector which extended the call to the wanted group and to the finder $SF^2_I$.

The calling line 4 will now be extended through $F^2_I$, $ST^2_I$, $SF^2_I$, $PT^2_I$, 7 in $PF^2_{II}$, 8 to an idle final selector $LW^2_{II}$ and the calling subscriber may send further selecting impulses to the final selector and cause it to establish the desired connection with the wanted station $WS^1_{II}$.

The group selector $GS^2_I$ that was used for the connection is restored to its normal position the moment the connection between the idle final selector and the secondary trunk $ST^2_I$ used is established by the secondary trunk finder $SF^2_I$. It is thus seen that the group selector is a transitorily engaged switch.

The scheme as shown in Figs. 1ª and 1ᵇ will work satisfactorily as long as calls are not sent out from different groups at the same moment. But if for example a group selector, e. g., $GS^1_{II}$ in the second group, were to start a group of primary line finders $PF_{III}$ at the same time as a group selector $GS^2_I$ in the first group started another group of finders $PF_{II}$ there would be a danger of a finder $PF_{III}$ stopping on a trunk leading to the first calling group and of this trunk being connected by a secondary trunk finder to a calling line in the first group. Thus the subscriber in the second group would possibly not get his connection with the selected group but would cause a final selector in the selected third group to be connected to a calling subscriber in some other group.

In the subsequent detailed description of the circuits of Fig. 7 to Fig. 14 in which the system outlined in Figs. 1ª and 1ᵇ and in Figs. 2ª and 2ᵇ is fully shown, it will be explained how all possibility of confusion is prevented.

The system outlined in Figs. 2ª and 2ᵇ is similar to that shown in Figs. 1ª and 2ᵇ except that it is intended for exchanges in which the subscribers are divided into major and minor groups, the major groups each comprising for example 1000 subscribers and the minor groups comprising for example 100 lines each. There may be ten major groups of 1000 lines each and each major group may be subdivided into ten minor groups of 100 lines each.

In Fig. 2ª the subscribers $C^1S^1_I$, $C^1S^2_I$, etc., of the first major group are connected to the fixed contacts of line finders $1F^1_I$, $1F^2_I$, etc. All the subscribers of the first major group of say 1000 lines have the exponent "1" associated with the letter C of their signs of reference, while all the line finders of the first major groups have the prefix "1" associated with their reference characters.

The subscribers of the first minor group of say 100 subscribers in the various major groups have the index "I" appended to the letter "S" of their reference signs, while the subscribers of the second and third minor groups of each major group have the indexes "II" and "III" respectively appended to the "S" in their reference signs.

The major and minor groups to which the various selector connectors SC, first group selectors GS and first secondary trunk finders SF belong will be recognized by the exponents and indexes associated with their signs of reference. The first secondary trunk finders of the first minor group in the first thousand for example have an exponent "1" above the S to indicate the first thousand and an index "I" appended to the F to indicate the first minor group in the particular major group.

The first primary trunk finders $P^1F^1_I$, etc., and $P^1F^1_{II}$, etc., are the ones that are connected to trunks which lead to the switches (not shown) that give access to the subscribers comprising the first major group or the first group of thousand lines. The first primary trunk finders $P^2F^1_I$, $P^2F^2_I$ and all the primary trunk finders whose signs of reference have the exponent "2" associated with their letter P are all connected to trunks $2S^2T^1_I$, etc., leading to the group of switches that give access to the lines of the second group of thousand lines. All these trunks have the prefix "2" before the letter "S" of their signs of reference.

The group of switches to which the second secondary trunks $2S^2T^1_I$, $2S^2T^2_I$, $2S^2T^3_I$ . . . $2S^2T^1_{II}$, $2S^2T^2_{II}$, $2S^2T^3_{II}$, etc., lead is similar in construction, circuits and arrangement to the group of switches that is associated with the trunks extending from the finders $1F^1_I$, $1F^2_I$, etc., of the first major group or any other major group of subscribers. Thus the circuits and arrangement of the second group selectors $2G^2S^1_I$ and $2G^2S^2_I$ are precisely similar to the circuits and arrangements of the first group selectors $G^1S^1_I$ and $G^1S^2_I$. The second secondary trunk finders $2S^2F^1_I$, $2S^2F^2_I$, etc., are similar to the first secondary trunk finders $S^1F^1_I$, $S^1F^2_I$.

The secondary primary trunk finders such as $2P^2F^1_I$, $2P^2F^2_I$, etc., of each major group are connected to final trunks $F^2T^1_I$, $F^2T^2_I$, etc., which lead to final selectors $L^2W^1_I$, $L^2W^2_I$, etc. Each minor group or hundred group has its group of second primary trunk finders and final selectors.

The general manner in which connections are established in an exchange according to Figs. 2ª and 2ᵇ will be understood if one connection through the system is traced.

Suppose subscriber $C^1S^1_I$ whose number is say 1101 wishes to connect to subscriber $C^2S^2_{II}$ whose number is say 2202. Subscriber 1101 by lifting his receiver from his switchhook causes a line finder in his group that is connected by a selector connector to a group selector, to connect a secondary trunk to his line. Thus $S^1T^3_I$ that has been connected by $S^1C^2_I$ to $G^1S^2_I$ will for example be connected to 1101 by $1F^3_I$. The calling subscriber $C^1S^1_I$ now sets the group selector $G^1S^2_I$ onto the selecting wire $S^1W^2$ leading to a set of first primary trunk finders $P^2F^1_I$, $P^2F^2_I$, $P^2F^3_I$. The exponent "2" of the letter P in these signs of reference indicates that these primary trunk finders lead to the second thousand group and the indexes I associated with the letters F indicate that this group of first primary finders is associated with the first calling group of 1000 lines.

The calling subscriber having selected the wire $S^1W^2$, the idle first primary finders of the first calling group that are connected by second selector connectors $2S^2C^2_I$, etc., to second group selectors will be started operating. It will be assumed that the primary trunk $P^1T^2_I$ is the first idle primary trunk reached by the moving brushes. If this is so the trunk $P^1T^2_I$ will be extended by the primary trunk finder $P^2F^2_I$ to the second secondary trunk $2S^2T^2_I$ and the first secondary trunk finder $S^1F^2_I$ will be started. When the brushes of the first secondary trunk finder reach the secondary trunk $S^1T^3_I$ that is connected to the calling subscriber the finder $S^1F^2_I$ stops and the calling line 1101 is then extended through $1F^3_I$, $S^1T^3_I$, $P^1T^2_I$, $P^2F^2_I$ to the second secondary trunk $2S^2T^2_I$. This trunk will be connected to an idle second group selector for example to the second group selector $2G^2S^2_I$. The first group selector $G^1S^2_I$ was disconnected from $S^1T^3_I$ the moment the first secondary trunk finder $S^1F^2_I$ reached the secondary trunk $S^1T^3_I$.

The calling subscriber having now been connected to the second thousand group will select the wanted second hundred group in the second thousand by setting the group selector $2G^2S^2_I$ onto the selecting wire $2SW_{II}$ leading to the said second hundred group. The idle second primary trunk finders of the wanted hundred group, e. g. the finders $2P^2F^1_{II}$ and $2P^2F^3_{II}$, will then be started. Suppose $2P^1T^3_I$ is the second primary trunk that is reached first in the operation of $2P^2F^1_{II}$ and $2P^2F^3_{II}$. The second secondary trunk finder $2S^2F^3_I$ will then be started and when it reaches the second secondary trunk $2S^2T^2_I$ upon which the calling subscriber is waiting the connection will be extended through $2S^2F^3_I$, $2P^1T^3_I$, $2P^2F^3_{II}$, $F^2T^3_{II}$ to the final selector $L^2W^3_{II}$. The calling subscriber then sets the final selector $L^2W^3_{II}$ onto the line 2202 in the 22nd hundred group and if the wanted line is free the desired connection will be established.

All the switches used in a system according to Figs. $2^a$ and $2^b$ may be ten-point switches excepting the line finders and final selectors which are preferably hundred-point switches.

The system shown in Figs. $3^a$ and $3^b$ is similar to that shown in Figs. $2^a$ and $2^b$ except that no special final selectors are used. The line finders are made to perform also the functions of the final selectors. As the line finders would then have to establish both the connections going out from a group as well as those coming in to a group of subscribers their number will have to be increased to enable them to cope with the traffic. Instead of the usual number of about 10 line finders 15 to 17 line finders would be provided. As any line finder would be available for any incoming and outgoing connection the economy of switches will be greater than if a separate set of switches (line finders) for outgoing connections and another set of switches (final selectors or connectors) is used for incoming connections.

If fifteen two-way switches or combined final selectors and line finders are used, fifteen second primary trunk finders (2PF) would also be used for each minor group containing say one hundred lines. The number of primary trunks need not be increased. But the brushes of the second primary trunk finders would preferably be angularly displaced with respect to each other and this would mean that the brushes of these finders shall point in fifteen different directions. As only a maximum of ten trunks in each set of second primary trunks are usually to be provided some five of the fifteen second primary trunk finders will at all times have their brushes out of engagement with the fixed contacts connected to the second primary trunks.

We will again suppose that a calling subscriber 1101 wishes to connect to subscriber 2202. The operations will all be similar to those described in connection with Figs. $2^a$ and $2^b$ up to the point where a second primary finder say $2P^2F^3_{II}$ extends the calling line to the final selector. As the final selector is, in this case, a line finder $2F^3_{II}$, a rearrangement of the circuits of this line finder is effected at the moment the connection is extended to $F^2T^3_{II}$ through $2P^2F^3_{II}$. This rearrangement of circuits renders the line finder $2F^3_{II}$ capable of acting as a final selector and enables the calling subscriber to connect the final trunk $F^2T^3_{II}$ and hence his own line to the wanted line No. 2202 by means of the line finder in the wanted group.

The system shown in Figs. $4^a$ and $4^b$ corresponds to that shown in Figs. $2^a$ and $2^b$ except that the secondary trunk finders act as forwardly-hunting finders instead of as revertively hunting finders. Thus when a group selector, say $G^1S^2_I$, has been set onto the wanted group the primary trunk finders say P²F¹₁, etc., will act similarly as in Figs. 2ᵃ and 2ᵇ. But the moment a primary trunk finder stops on an idle primary trunk, say P¹T³₁, the secondary trunk finder of the secondary trunk to which the calling subscriber is connected say S¹T³, will start hunting for the primary trunk P¹T³₁, whereas in Figs. 2ᵃ and 2ᵇ a secondary trunk finder say S¹F³₁ of Fig. 2ᵃ starts hunting for the secondary trunk S¹T³₁. The difference resides in this case in the reversing of the fixed and movable contact points. A reversal of this kind can also be effected in the primary trunk finders PF and 2PF if a different grouping of the trunks and in addition the identifying and group distinguishing means shown in Figs. 8, 9 and 10 or in Figs. 16 and 17 of this specification are employed. An aggregation of group selecting switches with forwardly acting primary and secondary trunk finders is shown in Figs. 22ᵃ and 22ᵇ in which the manner of applying the improved identifying and group distinguishing means is illustrated. The Figs. 22ᵃ and 22ᵇ will be more conveniently fully explained later.

In the system shown in Figs. 5ᵃ and 5ᵇ the group selecting method employed is again the same as in Figs. 2ᵃ and 2ᵇ, or Figs. 4ᵃ and 4ᵇ, but instead of employing final selectors that select the wanted line and then maintain the connection with the wanted subscriber as long as the conversation lasts, only a small percentage of final selectors is employed which are released and revert to common use when or shortly after the wanted subscriber is selected, the talking connection being then maintained by the distributing switch D of the wanted line until the conversation is finished.

Suppose for example, that subscriber 1101 wants a connection with No. 2202. When the subscriber 1101 starts the call the distributing switch D 1101 associated with his line connects his line to a secondary trunk which has been connected by a selector connector to a free first group selector, say the secondary trunk S¹T³₁. The calling subscriber now extends his line in the manner described with reference to Figs. 2ᵃ and 2ᵇ to a final trunk in the wanted hundred group which is connected by a final selector connector to an idle final selector. This might be, for example, the final trunk F²T²₁₁ in the 22nd hundred group which is connected by a final selector connector, say 22 SC¹, to the final selector 22FS¹. The calling subscriber now sets the final selector 22FS¹ onto the wanted line 2202. If the wanted line is busy the calling subscriber gets a busy signal and causes the switches to be restored to normal. But if the wanted line is free its distributing switch D2202 immediately starts operating and stops when it has reached the final trunk F²T²₁₁ to which the final selector 22FS¹ is connected. The final trunk F²T²₁₁ is identical in this system with the first secondary trunk S²T²₁₁ of the second thousand group.

The moment D2202 reaches S²T²₁₁ the final selector 22FS¹ is restored to its normal position and connected by the final selector connector 22SC¹ to another idle final trunk. At the same time a change of circuits is effected in the apparatus associated with the secondary trunk S₂T²₁₁ which causes a ringing machine to send out a ringing current to the wanted subscriber at periodic intervals until he responds to the call.

The systems shown in Figs. 6ᵃ and 6ᵇ is similar to that illustrated in Figs. 3ᵃ and 3ᵇ except that special quick-acting line finders FQ and slow-acting line finders FS are employed. The group selecting method may be the same as that of Figs. 2ᵃ and 2ᵇ or Figs. 4ᵃ and 4ᵇ or Figs. 22ᵃ and 22ᵇ, or of the modifications of these methods.

Suppose again that subscriber No. 1101 in this system desires to connect to No. 2202. When the calling subscriber starts the call a quick-acting finder, e. g. 1FQ²₁, that has been connected by its associated selector finder 1Q²₁ to a secondary trunk, which has in turn been connected to a group selector, will move its movable contact into connection with the calling line No. 1101. The calling subscriber will now set the group selector say G¹S¹₁ onto the selecting wire S¹W² of the wanted thousand group and will then proceed with the selecting of the wanted hundred group in that thousand in the manner already described in connection with Figs. 2ᵃ and 2ᵇ. Meanwhile the slow-acting finder 1FS³₁ that is connected by the selector finder 1Q²₁ to the quick-acting finder 1FQ²₁, will be traveling in search of the calling line 1101 and the moment it finds this line the quick-acting finder 1FQ²₁ is restored to its normal position and reverts to common use. The calling subscriber may now send further selecting impulses through the slow-acting finder 1FS²₁. When the last group selector, e. g. 2G²S²₁ is set onto the selecting wire 2SW₁₁ leading to the wanted hundred group the idle second primary trunk finders 2PF₁₁ whose final trunks F²T₁₁ lead to the line finders in the desired hundred group are started operating. When a second primary trunk finder, e. g. 2P²F³₁₁ has stopped on a second primary trunk 2P¹T³₁ a selector finder, e. g. 2Q²₁₁, in the wanted group will be caused to connect its quick-acting finder 2FQ²₁₁ to the final trunk F²T³₁₁. The calling line will now be connected to the quick-acting finder 2FQ²₁₁ and to the slow-acting finder 2FS³₁₁. When the quick-acting finder 2FQ²₁₁ is connected in the manner described through a second primary trunk finder to a second primary trunk its circuits are changed so as to cause it to act as a final selector, so that the calling subscriber No. 1101 may now select the wanted line No. 2202 with the aid of $2FQ^2_{II}$. If the wanted line is free the slow-acting finder will subsequently be caused to connect the final trunk $F^2T^3_{II}$ to the wanted line No. 2202 and the quick-acting finder $2FQ^2_{II}$ will be immediately restored to normal so as to revert to common use.

In the preceding description the primary trunk finders PF have been assumed to be arranged so that only those primary trunk finders in a group start operating at the suitable moment which have been previously connected by a selector SC to a group selector $GS^1_I$ or to a final selector FS Figs. 5a and 5b. The systems may, however, be so arranged that when a group of primary trunk finders is selected all the idle primary trunk finders in the particular group commence operating together and stop immediately one of them has reached an idle trunk. A group selector for selecting the next group of lower order will then be connected by its selector connector to the trunk belonging to the primary trunk finder that has taken the call.

In the detail circuits shown in Figs. 7 to 14 and 15 to 18 the first mentioned method has been applied.

The Figs. 7 to 14, in which the detail circuits of the system outlined in Figs. 2a and 2b are shown, will now be fully described.

The places that the switches and trunks of the Figs. 7 to 14 occupy in the system will be readily ascertained from an inspection of the signs of reference most of which correspond with those of Figs. 2a and 2b and the elements of which denote sufficiently clearly the places or functions of the various switches in the system.

In Fig. 7 two subscribers stations $C^1S^1_I$, $C^1S^3_I$ and three line finders $1F^1_I$, $1F^2_I$, $1F^3_I$ of the first hundred group of the first thousand are shown. Fig. 8 illustrates the group selectors $G^1S^1_I$, $G^1S^2_I$, selector connectors $S^1C^1_I$, $S^1C^2_I$ of the same hundred group and the release relays $r^1$, $r^2$ and the metering relay associated with each secondary trunk.

Each subscriber's line is provided with a line relay $l^1$ or $l^3$, a cut off relay $c^1$, $c^3$ and a conversation meter $m^1$, $m^3$.

Figure 13:
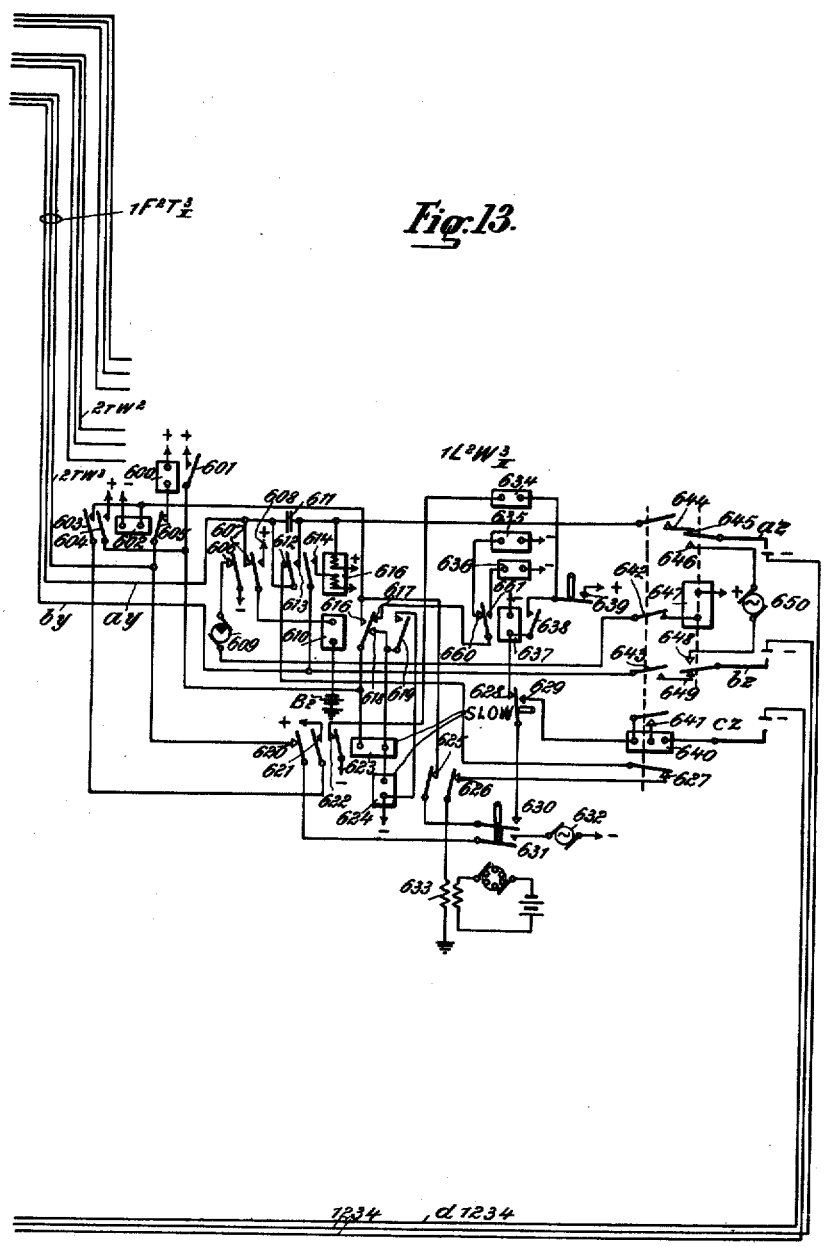

Fig. 9 illustrates the secondary trunk finders $S^1F^1_I$, $S^1F^2_I$, etc., belonging to the first hundred group of the first thousand and Fig. 10 shows the primary trunk finders $P^1F^1_I$, $P^1F^2_I$, etc., which extend connections from calling subscribers of the first thousand group to called subscribers in the first thousand group. Fig. 11 shows the set of second group selectors $1G^2S^1_I$, $1G^2S^2_I$ and of second secondary trunk finders $1S^2F^1_I$, $1S^2F^2_I$, $1S^2F^3_I$ belonging to the set of second secondary trunks $1S^2T^1_I$, $1S^2T^2_I$, etc., that leads from the first thousand group through a group of primary trunk finders to the group selecting switches that select the desired hundreds in the first thousand group. Fig. 12 shows the second primary trunk finders $1P^2F^1_{II}$, $1P^2F^2_{II}$, $1P^2F^3_{II}$ of the second hundred group of the first thousand group and Fig. 13 shows the circuits of a final selector. An inspection of the various figures will show that the circuits of all switches of each class are alike.

Fig. 14 shows an arrangement of circuits for primary trunk finders which may be used instead of the arrangement shown in Figs. 10 and 12.

All the circuits and apparatus of Figs. 7 to 14 will be understood from the following description of the operations in the establishing of a connection between the subscriber $C^1S^1_I$ and the subscriber No. 1234 who will be assumed to be the wanted subscriber.

When the calling subscriber $C^1S^1_I$ raises his receiver from his switchhook in the well known manner a circuit is closed which extends from the positive pole of the exchange battery through the line relay $l^1$, contact 1 of cut off relay $c^1$, limb 2 of calling line, subscriber's station $C^1S^1_I$, limb 3, contact 4 to the negative pole of the exchange battery. The line relay $l^1$ is energized and closes its contacts 5 and 8. The closure of contact 5 results in the negative pole of the battery being connected through the winding 12 and the contact 6 of the cut off relay to the test contacts 9, 10, 11, etc., of all the line finders $1F^1_I$, $1F^2_I$, etc., belonging to the calling subscriber's hundred group. By the closure of contact 8 the starting circuit 13 of the line finders is closed. The system is arranged so that only such line finders as are connected by a selector connector such as $S^1C^1_I$, $S^1C^2_I$ to idle group selectors $G^1S^2_I$, $G^1S^2_I$ will be set in operation. By circuits which will be explained later the selector connectors will each have caused their brushes 34, 35, 36, 37 and 38, 39, 40, 41 to stop on different secondary trunks, say $S^1T^3_I$ and $S^1T^2_I$ respectively. Thus the brush 41 will be resting on the contact 81 of the secondary trunk $S^1T^2_I$ and the brush 37 will be resting on the contact 82 of the secondary trunk $S^1T^3_I$. The brush 41 is connected through the contact 46 of the starting relay 50 and through the current supply relay 48 and a contact 100 to the positive pole of the exchange battery. The brush 37 is also connected through similar apparatus not shown in the drawing to the positive battery pole. Therefore when the negative battery pole is connected by the contact of any line relay for example contact 8 of $l^1$ to the starting circuit, currents will flow through the starting relays 16 and 17 of the finders belonging to the trunks $S^1T^2_I$, $S^1T^3_I$. The current that flows through the starting relay 16 may be traced from the positive battery pole through 100, 48, 46, 41, 81, release wire $rw^2$, contact 24 of stopping relay 18, 16, 13, 8 to the negative pole. The path of the current through the starting relay 17 is not fully shown but it will be quite similar and will include the brush 37 contact 82, wire $rw^3$, 25, 17, 13 and 8. The relays 16 and 17 close their contacts 28 and 29, and thus complete the circuits of their driving magnets 20 and 21. The current through 20 flows from the positive pole through 22, 20, 28 to the negative pole, and the current through 21 passes from the positive pole through the interrupter 23, 21, 29 to the negative pole. The brush sets $a^2_I$, $b^2_I$, $c^2_I$ and $a^3_I$, $b^3_I$ $c^3_I$ will now be caused to travel over the fixed contacts of the finders in search of the calling line. It will be assumed that the brushes of the finder $1F^2_I$ reach this line first. A current then flows through the circuit of the stopping relay 18 which extends from the positive pole through 100, 48, 46, 41, 81, $rw^2$, 18, $c^2_I$, 10, wire $c1101$ of the calling line No. 1101, 6, winding 12 of the cut-off relay $C^1$, contact 5 to the negative pole. The relays 18 and $C^1$ are energized. The relay 18 opens the circuit of the starting relay 16 at 24 and causes its deënergization and hence the deënergization of the driving magnet 20 so that the brushes $a^2_I$, $b^2_I$, $c^2_I$ stop on the multiple contacts of the calling line. The energization of the cut-off relay results in the line relay circuit being opened at 1 so that the line relay contact 8 is opened and the negative battery pole is disconnected from the starting wire 13. By this means the relay 17 of the $1F^3_I$ is also deprived of current and the brushes of this finder are thus stopped.

The cut-off relay $C^1$ besides opening its contact 1 also opens contact 4 and thus cuts off the branch circuit of the line relay $l^1$ from the subscriber's line. By opening its contact 6 and closing contact 7 the cut-off relay transfers the stopping wire $c1101$ from its winding 12 to its winding 83 and to the winding of the meter $m^1$. By the closure of the contact 7 the stopping wire $c1101$, that is multiply connected only to the contacts of the line finders, is connected to the test wire $d1101$ which is connected in multiple only to test contacts of the final selectors of the hundred group to which the calling subscriber belongs. Two separate windings, 12 and 83, and wires, $c1101$ and $d1101$, are employed in order that the battery may be connected at all times when the line is idle to the test wire $d1101$ leading to the final selectors, while enabling the battery to be connected to the stopping wire $c1101$ leading to the line finders only at the times when the subscriber is calling.

When the stopping relay 18 was energized simultaneously with the cut-off relay $c^1$ a portion of its winding was short-circuited by the closure of the contact 26 and the potential applied to the wire $c1101$ and to the wire $d1101$ through the winding 83 of $c^1$ and through the winding of the meter $m^1$ was thus sufficiently lowered to prevent any other stopping relay such as 19 or the test relay of a final selector from receiving enough current to energize it. Therefore no other switch will now be able to connect to the calling line. The busy condition may be caused on the wire $d1101$ leading to the final selectors by the opening of the circuit through 83 the moment the line relay $l^1$ is energized.

The energization of the stopping relay 18 resulted in the closure of the contacts 30, 31 and a current then commenced flowing from the negative pole of the battery B of the group selector $G^1S^2_I$ through the selecting relay 60, 53, 40, 80, talking wire $a^1s$, 30, $a^2_I$, 84, 86, 2, $C^1S^1_I$, 3, 87, 85, $b^2_I$, 31, $b^1s$, release relay $r^2$ to the positive pole of the battery. The release relay $r^2$ connects the positive pole through 99, 88 and resistance 89 to the release wire $rw^2$ and controls the release of the switches in the manner described later. The selecting relay 60 closes its contact 68 and opens its contacts 66 and 67. The opening of contact 67 results in the energization of the release relay 57 which controls the release circuits until this control is assumed by the release relay $r^2$. The energizing current for the release relay 57 flows from the positive pole of the exchange battery through contact 49, which was first closed by the relay 48 when the line finder of $S^1T^2_I$ was started, thence through 57, 68 to the negative pole. The release relay 57 prepares the circuit of the stepping magnet 75 of the first group selector $G^1S^2_I$ by closing the contact 59. It also opens the contact 58 and closes 65 the functions of which will appear later.

The calling subscriber $C^1S^1_I$ now works his impulse transmitter 101 in a well known manner and as he desires a connection with a subscriber in the first thousand he will cause one interruption of the current flowing through the selecting relay 60. This relay will then allow its armature to drop back once and one impulse will be sent through the stepping magnet 75 over the following current path: positive pole 49, 66, 59, 75 to the negative pole. The stepping magnet 75 will drive the group selector brushes 76, 77, 78 forward one step causing them to stop on the contacts 102, 103, 104 of the first thousands selecting wire $S^1W^1_I$. While the brushes 76, 77, 78 were being moved forward the relay 56 was energized due to the opening of the short-circuiting contact 68 on the selecting relay, which resulted in a flow of current through the relay 56 from the positive pole through 49, 57 and 67, 56 to the negative pole. Therefore the contacts 61, 62, 63, 64 are kept open during the motion of the group selector brushes. But when the interruptions of the selecting circuit and the oscillations of the selecting relay armature cease, the short-circuiting contact 68 is again steadily closed and the change over relay 56 allows its armature to fall back and to close the contacts 61, 62, 63 and 64. The immediate result of this is that the negative battery pole is connected through 62 and 69 to the starting wire 105 of the primary finders $P^1F^1_I$, $P^1F^2_I$, etc., which establish the connections from the calling lines of the first thousand to the called lines of this thousand, and that the primary finders, say $P^1F^1_I$, $P^1F^3_I$, which happen to belong to second secondary trunks $1S^2T^1_I$, $1S^2T^2_I$ that have been connected by second selector connectors $1S^2C^1_I$, $1S^2C^2_I$ to second group selectors $1G^2S^{11}_I$, $1G^2S^2_I$, are started operating, it being supposed that the brushes 107, 108, 109 of $1S^2C^1_I$ are resting on the contacts 113, 114, 115 of $1S^2T^1_I$ and that the brushes 110, 111, 112 have stopped on the contacts 116, 117, 118 of the second secondary trunk $1S^2T^3_I$. The current through the driving magnet 121 of the primary trunk finder $P^1F^3_I$ will flow from the positive battery pole through the battery supply relay 178 of the second group selector $1G^2S^2_I$, Fig. 11, 180, 112, 118, $1rw^3$, 127, driving magnet 121, interrupter 106, starting wire 105, brush 77 of the first group selector 69, 62 to the negative pole of the battery. The driving magnet 123 of the other primary trunk finder $P^1F^1_I$ will be energized by a current through a relay and a contact in $1G^2S^1_I$, Fig. 11, that are similar to 178, 180, of $1G^2S^2_I$ and through 109, 115, $1rw^1$, 135, 123, 106, 105, 77, 69, 62 to the negative pole. At each step taken by the brushes 139, 140, 141, 142, 143 of the primary finder $P^1F^3_I$, the identifying brush 139 steps onto another identifying contact 154, 155, etc., and at each second step the remaining brushes step onto the contacts of another primary trunk $P^1T^3_{III}$, $P^1T^3_{II}$, etc. There is only one primary trunk leading from each of the primary trunk finders $P^1F^1_I$, $P^1F^2_I$, $P^1F^3_I$ to the calling group so that if the primary trunk $P^1T^3_I$ leading from the primary trunk finder $P^1F^3_I$ to the calling group is engaged another primary trunk finder $P^1F^1_I$ or $P^1F^2_I$ will have to be made to extend the connection from the calling group to the wanted group. Therefore if only one primary trunk finder say $P^1F^3_I$ were started when the wanted group is selected and if the primary trunk $P^1T^1_I$ leading from this finder to the calling group were engaged no immediate connection would be obtained. It is an important feature of this invention that a plurality of primary trunk finders are started, operating whenever a group has been selected by a group selector so that if the primary trunk leading from the one finder to the calling group is engaged another finder will attempt to extend the connection through its primary trunk. It is therefore advantageous to start all the primary finders that are idle so that they may all test their particular primary trunk. This will diminish the likelihood of a calling subscriber failing to get through to the wanted group. Circuits for this method of operation are shown in Fig. 23.

The description of the operations in connecting the calling subscriber $C^1S^1_I$ to No. 1234 will now be resumed. The primary finders $P^1F^1_I$ and $P^1F^3_I$ had been started by the application of negative battery pole to the starting wire 105 by the change over relay 56. This relay also connects by its contact 63 the positive pole through the relay 70 and the brush 78 to the wire 210. This wire is connected to the multiple contacts $214^a$, $214^b$, $214^c$ of the primary finders $P^1F^1_I$, $P^1F^2_I$, $P^1F^3_I$ which are traversed by the brushes $216^a$, $216^b$, $216^c$ of the finders. These brushes each form a part of the test circuit of their respective finders and are connected to the back contacts 136, 132, 128 of the respective test relays 126, 125 and 124. A test relay, for example 124 can only be energized if its rear brush $215^c$ or $216^c$ strikes a contact $414^c$, $413^c$ or $314^c$, $313^c$ that is connected to the positive pole and if the trunk that its front test brush 140 strikes at that moment is free. The rear contacts $413^c$, $414^c$ correspond to the set of selecting wires $S^1W^1_{III}$ that comes from the third hundred in the first thousand and the rear contacts $313^c$, $314^c$ are connected to the selecting wires of the second hundred in the first thousand. If calls had been extended from these hundred groups to the primary finders $P^1F^1_I$, $P^1F^2_I$, $P^1F^3_I$ the idle primary finders $P^1F^1_I$, $P^1F^3_I$ would be caused to test the primary trunks $P^1T^1_{III}$, $P^1T^1_{II}$ and $P^1T^3_{III}$, $P^1T^3_{II}$ leading to the third and second hundred groups of the first thousand before testing the primary trunks $P^1T^1_I$, $P^1T^3_I$ leading to the first hundred. It will be assumed for convenience that the test brush 140 of the primary finder $P^1F^3_I$ on striking the test contacts 168, 167 finds the trunks $P^1T^3_{III}$ and $P^1T^3_{II}$ engaged or that no calls have come from the groups representing these trunks so that the brushes 139, 140, 141, 142, 143 and their companion brushes $215^c$, $216^c$, $217^c$ continue their travel toward the next sets of contacts. It must now be mentioned that when the positive battery pole was connected to the rear contacts or groups distinguishing contacts of the primary finders and when these finders were started operating the negative battery pole was simultaneously connected by the change over relay 56 through 65, 64 to the wire 218 and to the relays 220, 221 and 222 of the secondary finders $S^1F^1_I$, $S^1F^2_I$ and $S^1F^3_I$, and thence through the wires 223, 224, 225 to the test contacts $166^I$, $166^{II}$, $166^{III}$ of the primary trunks $P^1T^1_I$, $P^1T^2_I$, $P^1T^3_I$. Therefore when the test brush 140 strikes the test contact $166^{III}$ the negative pole will be connected by 140 to the lower end of the winding of the test relay 124 and the positive pole will be connected to the upper end through the contact $214^c$ and the brush $216^c$. If the primary trunk $P^1T^3_I$ is not busy at that moment the potential on the test contact $166^{III}$ will be high enough to cause an energizing current to flow from the positive pole through 63, relay 70, 78, 104, 210, $214^c$, $216^c$, 128, 124, 140, $166^{III}$, 225, relay 222, 237, 218, 64, 65 to the negative pole. The relays 222 and 70 then attract their armatures and 222 closes a locking circuit for itself through its contact 240 and simultaneously closes the circuit of the driving magnet 228 by its contact 234. The brushes 248, 249, 250, 251, 252 of the secondary trunk finder $S^1F^3_I$ are then moved by the driving magnet 228 over the fixed contacts connected to the secondary trunks $S^1T^1_I$, $S^1T^2_I$, $S^1T^3_I$. The energization of the relay 70 results in the negative pole being disconnected from the starting wire 105 through the opening of the contact 69 of the relay 70 and this relay closes a locking circuit for itself through the contact 71, which locking circuit may be traced from the positive pole through 63, 70, 71, 74 to the negative pole. If the second primary trunk finder $P^1F^1_I$ has not already stopped on a primary trunk such as $P^1T^1_{II}$ for instance, which leads to the second hundred group of the first thousand, it would now be stopped on account of the negative pole being disconnected from the starting wire 105. It will be observed that this starting wire leads to all the hundred groups of the first thousand so that the primary finders which have not been stopped by their test relays such as 124 will keep traveling as long as any call that has reached the particular set of primary finders is waiting to be extended to a free trunk by these finders.

The secondary finder $S^1F^3_I$ which was started by the relay 222 will continue to travel until its identifying relay 231 is energized and opens the contact 241. The identifying relay 231 is arranged to be energized by two different windings 246 and 247 and according as the call which gave rise to the operation of the secondary trunk finder, was extended to the set of primary trunk finders $P^1F^1_I$, $P^1F^2_I$, $P^1F^3_I$ by the first group selector $G^1S^1_I$ or $G^1S^2_I$ only the lower end of the winding 246 or that of the winding 247 will be connected to the negative pole of the battery. This discrimination between the two windings 246, 247 is accomplished by the pair of identifying brushes $217^c$, 139 of $P^1F^3_I$ and by the corresponding brushes of the other primary finders and by the identifying contacts such as $213^d$, $214^d$ and wires $213^l$, $214^l$. As the call which is now under discussion was extended to the primary trunk finders $P^1F^1_I$, $P^1F^2_I$, $P^1F^3_I$ by the first group selector $G^1S^2_I$ the test brushes of the primary trunk finder $P^1F^3_I$ stopped on the second half of the test contact $166^{III}$ and the identifying brushes 139, $217^c$ stopped on the pair of identifying contacts 159, $214^d$. Therefore the winding 247 of the identifying relay 231 was connected to the negative battery pole over the following path: negative pole at the group selector $G^1S^2_I$, brush 76, 102, $214^l$, $214^d$, $217^c$, 139, 159, $159^l$, lower end of winding 247. The lower end of the other winding 246 of the identifying relay which is connected to the wire $158^l$ and the contact 158 in the primary trunk finder $P^1F^3_I$ will be unconnected and therefore winding 246 will be inactive. As only the winding 247 is connected to battery, only the one identifying brush 251 belonging to this winding will be active and will search for a contact which is connected to a positive pole, such as the contact 253 which is connected to the positive pole through the brush 38 of the selector connector and through the relay 55. None of the other identifying contacts in the same row as 253 can be connected at this time to the positive pole because this can only be done by the brush 38 of $S^1C^2_I$ and not by the brush of any other selector connector $S^1C^1_I$ which only travels over the other identifying wires such as $245^l$ that are connected to the row of contacts traversed by the brush 34 of $S^1C^1_I$ but not to the contacts traversed by the brush 38 of $S^1C^2_I$. It follows that the relay 231 will identify the secondary trunk $S^1T^2_I$ to which the group selector $G^1S^2_I$ is connected and will be energized only when the identifying contact 253 of this trunk is reached by the brush 251. This energizing current will flow from the positive pole through 61, starting relay 55, brush 38, 79, identifying wire $253^l$, contact 253, brush 251, winding 247, wire $159^l$, identifying contact 159, brushes 139, $217^c$, contact $214^d$, $214^i$, 102, 76 to the negative pole. The identifying relay 231 and the starting relay 55 of the selector connector are energized simultaneously. The former relay opens the circuit of the driving magnet 228 at the contact 241 and thus stops the secondary trunk finders $S^1F^3_I$, while the starting relay 55 closes a circuit which extends from the positive pole through 54, 52, relay 50 to the negative pole. The relay 50 is energized and opens its contacts 46, 52 and 53 while closing its contacts 51 and 47. By closing 51 it connects its winding to the brush 41 and thence through the release wire $rw^2$ and the contacts 88 and 99 to the positive battery pole. By closing the contact 47 the relay 50 closes the circuit of the driving magnet 45 of the selector connector $S^1C^2_I$ and this causes the brushes 38, 39, 40, 41 to be moved away from the contacts 79, 80 and 81 of the secondary trunk $S^1T^2_I$. The relay 50 will then be kept energized as long as the brush 41 keeps striking contacts (similar to 81) of busy trunks, these contacts all being connected to the positive pole in the same way as $S^1T^2_I$. The relay 50 will also be kept energized if its brush 41 strikes a contact similar to 81 of a secondary trunk that is already connected by another selector connector $S^1C^1_I$ to a group selector, for this contact will be connected to the positive pole through the brush 37 of this selector connector and through a contact and a relay similar to 46 and 48 of $S^1C^2_I$. The moment a secondary trunk is reached which is idle and which has not already been seized by another selector connector, the relay 50 will be deënergized and will open the circuit of the driving magnet 45 causing the brushes 38, 39, 40, 41 to stop. At the same time the relay 50 will close its contact 46 and apply the positive pole of the battery to the release wire of the particular trunk, through its relay 48 and contact 46.

When the relay 50 was energized the circuit of the selecting relay 60 of the first group selector $G^1S^2_I$ was opened at 53 so that 60 allowed its armature to drop back and to steadily close the short-circuiting contact 67 which deprives the release relay 57 of current. This relay is thus deënergized and closes its back contact 58. A restoring circuit for the group selector $G^1S^2_I$ is then closed including the stepping magnet 75 and the interrupter 72. This circuit extends from the positive pole through 72, off normal contact 73, 58, 75 to the negative pole. Assuming that the brushes 76, 77, 78 move in a circle, the stepping magnet will now move these brushes farther around until they reach their normal position in which the off-normal contacts 73, 74 will open and interrupt the stepping magnet circuit and also the locking circuit of the relay 70. All the parts of the group selector $G^1S^2_I$ will then have regained their normal positions and the group selector will be connected to another secondary trunk and will be ready to assist in establishing another connection.

We will now return to the primary trunk finder $P^1F^3_I$, which has connected the second secondary trunk $1S^2T^3_I$ to the primary trunk $P^1T^3_I$ and to the secondary trunk finder $S^1F^3_I$, which has connected the trunk $P^1T^3_I$ to the secondary trunk $S^1T^2_I$. It must now be mentioned that when the test relay 124 of the primary trunk finder was energized this relay closed a locking circuit for itself through its contact 129 and when the identifying relay subsequently attracted its armature it also locked itself in a circuit through the contacts 242 and 243.

The locking circuit of the test relay 124 extends from the positive pole of the battery through the relay 178 of the second group selector $1G^2S^2_I$, which was assumed to have connected itself to the secondary trunk $1S^2T^3_I$, contact 180, brush 112, 118, release wire $1rw^3$, 129, lower winding of the relay 124, brush 140, test contact $166^{III}$, test wire 225, starting relay 222, contact 240 to the negative pole; and the locking circuit of the identifying relay may be traced from the positive pole through contact 99 of the release relay $r^1$, Fig. 8, 88, 89, release wire $rw^2$, 255, brush 250, 243, winding 246, 242 to the negative pole.

It will be remembered that the starting of the selector connector $S^1C^2_I$ and the energization of the identifying relay 231 of the secondary finder $S^1F^3_I$ took place simultaneously, so that the first secondary trunk $S^1T^2_I$ was extended through $S^1F^3_I$, $P^1T^3_I$ and $P^1F^3_I$ to the second secondary trunk $1S^2T^3_I$ before the selecting relay 60 was disconnected from the first secondary trunk. The moment this extension of the first secondary trunk to the second secondary trunk takes place a new extended selecting circuit is established as follows: positive pole of the exchange battery $B^1$ selecting relay 189, contact 184, brush 111, 117, $a^2s$, contact at 256 which closed when the test relay 124 was energized, brush 142, 172, $a^1p$, 244, 249, 258, $a^1s$, 96, 30, $a^2_I$, 84, 86, 2, $C^1S^1_I$, 3, 87, 85, $b^2_I$, 31, $b^1s$, release relay $r^2$ in the first secondary trunk, positive pole of the common exchange battery. It is thus seen that the slow-acting release relay $r^2$ now receives its current over a new extended path.

The calling subscriber having selected the wanted thousand group and having been connected by a first primary finder and a first secondary finder to a free second secondary trunk leading to the group selecting and trunk finding switches in the wanted thousand, now selects the wanted hundred group with the aid of the second group selector $G^2S^2_I$. As the calling subscriber wishes to be connected to the second hundred group he will cause two interruptions of the selecting circuit by his impulse transmitter 101 and this will result in two detractions of the armature of the selecting relay 189. By circuits similar to those described in connection with the first group selector the second group selector $1G^2S^2_I$ will then move its brushes 206, 207, 208 onto the contacts 260, 261, 262 of the selecting wire $1SW^2_I$ that leads to the set of second primary trunk finders $1P^2F^1_{II}$, $1P^2F^2_{II}$, $1P^2F^3_{II}$ of the wanted hundred group. The change over relay 187 then applies the negative battery pole through 196, 199, 207 to the wire $105^1$ similarly as in the first group selector, and the idle second primary finders, for example $1P^2F^2_{II}$, $1P^2F^3_{II}$ are then immediately started operating. The lower ends of the windings of the driving magnets 521, 522 of $1P^2F^2_{II}$, $1P^2F^3_{II}$ will be connected to the positive pole of the battery as shown in detail in the case of 522 whose connection to the positive pole may be traced through 523, release wire $2rw^3$, 605, and the battery supply relay 600 in the final selector $1L^2W^8_{II}$. The complete circuit of the driving magnet 522 may be traced from the positive pole through 600, 605, $2rw^3$, 523, 522, $105^1$, 261, 207, 199, 196, interrupter 524 to the negative pole. The circuit of 521 will be similar.

When the negative pole was applied through 524 to the wire $105^1$ by the change over relay 187, of $1G^2S^2_I$ the test circuit wire $210^1$ was simultaneously connected to the positive pole, and the identifying wire $514^1$ to the negative pole, through 262, 208, 200 and 197, and through 260 and 206 respectively. Thus the positive pole was connected to the test circuit contacts $514^a$, $514^b$, $514^c$ of the sets of group distinguishing contacts that correspond to the second primary trunks $1P^2T^1_I$, $1P^2T^2_I$, $1P^2T^3_I$, these being the primary trunks through which all the calls from calling subscribers of the first thousand are extended to wanted subscribers of the first thousand. If no calls from other thousand groups are waiting at the second primary trunk finders $1P^2F^1_{II}$, $1P^2F^2_{II}$, $1P^2F^3_{II}$ to be extended to final trunks $1F^2T^1_{II}$, $1P^2F^2_{II}$, etc., the test relays 524, 525 will only be given a chance to be energized when their brushes 527 and 529 reach the contacts $514^c$ and $514^b$ respectively. But if a call say from the third thousand group were waiting the contacts $518^a$, $518^b$, $518^c$ would be connected to the positive pole by a wire $210^3$ of the selecting wires $1SW^2_{III}$, which lead to second group selectors that are associated with the third thousand group in a manner that will be understood by examining the Figs. $2^a$ and $2^b$. The test relays 524, 525 would then carry out a test when the test brushes 527 and 529 reach the test circuit contacts $518^a$ and $518^b$ respectively. The call from the third thousand group might also be waiting on the test circuit contacts $517^a$, $517^b$ and $517^d$. The relays 524 and 525 would then test when the brushes 528 and 530 reach the contacts $517^c$ and $517^b$ respectively. The particular set of contacts $518^a$, $518^b$, $518^c$, or $517^a$, $517^b$, $517^c$ that the call is waiting on will depend upon whether the one group selector of the third thousand group or the other is used. Thus in the case of the group selectors $1G^2S^1_I$, $1G^2S^2_I$ associated with the first thousand group it will be found that the positive pole will be connected to the test circuit contacts $513^a$, $513^b$, $513^c$ if the group selector $1G^2S^1_I$ is used and to the contacts $514^a$, $514^b$, $514^c$ if the group selector $1G^2S^2_I$ is used. It might also happen that calls are extended through both group selectors $1G^2S^1_I$, $1G^2S^2_I$ of a group at the same moment. Both sets of contacts $513^a$, $513^b$, $513^c$ ... $514^a$, $514^b$, $514^c$ would then be rendered active. The test relays of the idle primary trunk finders would then test at each contact that their rear test circuit brushes 527, 528 or 529, 530 ride over. If the primary trunks, say $1P^2T^2_{III}$, $1P^2T^3_{III}$ that the front brushes 545, 546, 547, 548, 549 ... 540, 541, 542, 543, 544, ride over are busy, there will not be sufficient potential on the test contacts 551 and 550 to energize the test relays 523, 524 and the second primary finders, $1P^2F^2_{II}$, $1P^2F^3_{II}$ will continue moving. Eventually one of the finders say $1P^2F^3_{II}$ will reach a second primary trunk $1P^2T^3_I$ that leads to a second secondary trunk finder $1S^2F^3_I$ associated with the group of switches to which the call of the calling subscriber $G^1S^1_I$ has been extended. Assuming that this trunk is free, the test relay 524 and the starting relay 552 of $1S^2F^3_I$ will be energized similarly as the corresponding relays of the first primary and secondary trunk finders $P^1F^3_I$ respectively were energized after the first group selecting operation. The brushes of the second secondary trunk finder $1S^2F^3_I$ will be moved to the second secondary trunk $1S^2T^3_I$ to which $1G^2S^2_I$ is connected and will there be stopped by the identifying relay 554. These functions are all similar to those of the first primary and secondary trunk finders $P^1F^3_I$ and $S^1F^3_I$ and will therefore be understood without further description. The test relay 524 will have closed a locking circuit for itself through its contact $562^1$ and the negative pole of the battery will have been disconnected from the starting wire $105^1$ by the relay 200 which was energized together with the test relay 524 by a current that flowed from the positive pole through 197, 200, 208, 262, $210^1$, $514^c$, 527, 561, 524, 541, $561^1$, 562, 552, 563, 564, 198, 565 to the negative pole. This disconnecting of the negative pole from the wire $105^1$ will have stopped all the second primary trunk finders that were still moving unless the negative pole was kept connected to $105^1$ by some other group selector than $1G^2S^2_I$.

The locking circuit of the test relay 524 will at first be extended from the negative pole through 566, Fig. 11, 552, 562, 561, 541, 524, $562^1$, $2rw^3$, 605, 600 to the positive pole, and after the second secondary finder $1S^2F^3_I$ has connected the primary trunk $1PT^3_I$ to the second secondary trunk $1S^2T^3_I$ this locking circuit will also extend through $562^1$ to 542, 567, $2r^1w^3$, 570, $1rw^3$, 141, 169 $1r^1w^3$, 250, 255, $rw^2$, 89, 88, 99 to the positive pole.

The identifying relay 554 of the second secondary trunk finder will be energized by a locking circuit that extends from the positive pole 99 88, 89, $rw^2$, 255, 250, $1r^1w^3$, 169, 141, $1rw^3$, 570, 559, winding 558, 560 to the negative pole. The current supply for the locking circuits of the identifying relays 231, Fig. 9 and 554, Fig. 11, and of the test relays 124, Fig. 10, and 524, Fig. 12, will depend entirely on the release relay $r^2$, Fig. 8, when the contact 605, Fig. 13 is opened as will be subsequently described, and the deenergizing of the identifying relays and test relays cause the disruption of the connection and makes the various switches ready for use in a new connection. The line of the calling subscriber has now been extended to an idle final trunk $1F^2T^3{}_{II}$ or final selector $1L^2W^3{}_{II}$ in the second hundred group of the first thousand and a selecting circuit including the selecting relay 610 of the final selector will be established as follows: $B^2$, 610, 607, $ay$, 543, $663^1$, $ax$, 556, 569, $a^2s$, 256, 142, 172, $a^1p$, 244, 249, 258, $a^1s$, 96, 30, $a^2{}_I$, 84, 86, 2, $C^1S^1{}_I$, 3, 87, 85, $b^2{}_I$, 31, $b^1s$, $r^2$, positive pole of exchange battery. All that is now required to complete the connection with the wanted line No. 1234 is to set the final selector $1L^2W^3{}_{II}$ onto the 34th line in the selected hundred group. But before the operation of the final selector is explained the group distinguishing means of the primary trunk finders will be more fully described.

The group distinguishing means of each primary trunk finder consists of its rear or upper sets of fixed contacts, such as the sets of contacts $513^c$, $514^c$, $513^d$, $514^d$ ... $515^c$, $516^c$, $515^d$, $516^d$ ... $517^c$, $518^c$, $517^d$, $518^d$ of the primary trunk finder $1P^2F^3{}_{II}$ and of its upper set of brushes, such as the brushes 527, 528, 580 of $1P^2F^3{}_{II}$, Fig. 12.

It has been shown that when a call is extended from the group selector say $1G^2S^2{}_I$ of a certain set of secondary trunks $1S^2T^1{}_I$, $1S^2T^2{}_I$, $1S^2T^3{}_I$ certain pairs of corresponding sets of group distinguishing contacts $513^a$, $514^a$, $513^e$, $514^e$ ... $513^b$, $514^b$, $513^f$, $514^f$ ... $513^c$, $514^c$, $513^d$, $514^d$ in the primary trunk finders Fig. 12 are rendered active and when a finder, say $1P^2F^3{}_{II}$, stops on a pair of group distinguishing contacts, say, $514^c$, $514^d$, it connects a certain one of these contacts $514^d$, to a corresponding contact $514^e$ of a primary trunk $1P^2T^3{}_I$. By this means the identifying wire $id^2$ of the primary trunk is given an independent connection through $514^e$, the brushes 540 and 580, $514^d$, $514^1$ to a contact 260 of a certain group selector $1G^2S^2{}_I$ of the system. If the call had been extended through the other group selector $1G^2S^1{}_I$ the group distinguishing brushes would have stopped on the other pair of contacts $513^c$, $513^d$ and then the other identifying wire $id^1$ of the primary trunk $1P^2T^3{}_I$ would have been given an independent connection through $513^c$, 540, 580, $513^d$, $513^1$ to the contact $260^1$ of the other group selector $1G^2S^1{}_I$. Thus when a primary trunk finder has stopped with its upper brushes on a certain pair of contacts it associates the primary trunk upon which the lower set of brushes is standing with one certain set of group selectors, $e.$ $g.$ $1G^2S^1{}_I$, $1G^2S^2{}_I$, in the exchange and with a certain group selector in this set, or in other words the primary trunk finder makes distinctions between the various groups of group selectors from which calls may be extended to it. It is by this means that the secondary trunk finder, say $1S^2F^3{}_I$, of a primary trunk $1P^2T^3{}_I$ is prevented from making wrong connections when several connections are being established through the system at the same time.

To illustrate some of the confusion that is prevented by the group distinguishing and group-selector-identifying means the results of the omission of this means will be considered. All the wires of the various sets of selecting wires might then be assumed to be connected to common wires as in the case of the wire $105^1$. When, with this arrangement, a call is extended from any group or over any set of wires $1SW^2{}_I$, $1SW^2{}_{II}$ or $1SW^2{}_{III}$ all the contacts of the top horizontal rows of contacts or of the second rows of contacts traversed by the brushes 527, 528, etc., would be connected to the positive pole of the battery and therefore the test relays, such as 524, would test every primary trunk that is passed by the test brushes, such as 541. It may happen that at a moment when a call has been extended from the group selector $1G^2S^2{}_I$ to the primary trunk finders of Fig. 12, another call from a group selector of the third thousand group that corresponds to the primary trunks $1P^2T^1{}_{III}$, $1P^2T^2{}_{III}$, $1P^2T^3{}_{III}$, has been extended to some other group of primary trunk finders than those of Fig. 12. The test relay of a primary trunk finder of Fig. 12, say 524, could then be energized when the test brush 541 reaches the test contact 550 that will have been connected to the negative battery pole by the group selector of the third thousand group. The primary trunk finder $1P^2F^3{}_{II}$ will then stop on the primary trunk $1P^2T^3{}_{III}$ and then the secondary trunk finder belonging to $1P^2T^3{}_{III}$ will probably extend the calling subscriber in third thousand group to the final selector $1L^2W^3{}_{II}$ of the second hundred group in the first thousand while this calling subscriber is wishing to be extended to some other hundred group. All such confusion is prevented by the calling-group-distinguishing-means of this invention which is so arranged that a primary trunk finder will not attempt to connect a primary trunk to a sub-group of lines unless there is a subscriber in the calling group to which the primary trunk extends that desires a connection with the said sub-group.

The number of contacts and brushes employed in the primary trunk finders may be reduced if additional relays are used as shown in Fig. 14. In this figure all the principal parts that correspond to similar parts in Figs. 11 and 12 have similar signs of reference. As all primary trunk finders are alike only one primary trunk finder is shown in Fig. 14 and only one secondary trunk finder $1S^2F^1_I$ is shown because all secondary trunk finders are also alike.

The operations of the switches of Fig. 14 in extending a call—which will be assumed to have arrived at the secondary trunk $1S^2T^3_I$—to a final trunk will now be described. It will be supposed that the selector connector $1S^2C^2_I$ has connected the trunk $1S^2T^2_I$ to the group selector $1G^2S^2_I$ and that the calling subscriber has set the brushes 586, 587 of this selector onto the contacts 718, 719 of the set of selecting wires $1SW^2_I$. The negative pole will then be connected through the interrupter 722 and through 720, 592, 587, 719, to the starting wire $105^1$ and the driving magnets of the primary trunk finders $1P^2F^1_{II}$, etc., will be energized. The current through the driving magnet 520 of $1P^2F^1_{II}$ may be traced from the negative pole through 722, 720, 592, 587, 719, $105^1$, 723, 724, 725, 520 to the positive pole. The group distinguishing contact $514^s$ will be connected through $586^1$, 586, 593, and 726 to the negative pole and the moment the brush 584 has been moved to $514^s$—assuming that it does not strike upon a live contact before this time—a test current will flow from the negative pole through 726, 593, 586, $586^1$, $514^s$, 584, 730, 733, test relay 728, test brush 734, test contact 735, 710, 713, 715, 564, contact 721, which is controlled as previously described by the change-over relay of the group selector, to the positive pole. It will be assumed that the primary trunk $1P^2T^1_I$ is idle and that the potential on the test contact 735 is consequently high enough to cause the energization of the test relay 728. This relay will open the circuit of the driving magnet 520 at 725 and will close a locking circuit for itself through its contact 730. By its contact 729 it will open the circuit of the second test relay 727 so as to prevent this relay from being energized by any applications of the negative pole to the contact $513^s$ through such group selectors as $1G^2S^1_I$. Another important function of the test relay 728 is the closure of the identifying contact $732^1$ by which the secondary trunk finder $1S^2F^1_I$ is enabled to identify the secondary trunk $1S^2T^2_I$ to which the group selector $1G^2S^2_I$ that extended the call to $1P^2F^1_{II}$ is connected. If it had been the other group selector $1G^2S^1_I$ that had extended the call the other test relay 727 would have been energized and the other group-selector-identifying-contact 732 closed. This would result in the secondary trunk finder moving its contact onto the secondary trunk to which the group selector $1G^2S^1_I$ is connected, e. g., $1S^2T^1_I$.

When the test relay 728 is energized in the manner described in the preceding paragraph the relays 593 and 713 are also excited. The latter relay closes the circuit of the driving magnet 717 at 716 and a locking circuit for itself through its contact 714. The relay 593 closes the circuit of a relay 589 at 594 and the relay 589 thereupon opens the contact 592. By this means the negative pole of the exchange battery is disconnected from the starting wire $105^1$ and the other primary trunk finders in the same group as $1P^2F^1_{II}$ are thus stopped.

Meanwhile the brushes 596, 597, 598, 599, 700 of the secondary trunk finder $1S^2F^1_I$ are being moved over their bank contacts by the driving magnet 717. When these brushes reach the secondary trunk to which the group selector $1G^2S^2_I$ is connected the identifying relay 708 identifies it and a current flows from the negative pole through $732^1$, winding 750 of the relay, 758, 751, 756, 759, $ax$, 703, 706, 599, $588^1$, 588, starting relay 185 of the selector connector $1S^2C^2_I$, 595 to the positive pole. The identifying relay 708, the relay 758 and the starting relay 185 are thus energized. The identifying relay 708 opens the circuit of the relay 713 and this in turn opens the circuit of the driving magnet 717, at 716. By opening its contacts 701, 708 and by closing 702, 704 the identifying relay 708 disconnects the wires $ax$, $bx$ from its windings 706, 707 and extends them to the brushes 596, 597 which correspond to the talking circuit brushes 568, 569 of Fig. 11. Through contact 705 the release wire $rx$ is extended to the brush 598 and thence through wires corresponding to $1rw^3$, $rw^2$, Figs. 11, 10 and 9, to contacts corresponding to 98 and 99 of Fig. 8 and to the positive pole of the battery. A locking current then flows from the positive pole through 705, 709, 707, 711 to the negative pole which keeps the identifying relay 708 energized until the end of the connection. A locking current also flows from the positive pole through 705, $rx$, 735, 734, 728, 736 to the negative pole and this keeps the test relay 728 energized. The test relay 728 short-circuits a part of its winding and thus lowers the potential sufficiently on the test contacts in the other primary trunk finders that have access to $1P^2T^1_I$ to prevent another finder from stopping on $1P^2T^1_I$.

The relay 758 which was energized simultaneously with the identifying relay 708 closes its contacts 760, 753, 752, 761 and opens the contacts 751, 754. It thus extends the talking wires $ax$, $bx$ through 756, 757, 760, 753 to the talking wires $ay$, $by$ of the final trunk $1F^2T^1_{II}$ and closes a locking circuit for itself which extends from the positive pole through 752, 750, 732¹ to the negative pole. If the other identifying contact 732 had been closed the locking circuit would have extended from the positive pole through 761, 755, 732 to the negative pole.

The locking circuits of the test relay 728 and of the through-connecting relay 758 depend upon the connection of the positive pole to the release wire through the contact 88. Fig. 8 of the first secondary trunk in the chain of trunks of which the connection is built up and thus the restoration of the relays 758, 728 is made dependent on the release relay $r^2$ Fig. 8.

It will now be evident that all of the primary trunk finders may be provided with the circuits shown in Fig. 14 instead of being arranged as shown in Figs. 10, and 12 and that all the secondary finders of Figs. 9 and 11 may be substituted by secondary finders of the kind shown in Fig. 14.

The description of the operations involved in connecting the calling subscriber $C^1S^1_I$ to No. 1234 in the system illustrated in Figs. 7, 8, 9, 10, 11, 12 and 13 will now be resumed.

It will be remembered that all these operations had been described up to the point where the calling subscriber $C^1S^1_I$ Fig. 7 was connected to the final selector $1L^3W^3_{II}$ and where a selecting circuit including the selecting relay 610, Fig. 13, and the release relay $r^4$ Fig. 8 was established.

The energization of the relay 610 results in the closure of a circuit from the positive pole through 601, 616, 602 to the negative pole. The release relay 623 is then energized by a current from the positive pole through 604, 623, 619 to the negative pole and a locking circuit for 602 is maintained from the positive pole through 621, 603, 602 to the negative pole.

As the calling subscriber $C^1S^1_I$ wishes to be connected to the 34th subscriber of the selected hundred group he will cause three interruptions of the selecting circuit by his impulse transmitter 101 and the armature of the selecting relay 610 will drop back three times and three impulses will flow from the positive pole through 604, 617, 660, lifting magnet 635 of the final selector, which may be assumed to be of the up-and-around type, to the negative pole. The brushes $a2$, $b2$, $c2$ will then be lifted up to the third contact level. A pause will now ensue in the sending of selecting impulses and during this pause the change-over relay 624 will be steadily short-circuited by the contact 619 so that it will be deprived of the current that it received from the positive pole through 604, 623, 624 to the negative pole. Thus the armature of the change over relay 624 drops back and a change over impulse flows from the positive pole through 604, 616, 625, off-normal contact 630, which was closed at the first upward step of the brushes $a2$, $b2$, $c2$, 628, 637 to the negative pole. The relay 637 then disconnects the lifting magnet 635 at 660 and connects instead the turning magnet 636 to the contact 617.

The calling subscriber $C^1S^1_I$ now works his impulse transmitter 101 once more and causes four breaks of the selecting circuit. The armature of the selecting relay 610 will now drop back four times and four impulses will flow from the positive pole through 601, 617, 661, 636 to the negative pole. The turning magnet 636 is thus caused to move the brushes onto the fourth set of contacts in the third level and the wanted line No. 1234 will then be selected. The change-over relay 624 will now again be steadily short-circuited by the contact 619 and the contact 625 will be closed. The positive pole of the battery will then be applied to the test relay 640 over the following path: positive pole 604, 616, 625, 630, rotary off-normal contact 629, that was closed when the brushes $a2$, $b2$, $c2$ executed their first rotary step, test relay 640. If the wanted line is free a current of sufficient strength to energize the test relay will flow through 640, $c2$, test wire $d$1234 (not fully shown) of the wanted subscriber, winding of the cut-off relay of this subscriber (similar to 83 of $b^1$) to the negative pole. The test relay 640 will then close its contacts 641, 642, 643 and 644. The contact 641 short-circuits a part of the test relay winding and renders the wanted line busy. Contact 642 closes the circuit of a relay 647 which extends from the positive pole through 647, 642, interrupter 609, 606 to the negative pole, and the relay 647 now intermittently connects a ringing machine 650 through the contacts 646, 648 to the wanted line. The contacts 643, 644 prepare the circuit of a relay 615. When the wanted subscriber responds a current flows from the positive pole through the upper winding of 615, 644, 645, $a2$, called subscriber's line and station and back to the exchange to $b2$, 649, 643, $by$, 544, 663, $bx$, 555, 568, $b^2s$, 287, 143, 177, $b^1p$, 245, 248, 259, $b^1s$, 93, metering relay $mr$ to the negative pole. The metering relay momentarily applies the positive pole through the contacts 91, 92 directly to the brush $c^2_I$ of the line finder $1F^2_I$ used for the connection and the current flowing through the meter is thus momentarily strengthened sufficiently to attract its armature and to record the conversation. The meter relay also opens a contact 96 and thus interposes a condenser 98 in the talking wire $a^1s$ between the calling station and the final selector, and by closing its contact 95 it establishes a new current path through the calling subscriber's station which may be traced from the negative pole through $mr$, 95, $a^1s$, 30, $a^2_{I}$ 84, 86, 2, $C^1S^1_{I}$, 3, 87, $b^2_{I}$, 31, $b^1s$, $r^2$ to the positive pole of the battery. At its contact 93 the metering relay $mr$ disconnects itself from the part of the wire $b^1s$ that extends toward the final selector and by its contact 94 it closes the normal opening in the wire $b^1s$.

The relay 615 at the final selector disconnects the selecting relay 610 from the talking wire $ay$ and completes another independent circuit for it through a contact 608. By this means the control of the release of the final selector is transferred to the wanted subscriber. Through its contact 614 the relay 615 closes a current supply circuit for the wanted subscriber which extends from the negative pole through 614, 643, 649, $bz$, wanted subscriber, back to the exchange $az$, 645, 644, upper winding of 615 to the positive pole.

The calling and called subscribers are connected to each other over the following path: $C^1S^1_{I}$, 2, 86, 84, $a^2_{I}$, 30, $a^1s$, 98, 258, 249, 244, $a^1p$, 172, 142, 256, $a^2s$, 569, 556, $ax$, 663$^1$, 543, $ay$, 613, 644, 645, $az$, wanted subscriber, back to the exchange $bz$, 649, 643, $by$, 544, 663, $bx$, 555, 568, $b^2s$, 257, 143, 177, $b^1p$, 245, 248, 259, 94, 97, $b^1s$, 31, $b^2_{I}$, 85, 87, 3, $C^1S^1_{I}$.

If the calling subscriber hangs up his receiver first at the end of the conversation the disruption of the connection will be caused by the deënergization of the relay $r^2$ through which the calling subscriber received his supply of current. The opening of the contact 88 of $r^2$ deprives the relays 18, 231, 124, 222, 554, 524, 552 of their connection to the positive pole of the battery so these relays are all deënergized and the talking connection broken at several points. The brushes of the various switches that were used for the connection may remain in the positions to which they have been set until they are moved to different positions in establishing another connection. Possibly they or some of them will establish the next connection without being moved at all.

If the called subscribed replaces his receiver before the calling subscriber the disruption of the talking connection will be caused by an alternating current being sent from the ringing machine 632 through 631, 620, $2rw^3$, 542, 567, $2r^1w^3$, 570, $1rw^3$, 141, 169, $1r^1w^3$, 250, $rw^2$, condenser 90, auxiliary release relay $r^1$, to the positive pole. The relay $r^1$ then disconnects the positive pole from the release wire and the relays 18, 231, 124, 222, 554, 524, 552 are thus deënergized as in the case of the disruption by the calling subscriber.

The connection of the ringing machine 632 through 631 and 620 to the release wire $2rw^3$ is caused by the deënergization of the relay 615 when the called subscriber replaces his receiver. The relay 615 opens the holding circuit of 610 at 608, and the relay 610 then short-circuits the release relay 623 by its contact 618. The release relay 623 then connects the ringing machine 632 through 620 to the release wire $2rw^3$, and closes the circuit of the release magnet 634 of the final selector at 622. The current through 634 then flows from the negative pole through 622, 634, 639 to the positive pole and the release magnet 634 restores the final selector to its normal position.

The detraction of the armature of the release relay 623 also causes the locking circuit of the relay 602 to be opened at 621. When the final selector reaches its normal position the locking of the relay 634 is also opened. The connection between the positive battery pole and the test relay 640 is opened at 621 in the moment the release relay 623 armature drops back, and unnecessary applications of a test current to the test wires that the brush $cz$ passes over during the restoring movement are thus prevented.

If the wanted subscriber is engaged at the moment the relay 640 tests the wanted line, the test relay 640 will not be energized and a busy signal current will be applied to the calling end of the line from 633 through 626, 627 and 612. This current will flow to the calling station $C^1S^1_{I}$ and ultimately through the release relay $r^2$ and back to 633. The calling subscriber will then replace his receiver and thus break the circuit of the selecting relay 610 which will then cause the deënergization of the release relay 623 and the restoration of the final selector in the manner already described. The slow-acting release relay $r^2$ will also be deënergized by the replacement of the calling subscriber's receiver and this will result in the disconnection of the positive pole from the release wire and in the deënergization of the relays 18, 231, 124, 222, 554, 524 and 552.

Figure 15:
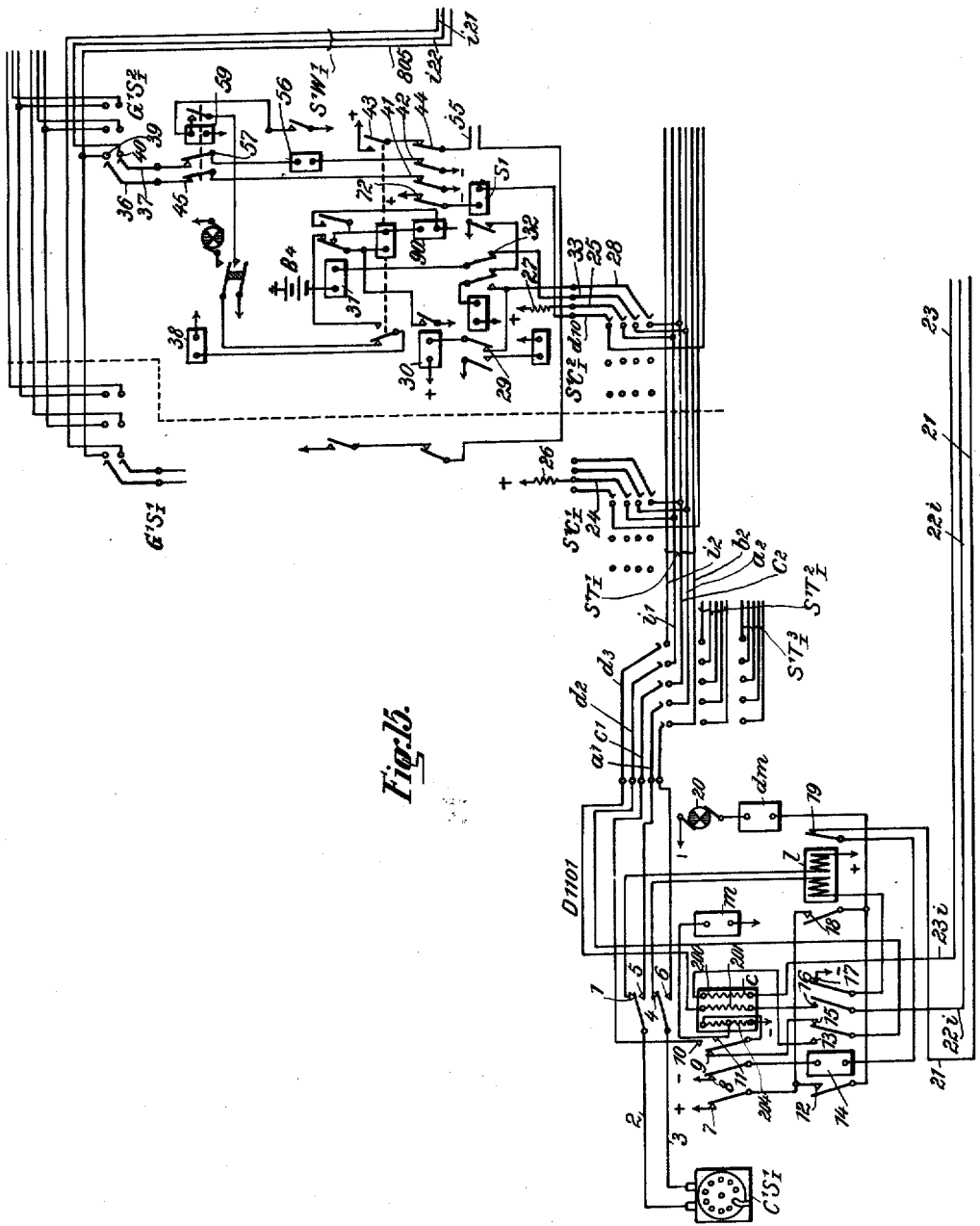
Figure 16:
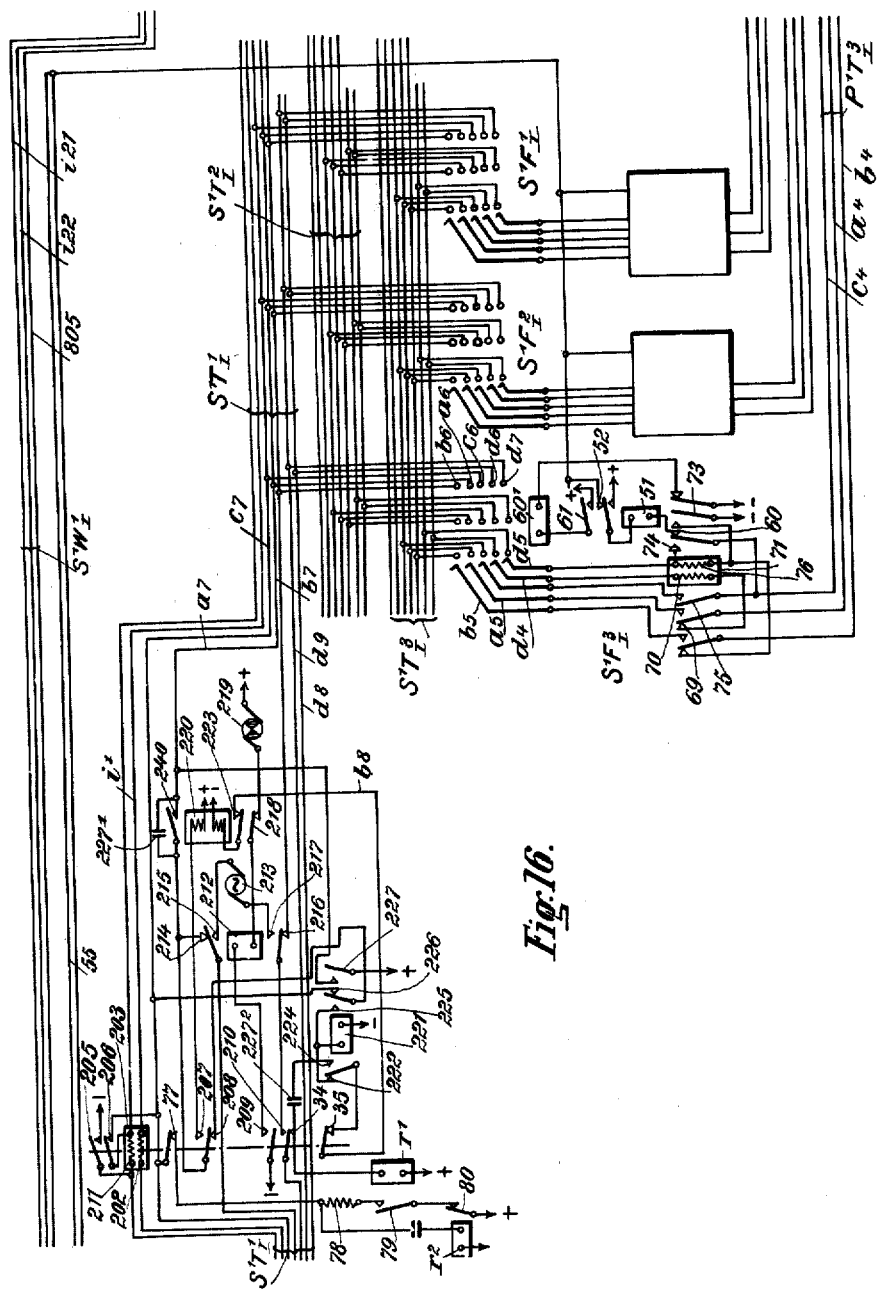

In the system shown in Figs. 7 to 13 one final selector per final trunk is employed. An economization may be effected by using a small percentage of final selectors per hundred group for the selecting function only and by restoring the final selectors to common use when the selecting function has been performed. A system of this kind has already been outlined with reference to Figs. 5$^a$ and 5$^b$, and in Figs. 15 to 18$^a$ the changes which have to be made in a system built according to Figs. 7 to 13 or 14, in order to produce a system according to Figs. 5$^a$ and 5$^b$, are illustrated. As has already been explained the principal changes are first, that the subscribers are each provided with a distributing switch, instead of line finders being provided for each group of subscribers and secondly, that the final trunks merge into first secondary trunks. Figs. 15, 16, 17 and 18 should be placed side by side and Fig. 18ᵃ above Fig. 18. In Fig. 15 D1101 represents the distributing switch of a subscriber $C^1S^1_I$ and $S^1T^1_I$, $S^1T^2_I$, $S^1T^3_I$ in Figs. 15 and 16 represent first secondary trunks that correspond to similar trunks of Figs. 7 and 8. In Figs. 16 and 17 primary trunks $P^1T^1_I$, etc., secondary trunks $1S^2T^1_I$, etc., primary trunk finders $P^1F^1_I$, etc., and secondary trunk finders $S^1F^3_I$, etc., are shown all of which correspond, in their functions and in their general relations to each other, to the similarly designated parts in Figs. 9 and 10. The second secondary trunk finders that coöperate with the second secondary trunks $1S^2T^1_I$, etc., Fig. 17 are shown. In Fig. 18ᵃ $1P^2F^1_I$, etc., represent the second primary trunk finders that are associated with the final trunks $1F^1T^1_I$, etc., which lead say to the first hundred group of the first thousand. These final trunks merge into the first secondary trunks $S^1T^1_I$, etc., of the first hundred group of the first thousand in accordance with Figs. 5ᵃ and 5ᵇ. The primary and secondary trunk finders, selector connectors and group selectors Figs. 16, 17 and 18 may all correspond to those shown in Figs. 10, 11 and 12 or 14. Alterations are made in the first selector connectors $S^1C^1_I$, etc., Fig. 15, and in the apparatus associated with the first primary trunks $S^1T^1_I$, etc., Fig. 16. The other alterations consist in final selector connectors $1FS^2C^1_{II}$, etc., Fig. 18, being provided for connecting final selectors $1L^2W^1_{II}$, etc., to idle final trunks $F^1T^1_I$, etc., and in the provision of the distributing switches D1101, etc., which have been already mentioned. All these alterations will be understood from the following description of the operations of the circuits.

It will be assumed that subscriber $C^1S^1_I$ who has the line No. 1101 connects his line to that of subscriber No. 1102 who is provided with precisely the same kind of apparatus as No. 1101 and whose apparatus may therefore be omitted in the drawings.

When the subscriber $C^1S^1_I$ removes his receiver, a current flows from the positive pole through right hand winding of the line relay $l$, 1, 2, $C^1S^1_I$, 3, 4, left winding of 1, 17 to the negative pole. The line relay is energized and closes at 18 the circuit of the driving magnet $dm$ of the distributing switch D1101, while opening contact 19 and thus disconnecting the relay 14 from the wire 21 that extends from the final selectors $1L^2W^1_{II}$, etc., Fig. 18, and thus causing the calling line to appear busy at the final selectors.

The circuit of the driving magnet $dm$ may be traced from the positive pole through 7, 18, $dm$, interrupter 20 to the negative pole. The driving magnet $dm$ now moves the brushes $a^1$, $b^1$, $c^1$, $d^2$, $d^3$ of distributing switch D1101 over the sets of contacts representing the first secondary trunks. Some of these trunks, say two, will have been connected by selector connectors $S^1C^1_I$, $S^1C^2_I$ to first group selectors $G^1S^1_I$, $G^1S^2_I$ in the manner already described with reference to Figs. 8 and 9. When a selector connector, say $S^1C^2_I$ Fig. 15 stops on a secondary trunk, say $S^1T^1_I$, it connects the positive pole of the battery through 27, and its brush 25 to the wire $i^1$ of the secondary trunk. When the traveling brushes of the distributing switch D1101 of a calling subscriber reach a secondary trunk $S^1T^1_I$ whose wire $i^1$ is connected to the positive pole, a current flows from the negative pole through 204, contacts 9, 15, brush $d^2$, wire $i^1$, brush 25, 27 to the positive pole and the relay $c$ of the calling subscriber is thus energized and the circuit of the driving magnet is broken at 7. The relay $c$ also opens the contacts 1, 4, 8, 9 and closes the contacts 5, 6, 10 and 11. Through the contacts 5 and 6 the calling subscriber's line 2, 3 is extended to the brushes $a^1$, $b^1$ and through the contact 10 the circuit of the relay $c$ is extended through the brush $c^1$, wire $c^2$, brush 28 of $S^1C^2_I$, contact 29, relay 30 to the positive pole. A selecting circuit is closed through 2, 3 which extends from the battery $B^4$ through the selecting relay 31 of the group selector $G^1S^2_I$, 32, 33, $a^2$, $a^1$, 5, 2, $C^1S^1_I$, 3, 6, $b^1$, $b^2$, 34, release relay $r^1$ to the positive pole. The calling subscriber, who wishes to be connected to No. 1102, now causes one interruption of the selecting circuit and the selecting relay 31 allows its armature to execute one oscillation. This results in the stepping magnet 38 of the group selector $G^1S^2_I$ receiving one impulse by circuits similar to those of the group selector of Fig. 8 and the brushes 36, 37 of $G^1S^2_I$, Fig. 15, are thus moved onto the contacts 39, 40 of the selecting wire $S^1W^1_I$ leading to the primary finders $P^1F^1_I$, etc., that extend connections from the calling subscribers of the first thousand to called subscribers in the first thousand. When the change-over takes place as previously described the group selector connects the negative pole through 41, 45, 36 to the starting wire 805 of the primary trunk finders, which excites the driving magnets, such as 46, of these finders and sets their brushes $a^3$, $b^3$, $c^3$, 53, 54, etc., in motion. The change-over in the group selector also caused the positive pole to be connected through 43, 44, 55, 52 to the windings of the relay 51 of $S^1F^3_I$ and of the other similar relays in the other secondary trunk finders $S^1F^2_I$, etc. Another result of the change-over is the connection of the negative pole through 42, 56, 57, 37, 40 to the group-selector-identifying-and-calling-group-distinguishing wire $i^{22}$. It will be assumed that the primary trunk $P^1T^3_I$ is idle and that the primary trunk finder $P^1F^1_I$ is the first of the set to which it belongs to strike upon the contacts of this trunk. A current will then flow from the negative pole Fig. 15 through 42, 56, 57, 37, 40, $i^{22}$, 54, 57, 56, 58, $c^3$, 59, $c^4$, 60, 51, 52, 55, 44, 43 to the positive pole. The test relay 58, the starting relay 51 and the relay 56 are thus energized. The relay 56 causes the energization of relay 59, which disconnects the negative pole from the starting wire 805 and from the wire $i^{22}$, thus stopping the other primary finders $P^1F^2_I$, etc., and preventing these finders, when operated by calls from other calling groups, from testing and stopping on primary trunks $P^1T^1_I$, etc., that lead to the group whose call has already been extended to a second secondary trunk $1S^2T^1_I$.

The test relay 58 opens the circuit of the driving magnet 46 at 49 and closes the group-selector-identifying-contact 50. The starting relay 51 closes the circuit of the driving magnet $60^1$ at 61 and the brushes of the secondary trunk finder $S_1F^3_I$ now travel over the fixed contacts of the secondary trunks until the trunk $S^1T^1_I$, to which the group selector $G^1S^2_I$ is connected, is reached, when a current will flow from the negative pole through 50, winding 63 of the relay 64, 68, $a^3$, $a^4$, 69, winding 70 of relay 71, $d^4$, $d^6$, $d^8$, $d^{10}$, starting relay $s^1$ of the selector connector 72, to the positive pole. The relays 64, 71 and $s^1$ are thus energized. The relay $s^1$ starts the selector-connector $S^1C^2_I$ operating causing it to connect its group selector to another secondary trunk that is idle and that is not already connected to a group selector. The relay 71 closes a locking circuit for itself which extends from the negative pole through 73, winding 76, 74, 75, $c^5$, $c^6$, $c^7$, 77, 78, 79, 80 to the positive pole. The relay 64 is locked by a circuit extending from the positive pole through 65, 63, contact 50 of the test relay 58 to the negative pole and the test relay 58 is kept energized by a current which flows from the positive pole Fig. 16 through 80, 79, 78, 77 and through the release wire $c^7$, $c^6$, $c^5$, $c^4$, $c^3$, lower winding of 58, 81 to the negative pole.

From the above description of the first group selecting and trunk finding operations of Figs. 16 and 17 it will appear that these operations are substantially the same as those of Figs. 8, 9 and 10 or 14. The second group selecting and trunk finding operations by which an idle final trunk leading to the desired group of subscribers is obtained are also similar and therefore need not be described. As the calling subscriber is establishing a connection with another subscriber No. 1102 of his own hundred group, the second group selecting and trunk operations will result in the connection of the calling subscriber $C^1S^1_I$ being extended by a second primary trunk finder, say $1P^2F^2_I$ Fig. $18^a$ to a final trunk $1F^1T^2_I$ leading to the wanted hundred group. This final trunk will, of course, be one that does not merge into the first secondary trunk $S^1T^1_I$ which is already engaged by the calling subscriber. But to simplify the drawings only one complete compound trunk $S^1T^1_I$—$1F^1T^1_I$ is fully illustrated and, for convenience, it will now be assumed that the compound trunk $S^1T^1_I$—$1F^1T^1_I$ is idle. It will be further assumed that, as a result of circuits which will be described later, a final selector $1L^2W^1_{II}$ Fig. 18 has been connected to this compound trunk. The brushes $a^8$, $c^8$, $id^8$, $e^8$ will then be resting on the contacts $a^9$, $c^9$, $id^9$, $e^9$ of $1F^1T^1_I$.

When the negative pole of the battery was connected to the starting wire $105^1$ Fig. $18^a$ by the change-over relay analogous to 90, Fig. 15, after the second group selecting operation, only the second primary trunk finders were started whose final trunks were connected by final selector connectors to final selectors. Assuming for example that the final trunk $1F^1T^1_I$ is connected by $1FS^2C^1_{II}$ to the final selector $1L^2W^1_{II}$ the driving magnet 91 of the primary trunk finder $1P^2F^1_I$ will be energized by a current flowing from the negative pole in the second group selector (not shown) to the starting wire $105^1$ and thence through the driving magnet 91, 92, 93, 94, $e^9$, battery supply relay 95 to the positive pole. It will be noted that the driving magnets of primary finders whose final trunks are not connected to final selectors will not have any connection to the positive pole of the battery through their wires that correspond to 94, for these wires would end in unconnected contacts corresponding to the contact $e^9$ of $1FS^2C^1_{II}$. The circuits may, however, be arranged and preferably will be arranged as shown in Fig. 23 so that all the second primary trunk finders of idle compound trunks will operate when the starting current is sent through the starting wire $105^1$ and that a final selector connector will connect its final selector to a compound trunk after this trunk has been connected to an idle second primary trunk, for example, $1P^2T^1_I$.

When the compound trunk arranged as shown in Fig. 18 has been connected to an idle second primary trunk the calling subscriber's line will be extended through the various primary and secondary trunks, to the compound trunk, and a selecting circuit will be completed which extends from the battery $B^6$ in the particular final selector $1L^2W^1_{II}$ through the selecting relay 100, contact 95 of the starting relay $s^3$, $a^8$, $a^9$, through all the switches and trunks interposed between the final trunk and the first secondary trunk $S^1T^1_I$ to which the calling subscriber is connected by the distributing switch D1101, Fig. 15, $a^2$ of $S^1T^1_I$, $a^1$, 5, $C^1S^1_I$, 3, 6, $b^1$, $b^2$, 34, release relay $r^1$ to the positive pole. The calling subscriber, who wants the subscriber No. 1102, now causes ten interruptions of the selecting circuit just traced and this will result in ten detractions of the armature of the selecting relay 100 of the final selector. At each detraction an impulse will flow from the positive pole through 101, 102, 103, lifting magnet 112 to the negative pole. The magnet will then lift the brushes $sa$, $sc$ of the final selector, which may be assumed to be of the up-and-around-type, to the tenth row of bank contacts. After the ten tens selecting impulses have been sent an interval of steady closure of the selecting circuit ensues during which the short-circuiting contact 106 is closed and during which the change over relay 113, which had been energized in the manner described in Fig. 13, is deënergized. A change-over impulse then flows from the positive pole through 109, 111, off-normal contact 115, which was closed at the first upward step of the brushes $sa$, $sc$, rotary off-normal contact 118, relay 120 to the negative pole. The relay 120 is thus excited and changes the connection of contact 102 from 103 to 104, while closing a locking circuit for itself through 121 and 122 to the positive pole. The calling subscriber now sends in two units selecting impulses which result in two further detractions of the armature of the selecting relay 100 and in two impulses flowing from the positive pole through 101, 102, 104, turning magnet 123 to the negative pole. The turning magnet 123 turns the brushes $sa$, $sc$ around two steps onto the contacts $i^11102$, $s1102$ of the wanted subscriber. For convenience of illustration, it will now be assumed that the subscriber's station $C^1S^1_I$ is the called station No. 1102, and that the wires from the contacts $i^11102$, $s1102$ of the final selector lead to the distributing switch D1101 as shown. In reality they would, of course, lead to another switch D1102 (not shown) similar to D1101. It will be further assumed that the final trunk $1F^1T^1_I$ is not one that is engaged at the other end $S^1T^1_I$ by the calling subscriber, but that it is disengaged at his end and may be used for completing the connection with the called subscriber No. 1102.

When the change over takes place in the final selector after the units selecting impulses cease, the positive pole of the battery will be applied to the test relay through the contacts 101, 114, 111, 115, off-normal contact 119 which was closed at the first rotary step of the brushes $sa$, $sc$. If the wanted line is free the circuit from the positive pole will continue through the test relay 127, brush $sc$, test contact $s1102$, test wire 21, Figs. 18 and 15, contact 19 of the wanted subscriber's line relay $l$, wanted subscriber's starting relay 14, 8 to the negative pole. If the wanted line were engaged the potential on the contact $s1102$ would either be too low to energize the test relay or this potential would be entirely absent due to the contact 19 or 8 being open. The contact 19 or 8 is open when the subscriber $C^1S^1_I$ is calling or has called, or when he has been called and connected by his distributing switch to a compound trunk as will presently be described. The test relay 127 when energized closed its contacts 126 and 124 and opened its contact 125. If the wanted line had been engaged the contact 125 would have remained closed and a busy signal current would have been connected from 130, through 131, 125, 95, $a^8$ to the selecting circuit. This busy signal would have been heard by the calling subscriber and on his replacing his receiver the steady detraction of the armature of the selecting relay would have caused the final selector to be restored.

The closure of the contact 126 of the test relay 127 in the case of a free wanted line results in a portion of the winding of 127 being short-circuited and in the immediate lowering of the test potential on the test contacts $s1102$ of the final selectors, making the wanted line appear busy. The relay 14 Fig. 15 which is energized simultaneously with the test relay closes the circuit of the driving magnet $dm$ by its contact 12, this circuit extending from the positive pole through 7, 12, $dm$, interrupter 20 to the negative pole of the battery. The driving magnet $dm$ now moves the brushes $a^1$, $b^1$, $c^1$, $d^2$, $d^3$ of the wanted line's distributing switch over the contacts connected to the compound trunks. The relay $c$ will now act as an identifying relay and will identify the compound trunk $S^1T^1_I$—$1F^1T^1_I$ to which the final selector $1L^2W^1_{II}$ is assumed to be connected. This is accomplished by means of the identifying brushes $sa$ and $id^8$ of the final selector and selector connector and by the identifying circuits $23^1$, $i^1$ that these brushes register with.

When the relay 14 is energized it opens the normal connection from the contact 9 of $c$ through 15 to $d^2$ and prepares instead a final-selector-identifying circuit through $23^1$, identifying winding 200, 13 to $d^2$. Now, when the brushes of the distributing switch of the wanted line reach the compound trunk to which the final selector $1L^2W^1_{II}$ is connected, the identifying circuit of this final selector will be completed as follows: positive pole, contact 124, Fig. 18, brush $sa$, $i^11102$, $23^1$, 200, 13, $d^2$, $i^1$, winding 202 of the converting relay 203, $i^1$, contact $id^9$, Fig. 18, $id^8$, starting relay $s^6$ to the negative pole.

The identifying relay $c$, the converting relay 203 and the starting relay $s^6$ are all energized. The relay $c$ opens the circuit of the driving magnet $dm$ at 7 and connects its own winding 204 through 10 and $c^1$ to the wire $c^2$. This wire extends through the chain of primary and secondary trunk finders that have built up the connection, that is to say, it extends through the wires of the final trunk (say $S^1T^2_1-1F^1T^2_1$) that is connected to the called station, these wires corresponding to the wires $c^2$, Fig. 15, $c^7$, Fig. 16, $c^{10}$, Fig. 17, $c^{11}$, Fig. 18, $c^{12}$ and $c^{13}$, Fig. 18ª of the final trunk $S^1T^1_1-1F^1T^1_1$. The said connection then extends further through conductors in the trunks and switches that form the chain of connections to the calling subscriber, these conductors being a wire $c^{14}$ of the second primary trunk $1P^2T^1_1$ and a brush of a secondary trunk finder (not shown) that has connected to $1S^2T^1_1$, wire $c^{15}$, brush $c^3$, wire $c^4$, brush $c^5$, $c^6$, $c^7$, contact 77, 79, 80, positive pole. Thus a locking circuit will be closed from the negative pole through winding 204 of the identifying relay of the called subscriber, and through the contact 10, brush $c^1$, wire $c^2$ to the positive battery connection that is dependent on the release relay $r^1$ in the first secondary trunk to which the calling subscriber is connected.

The energization of the relay 203 in the secondary trunk to which the called subscriber is now connected results in the closure of the contacts 205, 206, 207, 209, 210, and in the opening of the contacts 77, 208, 34 and 35. A locking circuit is closed for 203 through 205 and 206 which extends from the positive battery connection to the release wire in the secondary trunk to which the calling subscriber is connected, through the primary and secondary trunk finders used for the connection between No. 1101 and No. 1102 through 206, 211, 205 to the negative pole.

At its contact 209 the converting relay 203 closes the circuit of the ringing relay 212 which extends from the negative pole through 209, 212, 218, interrupter 219 to the positive pole. The ringing machine 213 is now connected at regular intervals to the wanted line and these ringing currents flow from 213, through 215, $a^2$, $a^1$, 5 which was closed by the identifying relay $c$, 2, called station, 3, 6, $b^1$, $b^2$, 210, 217 back to the ringing machine 213. When the wanted subscriber responds to the call by removing his receiver from his switchhook in the well known manner, a continuous current flows from the positive pole of the exchange battery through the upper winding of the ringing control relay 220, contact 207, 214, $a^2$, $a^1$, 5, limb 2 of called line, called station, 3, 6, $b^1$, $b^2$, 210, 216, wire $b^7$, through the primary and secondary trunks leading to the first secondary trunk to which the calling subscriber is connected, wires $b^7$ and $b^8$ of this first secondary trunk, contacts 35, 222 and the relay 221 of this trunk to the negative pole. Thus a relay 220 in the secondary trunk to which the called subscriber is connected, and a relay 221 in the first secondary trunk to which the calling subscriber is connected are energized simultaneously when the called subscriber responds to the call. The relay 221 in the first secondary trunk connected to the calling line opens its contact 226 and thus inserts a condenser 227 in the upper limb of the talking circuit so as to form an independent path for a continuous current toward the calling subscriber. Through contact 224 the lower limb of the talking circuit extending from the calling subscriber is closed and through the contact 225 the relay 221 completes a new circuit for itself while opening its first circuit at 222. The new circuit extends from the negative pole through 221, 225, 208, the relay 203 at the calling end of the connection being deënergized, 214, $a^2$ of the first secondary trunk at the calling end of the connection, $a^1$, 5, 2, calling station, 3, 6, $b^2$, 34, release relay $r^1$, to the positive pole. When the relay 221 at the calling end pulls up it also momentarily connects the positive pole directly to the release wire $c^2$ through its contact 227 which is arranged to make only a fleeting connection. The meter $m$ of the calling subscriber is thus energized and caused to record the connection. The ordinary condition of the release wire $c^2$ is then reëstablished so as not to interfere with busy condition on the test wires such as $c^4$, Fig. 16, of the primary trunk finders whose test relays obtain their locking current through the resistance 78 at the calling end of the connection.

At the called end of the connection the relay 220 of the secondary trunk that is connected to the called station supplies transmitter current to the wanted subscriber over the following path: positive pole, upper winding of 220, 207, 214, $a^2$, $a^1$, 5 of the called station, 2, called station No. 1102, 3, 6, $b^1$, $b^2$, 210, 216, 223, lower winding of 220 to the negative pole of the battery. This current path is separated from the calling end of the connection by the condenser $227^1$, $227^2$ at the calling end, the relay 220 at that end being not energized.

A talking connection is now established between the calling and called subscribers which may be traced from the calling station $C^1S^1_1$ and through the following wires and parts of the upper limb of the talking circuit at the calling end: 2, 5, $a^1$, $a^2$, 214, $227^1$ to $a^7$; and through the following parts of the lower limb of the talking circuit at the calling end; 3, 6, $b^1$, $b^2$, 34, $227^2$, 224, 35, to $b^7$. From $a^7$ at the calling end the talking circuit extends through the various secondary and primary trunks interposed between the calling and called ends of the connection to $a^7$ of the secondary or compound trunk at the called end and thence through the following parts at the called end of the connection: 240, 214, $a^2$, $a^1$, 5, 2, called station, 3, 6, $b^1$, $b^2$, 210, 126 to $b^7$. From $b^7$ at the called end the circuit extends back through the primary and secondary trunks interposed between the called and calling ends to $b^7$ at the calling end.

We will now turn our attention to the third relay $s^8$, Fig. 18, that was energized together with the identifying relay $c$ and the converting relay 203 in the identifying circuit of the final selector $1L^2W^1{}_{II}$, Fig. 18. The starting relay $s^6$ when energized closes its contact 250 and thus completes a circuit for the relay $s^3$ which extends from the positive pole through 250, 96, $s^3$, to the negative pole. The relay $s^8$ then closes the circuit of the driving magnet 251 and this drives the brushes $a^8$, $c^8$, $id^8$, $e^8$ forward over the contacts of the final or compound trunks. As long as the brush $c^8$ continues striking busy trunks or trunks to which either another final selector $1L^2W^3{}_{II}$ or a group selector $G^1S^1{}_I$ or $G^1S^2{}_I$ is connected, the relay $s^8$ will be kept energized because the test wires or contacts similar to $c^8$ of these trunks will all be connected by the various means that have already been described to the positive pole. But the moment an idle trunk is reached that has not already been seized by another selector connector the relay $s^8$ will be deprived of current and will allow its armature to drop back. The circuit of the driving magnet 251 will then be opened and the final selector connector $1FS^2C^1{}_{II}$ will seize the final or compound trunk found. While the brushes $a^8$, $c^8$, $id^8$, $e^8$ are traveling the contact 98 is opened and the selecting relay 100 is disconnected at 95, while the battery supply relay $95^1$ is disconnected at 260.

When the selecting relay circuit is opened it steadily short-circuits the release relay 270 at 105. The release relay is then deenergized and closes the circuit of the restoring magnet 280 as follows: negative pole, 107, 280, 122, positive pole. The restoring magnet then restores the final selector $1L^2W^1{}_{II}$ to its normal position.

When the contact 98 is closed on the stoppage of the final selector connector the positive pole is connected to the test wire of the compound trunk seized and this trunk is thus made non-seizable by other selector connectors.

When a connection is made with the wanted subscriber's line No. 1102 with the aid of another final selector $1L^2W^3{}_{II}$ the same test wire 21 but a different identifying wire $22^1$ is used. The final selector $1L^2W^2{}_{II}$ also has identifying wires such as $i^2$, in all the compound or final trunks in its group that are peculiar to itself and to which the negative pole of the battery can only be applied by the identifying brush $id^{10}$ of its connector $1FS^2C^2{}_{II}$. Therefore when the wanted line is connected to by the final selector $1L^2W^2{}_{II}$ and when the distributing switch of this line is set in operation the stopping of this distributing switch will be controlled entirely by the winding 201 that is connected to the positive pole in the final selector $1L^2W^2{}_{II}$ by the wire $22^1$ at its lower end and that can only be connected to the negative pole at its upper end by the brush $d^8$ striking an identifying wire $i^2$ that can only be connected to the negative pole through the brush $id^{10}$ that is associated with the final selector $1L^2W^2{}_{II}$. With identifying circuits of this kind the brushes of a distributing switch which have been started by a final selector pass over all trunks regardless of whether they are busy or have been seized by selector connectors and do not stop until they reach the trunk to which final selector that started them is connected.

When the conversation between the calling and called subscribers is finished and the calling subscriber replaces his receiver on the switchhook the release relay $r^1$ at the calling end is deënergized and the positive pole of the battery is disconnected from the release wire. This results in all the relays that were maintaining the connection being deënergized and in the disruption of the connection.

It has already been stated in preceding paragraphs that when a group selector has selected a desired group of primary trunk finders, all the finders that happen to be idle may be started operating, instead of only such idle finders as have been previously connected to group selectors. The circuits shown in Fig. 23, which enable this to be accomplished, will now be described. In this figure a primary finder PF and the parts of a selector connector SC that coöperate with the primary finder are illustrated.

When the selecting wire SW is selected in the manner previously described by a group selector and the change over has taken place in this group selector, the battery will be connected to the starting wire $105^2$ and the driving magnets $dm^8$ of all primary finders will be energized by currents flowing from the wire $105^2$ through the contacts 901, 902 of their test relays 903, 904. The brush sets of all the primary finders will then be moved until an idle primary trunk, e. g., PT, is found, when a primary finder PF will extend the primary trunk to a secondary trunk ST. The operations involved in these functions are all similar to those already described and it is, therefore, unnecessary to describe them in detail.

When the primary trunk finder stops, one of its test relays say 903 will be energized and the driving magnets $dm^9$, etc., of the idle selector connectors SC are then energized by a current which will flow from the negative pole through 907 of the cut-off relay 908, 905, 909, $dm^9$ to the positive pole. The test relay 903 also connects a stopping potential to the stopping wire 910 of the secondary trunk ST through its contact 906 and when the stopping brush of a selector connector reaches the stopping wire 910 a stopping current flows from the negative pole through 915, 914, 906, 910, 911 stopping relay 912 to the positive pole. The stopping relay 912 then connects the selecting relay $189^1$ of the next group selector to the selecting circuit while the relay 915 disconnects the resistance 918 therefrom. The office of the current path through the resistance 918 is to maintain the current in the circuit of the release relay $r^1$ in the first secondary trunk during the time that the selector connector SC takes to connect the selecting relay $189^1$ of the next group selector to the said release relay or selecting circuit. The stopping relay 912 short circuits a part of its winding by its contact 913 and thus renders the secondary trunk ST unseizable to other selector connectors by lowering the potential on the wire 910.

The calling subscriber now causes interruptions of the selecting circuit, in order to select the next wanted group and the selecting relay $189^1$ then moves the brushes of its group selector as in the cases already described. A primary trunk finder and a secondary trunk finder will then extend the secondary trunk ST to the desired group as in the previous cases. The moment a secondary trunk finder reaches the secondary trunk ST a relay $185^1$ in the selector connector, which is analogous to the starting relays previously described, is energized and this closes a circuit which extends from the positive pole through 920, 921, 908 to the negative pole. The cut-off relay 908 is thus energized and closes a locking circuit for itself through 915 and 922, while opening its contacts 907, 914 and thereby breaking the driving magnet circuit of the selector connectors and disconnecting the stopping potential from the stopping wire. The selector connector SC is then available for another connection.

The relay 908 remains energized by its locking circuit until this circuit is broken at the end of the conversation by the deënergization of the relay 923 similarly as in the circuits previously described.

A characteristic of the new group selecting method forming one of the main features of the present invention is that the group selecting and trunk finding functions are performed by a comparatively small number of small unimotional switches. The total number of primary and secondary trunk finders per group of one hundred subscribers in exchanges where one group selecting act takes place in the establishing of a connection (in exchanges for 100 to 1000 lines) is twice the highest number of simultaneously occurring connections. Assuming that this highest number is 10% the number of trunk finders in a hundred group of a 1000 line exchange would be 20 viz. 10 primary trunk finders and 10 secondary trunk finders. In a 1000 line exchange there would be two sets of trunk finders of 20 each.

A feature of this invention is that the group selecting and trunk hunting devices are built up of units each comprising a complete set of primary trunk finders and a set of secondary trunk finders equal in number to the highest number of simultaneously occurring connections. Assuming that this number is ten, the secondary trunk finders would be built in units of ten. The contact banks of ten secondary finders forming a unit may be built as indicated in Figs. 20 and 21. Each multiple connection and the bank contacts that it joins consists of a metal strip or punching $s$ having a projection $p$ at each place where the moving parts of a finder (Figs. 19 and $21^a$) are placed. In order to make the distance of travel of the brushes $w$, Fig. 19, of the finders short and to reduce the speed of travel and the momentum of the moving parts, the distance from one set of bank contacts to the next represented by $p^1$ and $q^1$, Fig. 21, is reduced to the lowest limit by placing the strips $s$ forming the multiple connections behind each other as shown in Fig. 21. From this figure it will be seen that the one strip $s$ of each set of strips is placed beside the other strips $s^1$, $s^2$, $s^3$, $s^4$ of its set and that the remaining strips $s^1$, $s^2$, $s^3$, $s^4$ are placed in the same level behind each other. The projections $p$, $p^1$, $p^2$, $p^3$, $p^4$ jut out at different points along the face of the contact bank as seen in Fig. 20 and the projections $s^1$ to $s^4$ are bent upward and then in a horizontal direction so that a set of five contacts in the same horizontal line is formed by the projections $p$, $p^1$, $p^2$, $p^3$, $p^4$. Beneath this set of projections or contacts there are nine other similar sets in the same vertical line and the ten sets of contacts thus formed are engaged by five brushes $w$ attached to a movable carrier $c$ Fig. 19. This carrier is guided at its upper and lower ends in a frame F of the contact bank. At its lower end a spring $r$ normally pushes the carrier away from a rotating roller $r^1$, but when the driving magnet M is energized the magnetic carrier $c$ is pulled against the roller $r^1$ and is moved upward by the friction with the roller $r^1$. The moment the brushes $w$ are thus moved a slight distance toward the next set of bank contacts, a contact $z, y$ is closed by riding up on the inclined surfaces of the teeth $i$ which keeps the magnet M energized until the brushes $w$ are centered on the next set of bank contacts. The spring $n$ then drops down into the notch of the next tooth $i$ and opens the circuit of the magnet M. If this circuit is not then maintained by the test relay or stopping relay of the finder, the carrier C will then stop. When the carrier C reaches its topmost limit an upwardly extending finger $u$ attached to the carrier passes through a hole $h$, Fig. 21$^a$, in the frame F and pushes a spring holding pawl $v$ away from the holding teeth $i$. A spring $w^1$ then moves in front of the pawl $v$ and keeps it clear of the teeth $i$ until the carrier has fallen to its bottom position in which the lock $w^1$ will be pushed away from the pawl $v$ by an inclined piece $g$ that engages with an arm $f$ of the spring lock $w^1$. As long as the lock $w^1$ is out of the normal position it opens a contact (not shown) and keeps the circuit of the magnet M open, thus preventing all upward driving of the carrier until it has regained its bottom position.

Instead of the construction shown in Figs. 19 to 21$^a$ other designs may be used, the principal constructional feature consisting in building up the trunk finding elements of the exchange of units comprising sets of primary and secondary trunk finders of a suitable number to cope with the telephone traffic. The selector connectors and group selectors will also be combined so as to form constructional units.

In the system described in the preceding paragraphs revertively-acting primary trunk finders were used. In Figs. 22$^a$ and 22$^b$ forwardly-acting primary trunk finders PF and forwardly-acting secondary trunk finders SF are shown. The calling group-distinguishing- and-group-selector-identifying means are similar to those used in the other systems described herein, but the grouping of the trunk finders is different. After the systems previously explained herein have been understood a brief description of the operations involved in establishing a connection between two subscribers will be sufficient to elucidate the system shown in Figs. 22$^a$ and 22$^b$.

It will be assumed that a subscriber $CS^2_I$ in the first hundred group wishes to be connected to another subscriber $WS^3_{II}$ of the second hundred group.

The calling subscriber $CS^2_I$ on removing his receiver from the hook will be connected as in the other systems described in the preceding pages to a trunk, say $T^2_I$, which has previously been connected by a selector connector, say $SC^1_I$, to an idle group selector $GS^1_I$. As the calling subscriber wishes to be connected to a subscriber in the second hundred group he will send selecting impulses that cause the brush 1 to be moved onto the second contact 2, and when the change over then takes place the battery will be connected to the starting wire 5 leading to a group of primary trunk finders $PF^1_I$, $PF^2_I$, $PF^3_I$, which belong to the first calling group. By currents flowing from the positive pole through 3, 4, 5, 500 or 504, etc., and through the driving magnets $d^1$, $d^2$, etc., the idle primary trunk finders, e. g. $PF^1_I$, $PF^2_I$, are started. The test relays $h^1$, $h^2$ of these finders do not test until the contacts 503, 505 have been reached by the brushes $b^1$, $b^2$, the contact 503, 505 being connected by the brush 1 of the group selector $GS^1_I$ to the negative pole of the battery. Assuming that the trunk $PT^1_{II}$ is idle, the test relay $h^1$ will be energized by a current flowing from the negative pole through the starting relay 6 in the group selector $GS^1_I$ and through 1, 2, 8, 503, $b^1$, $h^1$, $t^1$, 510, 511, resistance 512 at the final selector $LW^1_{II}$ in the second hundred group to the negative pole. The primary trunk finder $PF^1_I$ is thus stopped by the energization of its relay $h^1$ and at the same time the relay 6 starts the secondary finder $SF^2_I$ by closing the driving magnet circuit-negative pole 9, 11, 12, 13, driving magnet 10, positive pole — and stops the other primary trunk finders by opening the contact 3. The secondary trunk finder $SF^2_I$ will now travel until its identifying relay 14 is energized by the identifying circuit that has been prepared by the test relay $h^1$ at contact 514. This identifying circuit extends from the positive pole through 15, 16, identifying relay 14, 17, 18, 19, 514 to the negative pole. The relays 14, and 19 are thus energized and the calling subscriber's line 30 will be extended through 31, $T^2_I$, 32, 33, 27, 34, 28, to the final selector $LW^1_{II}$. The calling subscriber may connect to the wanted station $WS^2_{II}$ by setting the brush 29 of the final selector, onto the wanted line in the usual way. This system may also be used in exchanges of all capacities.

The primary and secondary trunk finders described on the preceding pages have no normal positions so that they remain wherever they happen to be at the moment of disruption of a connection. With this arrangement the brushes of the various finders of a group will generally point in different angular directions and when the idle finders of a group are all started together in order to extend a calling line to the next group their brushes will, at each forward step, generally engage the bank contacts of different trunks. But the finders may be arranged to engage different trunks under all circumstances instead of being left to do this by chance. The brushes of each finder of a group may be arranged to always start from a definite normal position and the normal positions of the finders may be arranged so that when the finders are all started together the one finder will reach its trunk that leads to the calling group after the finders have executed one step, and the second finder will reach its corresponding trunk after the second step, the third finder after the third step, and so forth. To accomplish this the finders must be arranged to restore their brushes to definite normal positions and an arrangement of this kind is shown in Fig. 24 in which a primary finder PF and a secondary finder SF will be readily recognized.

When the group of finders containing the primary finder PF and the secondary finder SF has been selected, the change over in the particular group selector will cause the battery to be connected to the starting wire $105^3$ and to the wire 200 leading to the starting relays 201 of the secondary finder SF in the usual way. A current will immediately flow through the starting wire $105^3$ and through 215, 216, 203, the driving magnet 202 to the negative pole. Similar currents will flow through the driving magnets of the other idle primary trunk finders in the group. The brushes 205, 206, 207, 208, 209 of each idle primary finder now move until a group distinguishing brush 205 or 206 strikes a live calling-group-distinguishing contact and the corresponding test brush 209 reaches a free primary trunk.

A test relay, say 210, and the starting relay 201 of the primary trunk found will then be energized and the circuit of the driving magnet 202 will be opened at 216 while the circuit of the driving magnet 217 will be closed, this latter circuit extending from the negative pole through 218, 217, 219 to the positive pole. The brushes of the secondary trunk finder SF will then be moved until the secondary trunk is reached from which the call came. The identifying relay 220 and the relay 221 of the primary finder PF will then be energized simultaneously in the manner described with reference to Fig. 14.

When the starting relay 201 is energized it closes a contact 222 and when the brushes of the secondary finder SF execute their first step the contact 223 of the off-normal switch 225 is opened while the contact 224 is closed. The relay 201 will then be energized by a locking circuit that extends from the positive pole through 224, 201, 222 to the negative pole. The identifying relay 220 is kept energized as previously described until the connection is disrupted by the calling or called subscriber. When the identifying relay is deënergized the driving magnet 217 is energized by a circuit extending from the positive pole through 219, 217, 218 to the negative pole, and the magnet 217 now drives the secondary finder onward until the locking circuit of the relay 201 is broken by the off-normal contact 224 being opened. This happens when the secondary finder reaches its normal position.

When the relay 221 of the primary trunk finder is energized, it closes a locking circuit for itself which extends from the negative pole of the battery through 226, 227, off-normal contact 228 to the positive pole, and this locking circuit remains closed when the test relay 210 is deënergized on the abandonment of the connection by the calling or called subscriber. A circuit is then closed for the driving magnet 202 that extends from the negative pole through 202, 204, 229 to the positive pole. This circuit is opened at 204 the moment the brushes of the primary finder reach their normal position for then the off-normal contact 228 is opened and the relay 221 is deënergized by the rupture of its locking circuit.

In addition to the restoring means of the primary finders that have just been described other means are provided which cause all the idle primary finders that were started together with the particular one that extended the connection to immediately return to their normal positions. This means consists of the off-normal contacts 228, 230 and the relay contact 232 in each primary finder, and of the wire 231 that extends through all the primary finders of the particular group.

It will be remembered that when a primary finder of a set of started primary finders reach a free primary trunk the battery that is applied to the wire $105^3$ at the group selector is disconnected from this wire. This would result in the stopping of all of the primary finders in off-normal positions. But this is avoided by the battery being connected through the contacts 228, 227 and 232 of the finder that has seized a primary trunk to the wire 231. From this wire the circuit will continue through the off-normal contacts 230 of the other primary finders and through their contacts 215, 216, 203 and driving magnets 202 to the negative pole. The driving magnet of each other primary finder is thus energized until its brushes reach their normal position in which its off-normal contact 230 is opened.

In the system shown in Figs. $5^a$ and $5^b$ fifteen to twenty compound trunks will preferably be provided for each group of hundred subscribers. The number of last primary trunk finders $2P^2F^1{}_1$, $2P^2F^2{}_1$, etc., need not, however, be increased if forwardly hunting primary trunk finders such as shown in Figs. $22^a$ and $22^b$ are used instead of the revertively hunting finders shown in Fig. 5ᵇ. If there are twenty compound trunks per group tens pairs of sets of calling-group-distinguishing contacts in each last primary trunk finder would be formed and each pair would be connected by a set of group-distinguishing wires to a different group selector in the usual way. The first secondary finders that coöperate with the compound trunks would also have twenty sets of bank contacts each and so would the first group selector connectors and the final selector connectors. This applies also to the distributing switches.

In addition to the several modifications of the new group selecting and idle trunk finding method shown in the various drawings another modification will now be pointed out. This consists in using forwardly hunting primary trunk finders as shown in Fig. 22ᵇ in combination with revertively hunting secondary trunk finders as shown in Figs. 2ᵃ and 2ᵇ for example.

The selecting circuits shown and described in the preceding pages may be arranged so that the sets of selecting impulses which follow after first set, are sent through the brushes of the first group selector and of each succeeding group selector, and that the group selectors are only restored to normal after the final selector has been set onto the wanted line.

While the group selectors and the final selector are being set onto the wanted groups and onto the wanted line, the trunk finding operations of the secondary trunk finders could be completed. With this arrangement the system could easily be converted to a semi-automatic system with operator's controlling devices inserted between the first selector connectors and the first group selectors.

I claim:

1. In an electromechanically controlled telephone system, a set of transitorily-engaged switches, a set of connection-extending switches, a plurality of conductors connected to the said transitorily-engaged switches and to the connection-extending switches, a set of trunks, contacts in the said transitorily-engaged switches for connecting a said conductor to a said trunk, and non-numerical identifying means by which a said connection-extending switch is prevented from establishing any interconnection between conductors and trunks but an interconnection between the certain said conductor and the certain said trunk.

2. In an electromechanically controlled telephone system, a set of transitorily-engaged switches, a set of connection-extending switches, a plurality of conductors connected to the said transitorily-engaged switches and to the connection-extending switches, a set of trunks, means in the transitorily-engaged switches for connecting a said conductor to a said trunk, and a separate identifying wire extending from each transitorily-engaged switch to the said connection-extending switches, the identifying wire acting as a means for identifying the said certain conductor among all other similar conductors.

3. In an electromechanically controlled telephone system, a source of current, transitorily-engaged switches, primary connection-extending switches, secondary connection-extending switches, trunks connected to the said secondary connection-extending switches, conductors connected to the said transitorily-engaged switches and to the said secondary connection-extending switches, subscribers' stations, means for transferring a call from a subscriber's station through a said conductor and through a transitorily-engaged switch to the primary connection-extending switches, means for moving a plurality of primary connection-extending switches simultaneously when a call is transferred to them, means for stopping a primary connection-extending switch when it reaches an idle trunk and means for moving a secondary connection-extending switch so as to effect a connection between the idle trunk and the conductor through which the call was extended.

4. In an electromechanically controlled telephone system, a source of current, transitorily-engaged switches, primary connection-extending switches, secondary connection-extending switches, trunks connected to the said secondary connection-extending switches, conductors connected to the said transitorily-engaged switches and to the said secondary connection-extending switches, subscribers' stations, means for transferring a call from a subscriber's station through a said conductor and through a transitorily-engaged switch to the primary connection-extending switches, means for moving a plurality of primary connection-extending switches simultaneously when a call is transferred to them, means for stopping the primary connection-extending switches when one primary connection-extending switch reaches an idle trunk, test relays in the primary connection-extending switches, means for actuating only the test relay of the one said primary connection extending switch that reaches the idle trunk, and means for moving a secondary connection-extending switch so as to effect a connection between the idle trunk and the conductor through which the call was extended.

5. In an electromechanically controlled telephone system, a source of current, transitorily-engaged switches, primary connection-extending switches, secondary connection-extending switches, trunks connected to the said secondary connection-extending switches, conductors connected to the said transitorily-engaged switches and to the said secondary connection-extending switches, subscribers' stations, means for transferring a call from a subscriber's station through a said conductor and through a transitorily engaged switch to the primary connection-extending switches, means for moving a plurality of primary connection-extending switches simultaneously when a call is transferred to them, means for stopping a primary connection-extending switch when it reaches an idle trunk, means for moving a secondary connection-extending switch so as to effect a connection between the idle trunk and the conductor through which the call was extended, and means for disengaging the said transitorily-engaged switch through which the call is transferred the moment the connection between the said idle trunk and the said conductor is effected.

6. In an electromechanically controlled telephone system, a source of current, transitorily-engaged switches, primary connection-extending switches, secondary connection-extending switches, trunks connected to the said secondary connection-extending switches, conductors connected to the said transitorily-engaged switches and to the said secondary connection-extending switches, subscribers' stations, means for transferring a call from a subscriber's station through a said conductor and through a transitorily-engaged switch to the primary connection-extending switches, means for moving a plurality of primary connection-extending switches simultaneously when a call is transferred to them, means for stopping the primary connection-extending switches when one primary connection-extending switch reaches an idle trunk, test relays in the primary connection-extending switches, means for actuating only the test relay of the one said primary connection-extending switch that reaches the idle trunk, means for moving a secondary connection-extending switch so as to effect a connection between the idle trunk and the conductor, through which the call was extended, and means for disengaging the said transitorily-engaged switch through which the call is transferred the moment the connection between the said idle trunk and the said conductor is effected.

7. In an electromechanically controlled telephone system, a source of current, transitorily-engaged switches, primary connection-extending switches, secondary connection-extending switches, trunks connected to the said secondary connection-extending switches, conductors connected to the said transitorily-engaged switches and to the said secondary connection-extending switches, subscribers' stations, means for transferring a call from a subscriber's station through a said conductor and through a transitorily-engaged switch to the primary connection-extending switches, means for moving a plurality of primary connection-extending switches simultaneously when a call is transferred to them, means for stopping a primary connection-extending switch when it reaches an idle trunk, means for moving a secondary connection-extending switch, and identifying means by which the secondary connection-extending switch identifies the the said conductor through which a call is extended to the said primary connection-extending switches.

8. In an electromechanically controlled telephone system, a source of current, transitorily-engaged switches, primary connection-extending switches, secondary connection-extending switches, trunks connected to the said secondary connection-extending switches, an identifying wire peculiar to each transitorily-engaged switch, wires in the primary and secondary connection-extending switches that coöperate with the said identifying wires, conductors connected to the said transitorily-engaged switches and to the said secondary connection-extending switches, subscribers' stations, means for transferring a call from a subscriber's station through a said conductor and through a transitorily-engaged switch to the primary connection-extending switches, means for moving a plurality of primary connection extending switches simultaneously when a call is transferred to them, means for stopping a primary connection-extending switch when it reaches an idle trunk, means for moving a secondary connection-extending switch, and an identifying relay in the secondary connection-extending switch that is actuated by a current in the identifying wire that is peculiar to the transitorily-engaged switch through which the call was extended, said identifying relay effecting the stoppage of the secondary connection-extending switch so as to interconnect only the said idle trunk and the said conductor that are engaged for the said one and the same call.

9. In an electromechanically controlled telephone system, a source of current, groups of transitorily engaged switches, groups of primary connection-extending switches, groups of secondary connection-extending switches, groups of subscribers' lines, trunks connected to all of the said groups of primary connection-extending switches, the trunks connected to a primary connection-extending switch of any primary switch group each leading to a different group of subscribers, conductors connected to the said transitorily-engaged switches and to the said secondary connection-extending switches, subscribers' stations, means for transferring a call from a subscriber's station through a said conductor and through a transitorily-engaged switch to a group of primary connection-extending switches, means for moving a plurality of a group of primary connection-extending switches simultaneously when a call is transferred to them, means for stopping a primary connection-extending switch when it reaches an idle trunk, and means for moving a secondary connection-extending switch so as to effect a connection between the idle trunk and the conductor through which the call was extended.

10. In an electromechanically controlled telephone system, a source of current, groups of transitorily engaged switches, groups of primary connection - extending switches, groups of secondary connection-extending switches, groups of subscribers' lines, trunks connected to all of the said groups of primary connection-extending switches, the trunks connected to a primary connection-extending switch of any primary switch group each leading to a different group of subscribers, conductors connected to the said transitorily-engaged switches and to the said secondary connection - extending switches, subscribers' stations, means for transferring a call from a subscriber's station through a said conductor and through a transitorily-engaged switch to a group of primary connection - extending switches, means for moving a plurality of a group of primary connection-extending switches simultaneously, when a call is transferred to them, means for stopping the primary connection-extending switches when one primary connection extending switch reaches an idle trunk, test relays in the primary connection-extending switches, means for actuating only the test relay of the one said primary connection-extending switch that reaches the idle trunk, and means for moving a secondary connection-extending switch so as to establish a connection between the idle trunk and the conductor through which the call was extended.

11. In an electromechanically controlled telephone system, a source of current, groups of transitorily-engaged switches, groups of primary connection-extending switches, groups of secondary connection-extending switches, groups of subscribers' lines, trunks connected to all of the said groups of primary connection-extending switches, the trunks connected to a primary connection-extending switch of any primary switch group each leading to a different group of subscribers, conductors connected to the said transitorily-engaged switches and to the said secondary connection-extending switches, subscribers' stations, means for transferring a call from a subscriber's station through a said conductor and through a transitorily-engaged switch to a group of primary connection-extending switches, means for moving a plurality of a group of primary connection-extending switches simultaneously when a call is transferred to them, means for stopping a primary connection-extending switch when it reaches an idle trunk, means for moving a secondary connection-extending switch so as to effect a connection between the idle trunk and the conductor through which the call was extended, and means for disengaging the said transitorily engaged switch through which the call is transferred the moment the connection between the said idle trunk and the said conductor is established.

12. In an electromechanically controlled telephone system, a source of current, groups of transitorily engaged switches, groups of primary connection-extending switches, groups of secondary connection-extending switches, groups of subscribers' lines, trunks connected to all of the said groups of primary connection-extending switches, the trunks connected to a primary connection-extending switch of any primary switch group each leading to a different group of subscribers, conductors connected to the said transitorily-engaged switches and to the said secondary connection-extending switches, subscribers' stations, means for transferring a call from a subscriber's station through a said conductor and through a transitorily-engaged switch to a group of primary conection-extending switches, means for moving a plurality of a group of primary connection-extending switches simultaneously, when a call is transferred to them, means for stopping the primary connection-extending switches when one primary connection extending switch reaches an idle trunk, test relays in the primary connection-extending switches, means for actuating only the test relay of the one said primary connection-extending switch that reaches the idle trunk, means for moving a secondary connection-extending switch so as to establish a connection between the idle trunk and the conductor through which the call was extended, and means for disengaging the said transitorily-engaged switch through which the call is transferred the moment the connection between the said idle trunk and the said conductor is established.

13. In an electromechanically controlled telephone system, a source of current, groups of transitorily engaged switches, groups of primary connection-extending switches, groups of secondary connection-extending switches, groups of subscribers' lines, trunks connected to all of the said groups of primary connection-extending switches, the trunks connected to a primary connection-extending switch of any primary switch group each leading to a different group of subscribers, conductors connected to the said transitorily-engaged switches and to the said secondary connection-extending switches, subscribers' stations, means for transferring a call from a subscriber's station through a said conductor and through a transitorily-engaged switch to a group of primary connection-extending switches, means for moving a plurality of a group of primary connection-extending switches simultaneously when a call is transferred to them, means for stopping a primary connection-extending switch when it reaches an idle trunk, and means for moving a secondary connection-extending switch, and identifying means by which the secondary connection-extending switch identifies the said conductor through which a call is extended to the said primary connection-extending switches.

14. In an electromechanically controlled telephone exchange system, a source of current, groups of transitorily-engaged switches, groups of primary connection-extending switches, groups of secondary connection-extending switches, groups of subscribers' lines, trunks connected to all of the said groups of primary connection-extending switches, the trunks connected to a primary connection-extending switch of any primary switch group each leading to a different group of subscribers, an identifying wire peculiar to each transitorily-engaged switch, wires in the primary and secondary connection-extending switches that coöperate with the said identifying wires, conductors connected to the said transitorily-engaged switches and to the said secondary connection-extending switches, subscribers' stations, means for transferring a call from a subscriber's station through a said conductor and through a transitorily-engaged switch to a group of primary connection-extending switches, means for moving a plurality of a group of primary connection-extending switches simultaneously when a call is transferred to them, means for stopping a primary connection-extending switch when it reaches an idle trunk, means for moving a secondary connection-extending switch, and an identifying relay in the secondary connection-extending switch that is actuated by a current in the identifying wire that is peculiar to the transitorily-engaged switch through which the call was extended, said identifying relay effecting the stoppage of the secondary connection-extending switch so as to interconnect only the said idle trunk and the said conductor that are engaged for the said one and the same call.

15. In an electromechanically controlled telephone system, a source of current, groups of transitorily-engaged switches, groups of primary connection-extending switches, groups of secondary connection-extending switches, groups of subscribers' lines, trunks connected to all of the said groups of primary connection-extending switches, the trunks connected to a primary connection-extending switch of any primary switch group each leading to a different group of subscribers, conductors connected to the said transitorily-engaged switches and to the said secondary connection-extending switches, subscribers' stations, means for transferring a call from a subscriber's station through a said conductor and through a transitorily-engaged switch to a group of primary connection-extending switches, group distinguishing means in the primary connection-extending switches for distinguishing the group of transitorily-engaged switches through which the call is transferred, means for moving a plurality of a group of primary connection-extending switches simultaneously when a call is transferred to them, means for stopping a primary connection-extending switch when it reaches an idle trunk, and means for moving a secondary connection-extending switch so as to effect a connection between the idle trunk and the conductor through which the call was extended.

16. In an electromechanically controlled telephone system, a source of current, groups of transitorily engaged switches, groups of primary connection-extending switches, groups of secondary connection-extending switches, groups of subscribers' lines, trunks connected to all of the said groups of primary connection-extending switches, the trunks connected to a primary connection-extending switch of any primary switch group each leading to a different group of subscribers, conductors connected to the said transitorily-engaged switches and to the said secondary connection-extending switches, subscribers' stations, means for transferring a call from a subscriber's station through a said conductor and through a transitorily-engaged switch to a group of primary connection-extending switches, group distinguishing means in the primary connection-extending switches for distinguishing the group of transitorily-engaged switches through which the call is transferred, means for moving a plurality of a group of primary connection-extending switches simultaneously, when a call is transferred to them, means for stopping the primary connection-extending switches when one primary connection extending switch reaches an idle trunk, test relays in the primary connection-extending switches, means for actuating only the test relay of the one said primary connection-extending switch that reaches the idle trunk, and means for moving a secondary connection-extending switch so as to establish a connection between the idle trunk and the conductor through which the call was extended.

17. In an electromechanically controlled telephone system, a source of current, groups of transitorily-engaged switches, groups of primary connection-extending switches, groups of secondary connection-extending switches, groups of subscribers' lines, trunks connected to all of the said groups of primary connection-extending switches, the trunks connected to a primary connection-extending switch of any primary switch group each leading to a different group of subscribers, conductors connected to the said transitorily-extending switches and to the said secondary connection-extending switches, subscribers' stations, means for transferring a call from a subscriber's station through a said conductor and through a transitorily-engaged switch to a group of primary connection-extending switches, group distinguishing means in the primary connection-extending switches for distinguishing the group of transitorily-engaged switches through which the call is transferred, means for moving a plurality of a group of primary connection-extending switches simultaneously when a call is transferred to them, means for stopping a primary connection-extending switch when it reaches an idle trunk, means for moving a secondary connection-extending switch so as to effect a connection between the idle trunk and the conductor through which the call was extended, and means for disengaging the said transitorily-engaged switch through which the call is transferred the moment the connection between the said idle trunk and the said conductor is established.

18. In an electromechanically controlled telephone system, a source of current, groups of transitorily engaged switches, groups of primary connection extending switches, groups of secondary connection-extending switches, groups of subscribers' lines, trunks connected to all of the said groups of primary connection-extending switches, the trunks connected to a primary connection-extending switch of any primary switch group each leading to a different group of subscribers, conductors connected to the said transitorily-engaged switches and to the said secondary connection-extending switches, subscribers' stations, means for transferring a call from a subscriber's station through a said conductor and through a transitorily-engaged switch to a group of primary connection-extending switches, group distinguishing means in the primary connection-extending switches for distinguishing the group of transitorily-engaged switches through which the said call is transferred, means for moving a plurality of a group of primary connection-extending switches simultaneously when a call is transferred to them, means for stopping the primary connection-extending switches when one primary connection-extending switch reaches an idle trunk, test relays in the primary connection-extending switches, means for actuating only the test relay of the one said primary connection-extending switch that reaches the idle trunk, means for moving a secondary connection-extending switch so as to establish a connection between the idle trunk and the conductor through which the call was extended, and means for disengaging the said transitorily engaged switch through which the call is transferred the moment the connection between the said idle trunk and the said conductor is established.

19. In an electromechanically controlled telephone system, a source of current, groups of transitorily-engaged switches, groups of primary connection-extending switches, groups of secondary connection-extending switches, groups of subscribers' lines, trunks connected to all of the said groups of primary connection-extending switches, the trunks connected to the primary connection-extending switches of any primary switch of any primary switch group each leading to a different group of subscribers, conductors connected to the said transitorily-engaged switches and to the said secondary connection-extending switches, subscribers' stations, means for transferring a call from a subscriber's station through a said conductor and through a transitorily-engaged switch to a group of primary connection-extending switches, group distinguishing means in the primary connection-extending switches for distinguishing the group of transitorily-engaged switches through which the said call is transferred, means for moving a plurality of a group of primary connection-extending switches simultaneously when a call is transferred to them, means for stopping a primary connection-extending switch when it reaches an idle trunk, means for moving a secondary connection-extending switch, and identifying means by which the secondary connection-extending switch identifies the said conductor through which a call is extended to the said primary connection-extending switches.

20. In an electromechanically controlled telephone exchange system, a source of current, groups of transitorily-engaged switches, groups of primary connection-extending switches, groups of secondary connection-extending switches, groups of subscribers' line, trunks connected to all of the said groups of primary connection-extending switches, the trunks connected to a primary connection-extending switch of any primary switch group each leading to a different group of subscribers, an identifying wire peculiar to each transitorily-engaged switch, wires in the primary and secondary connection-extending switches that coöperate with the said identifying wires, conductors connected to the said transitorily-engaged switches and to the said secondary connection-extending switches, subscribers' stations, means for transferring a call from a subscriber's station through a said conductor and through a transitorily-engaged switch to a group of primary connection-extending switches, group distinguishing means in the primary connection extending switches for distinguishing the group of transitorily-engaged switches through which the said call is transferred, means for moving a plurality of a group of primary connection-extending switches simultaneously when a call is transferred to them, means for stopping a primary connection-extending switch when it reaches an idle trunk, means for moving a secondary connection-extending switch, and an identifying relay in the secondary connection-extending switch that is actuated by a current in the identifying wire that is peculiar to the transitorily-engaged switch through which the call was extended, said identifying relay effecting the stoppage of the secondary connection-extending switch so as to interconnect only the said idle trunk and the said conductor that are engaged for the said one and the same call.

21. In an electromechanically controlled telephone system, groups of subscribers' lines, groups of trunks, groups of connection-extending switches with sets of fixed contacts, each said fixed contact set of each said group of connection-extending switches leading to a different trunk of the said groups of trunks, other fixed contacts in the said connection-extending switches, the said other fixed contacts of a connection-extending switch of each group being multiply connected with the corresponding fixed contacts of the other switches of the same group, movable contacts in the said switches, means by which all of the movable contacts of a said switch are moved simultaneously over the contacts leading to the said trunks and over the said interconnected contacts whenever the switch is actuated, and a wire leading from each set of multiply connected contacts of a group of connection-extending switches to a different group of subscribers.

22. In an electromechanically controlled telephone system, groups of subscribers' lines, groups of transitorily-engaged switches corresponding to the said groups of subscribers, groups of trunks, groups of connection-extending switches with sets of fixed contacts, each fixed contact set of each group of connection-extending switches leading to a different trunk of the said groups of trunks, other sets of fixed contacts in the said connection-extending switches, the other sets of fixed contacts of one switch of a group of connection-extending switches being interconnected with the corresponding sets of fixed contacts of the other switches of the same group, and wires leading from the interconnected sets of corresponding fixed contacts of each group of connection extending switches to the said groups of transitorily-engaged switches.

23. In an electromechanically controlled telephone system, a set of transitorily-engaged selectors, a set of connection-extending switches, a plurality of conductors connected to the said transitorily-engaged selectors and to the connection-extending switches, a set of trunks, contacts in the said transitorily-engaged switches for connecting a said conductor to a said trunk, and non-numerical identifying means by which a said connection - extending switch is prevented from establishing any interconnection between conductors and trunks but an interconnection between the certain said conductor and the certain said trunk.

24. In an electromechanically controlled telephone system, a set of transitorily-engaged selectors, a set of connection-extending switches, a plurality of conductors connected to the said transitorily-engaged selectors and to the connection-extending switches, a set of trunks, means in the transitorily-engaged selectors for connecting a said conductor to a said trunk, and a separate identifying wire extending from each transitorily-engaged selector to the said connection-extending switches, the identifying wire acting as a means for identifying the said certain conductor among all other similar conductors.

25. In an electromechanically controlled telephone system, a source of current, transitorily-engaged selectors, primary connection-extending switches, secondary connection - extending switches, trunks connected to the said secondary connection-extending switches, conductors connected to the said transitorily-engaged selectors and to the said secondary connection-extending switches, subscribers' stations, means for transferring a call from a subscriber's station through a said conductor and through a transitorily-engaged selector to the primary connection-extending switches, means for moving a plurality of primary connection-extending switches simultaneously when a call is transferred to them, means for stopping a primary connection-extending switch when it reaches an idle trunk, and means for moving a secondary connection-extending switch so as to effect a connection between the idle trunk and the conductor through which the call was extended.

26. In an electromechanically controlled telephone system, a source of current, transitorily-engaged selectors, primary connection-extending switches, secondary connection-extending switches, trunks connected to the said secondary connection - extending switches, conductors connected to the said transitorily-engaged selectors and to the said secondary connection-extending switches, subscribers' stations, means for transferring a call from a subscriber's station through a said conductor and through a transitorily-engaged selector to the primary connection-extending switches, means for moving a plurality of primary connection-extending switches simultaneously when a call is transferred to them, means for stopping the primary connection-extending switches when one primary connection-extending switch reaches an idle trunk, test relays in the primary connection-extending switches, means for actuating only the test relay of the one said primary connection extending switch that reaches the idle trunk, and means for moving a secondary connection-extending switch so as to effect a connection between the idle trunk and the conductor through which the call was extended.

27. In an electromechanically controlled telephone system, a source of current, transitorily-engaged selectors, primary connection-extending switches, secondary connection-extending switches, trunks connected to the said secondary connection-extending switches, conductors connected to the said transitorily-engaged selectors and to the said secondary connection-extending switches, subscribers' stations, means for transferring a call from a subscriber's station through a said conductor and through a transitorily-engaged switch to the primary connection-extending switches, means for moving a plurality of primary connection-extending switches, means for moving a plurality of primary connection-extending switches simultaneously when a call is transferred to them, means for stopping a primary connection-extending switch when it reaches an idle trunk, means for moving a secondary connection-extending switch so as to effect a connection between the idle trunk and the conductor through which the call was extended, and means for disengaging the said transitorily-engaged selector through which the call is transferred the moment the connection between the said idle trunk and the said conductor is effected.

28. In an electromechanically controlled telephone system, a source of current, transitorily-engaged selectors, primary connection-extending switches, secondary connection-extending switches, trunks connected to the said secondary connection-extending switches, conductors connected to the said transitorily-engaged selectors and to the said secondary connection-extending switches, subscribers' stations, means for transferring a call from a subscriber's station through a said conductor and through a transitorily-engaged selector to the primary connection-extending switches, means for moving a plurality of primary connection-extending switches simultaneously when a call is transferred to them, means for stopping the primary connection-extending switches when one primary connection-extending switch reaches an idle trunk, test relays in the primary connection-extending switches, means for actuating only the test relay of the one said primary connection-extending switch that reaches the idle trunk, means for moving a secondary connection-extending switch so as to effect a connection between the idle trunk and the conductor through which the call was extended, and means for disengaging the said transitorily-engaged selector through which the call is transferred the moment the connection between the said idle trunk and the said conductor is effected.

29. In an electromechanically controlled telephone system, a source of current, transitorily-engaged selectors, primary connection-extending switches, secondary connection-extending switches, trunks connected to the said secondary connection-extending switches, conductors connected to the said transitorily-engaged selectors and to the said secondary connection-extending switches, subscribers' stations, means for transferring a call from a subscriber's station through a said conductor and through a transitorily-engaged selector to the primary connection-extending switches, means for moving a plurality of primary connection-extending switches simultaneously when a call is transferred to them, means for stopping a primary connection-extending switch when it reaches an idle trunk, means for moving a secondary connection-extending switch, and identifying means by which the secondary connection-extending switch identifies the said conductor through which a call is extended to the said primary connection-extending switches.

30. In an electromechanically controlled telephone system, a source of current, transitorily-engaged selectors, primary connection-extending switches, secondary connection-extending switches, trunks connected to the said secondary connection-extending switches, an identifying wire peculiar to each transitorily-engaged selector, wires in the primary and secondary connection-extending switches that coöperate with the said identifying wires, conductors connected to the said transitorily-engaged selectors and to the said secondary connection-extending switches, subscribers' stations, means for transferring a call from a subscriber's station through a said conductor and through a transitorily-engaged selector to the primary connection-extending switches, means for moving a plurality of primary connection-extending switches simultaneously when a call is transferred to them, means for stopping a primary connection-extending switch when it reaches an idle trunk, means for moving a secondary connection-extending switch, and an identifying relay in the secondary connection extending switch that is actuated by a current in the identifying wire that is peculiar to the transitorily-engaged selector through which the call was extended, said identifying relay effecting the stoppage of the secondary connection-extending switch so as to interconnect only the said idle trunk and the said conductor that are engaged for the said one and the same call.

31. In an electromechanically controlled telephone system, a source of current, groups of transitorily-engaged selectors, groups of primary connection - extending switches, groups of secondary connection-extending switches, groups of subscribers' stations, trunks connected to all of the said groups of primary connection-extending switches, the trunks connected to a primary connection-extending switch of any primary switch group each leading to a different group of subscribers, conductors connected to the said transitorily-engaged selectors and to the said secondary connection-extending switches, subscribers' stations, means for transferring a call from a subscriber's station through a said conductor and through a transitorily-engaged selector to a group of primary connection-extending switches, means for moving a plurality of a group of primary connection-extending switches simultaneously when a call is transferred to them, means for stopping a primary connection-extending switch when it reaches an idle trunk and means for moving a secondary connection-extending switch so as to effect a connection between the idle trunk and the conductor through which the call was extended.

32. In an electromechanically controlled telephone system, a source of current, groups of transitorily-engaged selectors, groups of primary connection - extending switches, groups of secondary connection-extending switches, groups of subscribers' stations, trunks connected to all of the said groups of primary connection-extending switches, the trunks connected to a primary connection-extending switch of any primary switch group each leading to a different group of subscribers, conductors connected to the said transitorily-engaged selectors and to the said secondary connection-extending switches, subscribers' stations, means for transferring a call from a subscriber's station through a said conductor and through a transitorily-engaged selector to a group of primary connection-extending switches, means for moving a plurality of a group of primary connection-extending switches simultaneously, when a call is transferred to them, means for stopping the primary connection-extending switches when one primary connection extending switch reaches an idle trunk, test relays in the primary connection-extending switches, means for actuating only the test relay of the one said primary connection-extending switch that reaches the idle trunk, and means for moving a secondary connection-extending switch so as to establish a connection between the idle trunk and the conductor through which the call was extended.

33. In an electromechanically controlled telephone system, a source of current, groups of transitorily-engaged selectors, groups of primary connection-extending switches, groups of secondary connection-extending switches, groups of subscribers' stations, trunks connected to all of the said groups of primary connection-extending switches, the trunks connected to a primary connection-extending switch of any primary switch group each leading to a different group of subscribers, conductors connected to the said transitorily-engaged selectors and to the said secondary connection-extending switches, subscribers' stations, means for transferring a call from a subscriber's station through a said conductor and through a transitorily-engaged selector to a group of primary connection-extending switches, means for moving a plurality of a group of primary connection-extending switches simultaneously when a call is transferred to them, means for stopping a primary connection-extending switch when it reaches an idle trunk, means for moving a secondary connection-extending switch so as to effect a connection between the idle trunk and the conductor through which the call was extended, and means for disengaging the said transitorily-engaged selector through which the call is transferred the moment the connection between the said idle trunk and the said conductor is established.

34. In an electromechanically controlled telephone system, a source of current, groups of transitorily-engaged selectors, groups of primary connection-extending switches, groups of secondary connection-extending switches, groups of subscribers' stations, trunks connected to all of the said groups of primary connection-extending switches, the trunks connected to a primary connection-extending switch of any primary switch group each leading to a different group of subscribers, conductors connected to the said transitorily-engaged selectors and to the said secondary connection - extending switches, subscribers' stations, means for transferring a call from a subscriber's station through a said conductor and through a transitorily-engaged selector to a group of primary connection-extending switches, means for moving a plurality of a group of primary connection-extending switches simultaneously, when a call is transferred to them, means for stopping the primary connection-extending switches when one primary connection-extending switch reaches an idle trunk, test relays in the primary connection-extending switches, means for actuating only the test relay of the one said primary connection-extending switch that reaches the idle trunk, means for moving a secondary connection-extending switch so as to establish a connection between the idle trunk and the conductor through which the call was extended, and means for disengaging the said transitorily-engaged selector through which the call is transferred the moment the connection between the said idle trunk and the said conductor is established.

35. In an electromechanically controlled telephone system, a source of current, groups of transitorily engaged selectors, groups of primary connection-extending switches, groups of secondary connection-extending switches, groups of subscribers' stations, trunks connected to all of the said groups of primary connection-extending switches, the trunks connected to a primary connection-extending switch of any primary switch group each leading to a different group of subscribers, conductors, connected to the said transitorily-engaged selectors and to the said secondary connection-extending switches, subscribers' stations, means for transferring a call from a subscriber's station through a said conductor and through a transitorily-engaged selector to a group of primary connection-extending switches, means for moving a plurality of a group of primary connection-extending switches simultaneously when a call is transferred to them, means for stopping a primary connection-extending switch when it reaches an idle trunk, and means for moving a secondary connection-extending switch, and identifying means by which the secondary connection-extending switch identifies the said conductor through which a call is extended to the said primary connection-extending switches.

36. In an electromechanically controlled telephone exchange system, a source of current, groups of transitorily-engaged selectors, groups of primary connection-extending switches, groups of secondary connection-extending switches, groups of subscribers' stations, trunks connected to all of the said groups of primary connection-extending switches, the trunks connected to a primary connection-extending switch of any primary switch group each leading to a different group of subscribers, an identifying wire peculiar to each transitorily-engaged selector, wires in the primary and secondary connection-extending switches that coöperate with the said identifying wires, conductors connected to the said transitorily-engaged selectors and to the said secondary connection-extending switches, subscribers' stations, means for transferring a call from a subscriber's station through a said conductor and through a transitorily-engaged selector to a group of primary connection-extending switches, means for moving a plurality of a group of primary connection extending switches simultaneously when a call is transferred to them, means for stopping a primary connection-extending switch when it reaches an idle trunk, means for moving a secondary connection-extending switch, and an identifying relay in the secondary connection-extending switch that is actuated by a current in the identifying wire that is peculiar to the transitorily-engaged selector through which the call was extended, said identifying relay effecting the stoppage of the secondary connection-extending switch so as to interconnect only the said idle trunk and the said conductor that are engaged for the said one and the same call.

37. In an electromechanically controlled telephone system, a source of current, groups of transitorily-engaged selectors, groups of primary connection - extending switches, groups of subscribers' stations, trunks connected to all of the said groups of primary connection-extending switches, the trunks connected to a primary connection-extending switch of any primary switch group each leading to a different group of subscribers, conductors connected to the said transitorily-engaged selectors and to the said secondary connection-extending switches, subscribers' stations, means for transferring a call from a subscriber's station through a said conductor and through a transitorily-engaged selector to a group of primary connection-extending switches, group distinguishing means in the primary connection-extending switches for distinguishing the group of transitorily - engaged selectors through which the call is transferred, means for moving a plurality of group of primary connection-extending switches simultaneously when a call is transferred to them, means for stopping a primary connection-extending switch when it reaches an idle trunk, and means for moving a secondary connection-extending switch so as to effect a connection between the idle trunk and the conductor through which the call was extended.

38. In an electromechanically controlled telephone system, a source of current, groups of transitorily-engaged selectors, groups of primary connection-extending switches, groups of secondary connection-extending switches, groups of subscribers' stations, trunks connected to all of the said groups of primary connection-extending switches, the trunks connected to a primary connection-extending switch of any primary switch group each leading to a different group of subscribers, conductors connected to the said transitorily-engaged selectors and to the said secondary connection-extending switches, subscribers' stations, means for transferring a call from a subscriber's station through a said conductor and through a transitorily-engaged selector to a group of primary connection-extending switches, group distinguishing means in the primary connection-extending switches for distinguishing the group of transitorily-engaged selectors through which the call is transferred, means for moving a plurality of a group of primary connection-extending switches simultaneously, when a call is transferred to them, means for stopping the primary connection-extending switches when one primary connection extending switch reaches an idle trunk, test relays in the primary connection-extending switches, means for actuating only the test relay of the one said primary connection-extending switch that reaches the idle trunk, and means for moving a secondary connection-extending switch so as to establish a connection between the idle trunk and the conductor through which the call was extended.

39. In an electromechanically controlled telephone system, a source of current, groups of transitorily-engaged selectors, groups of primary connection-extending switches, groups of secondary connection-extending switches, groups of subscribers' stations, trunks connected to all of the said groups of primary connection-extending switches, the trunks connected to a primary connection-extending switch of any primary switch group each leading to a different group of subscribers, conductors connected to the said transitorily-engaged selectors and to the said secondary connection-extending switches, subscribers' stations, means for transferring a call from a subscriber's station through a said conductor and through a transitorily-engaged selector to a group of primary connection-extending switches, group distinguishing means in the primary connection-extending switches for distinguishing the group of transitorily-engaged selectors through which the call is transferred, means for moving a plurality of a group of primary connection-extending switches simultaneously when a call is transferred to them, means for stopping a primary connection-extending switch when it reaches an idle trunk, means for moving a secondary connection-extending switch so as to effect a connection between the idle trunk and the conductor through which the call was extended, and means for disengaging the said transitorily-engaged selector through which the call is transferred the moment the connection between the said idle trunk and the said conductor is established.

40. In an electromechanically controlled telephone system, a source of current, groups of transitorily-engaged selectors, groups of primary connection extending switches, groups of secondary connection-extending switches, groups of subscribers' stations, trunks connected to all of the said groups of primary connection-extending switches, the trunks connected to a primary connection-extending switch of any primary switch group each leading to a different group of subscribers, conductors connected to the said transitorily-engaged selectors and to the said secondary connection-extending switches, subscribers' stations, means for transferring a call from a subscriber's station through a said conductor and through a transitorily-engaged selector to a group of primary connection-extending switches, group distinguishing means in the primary connection-extending switches for distinguishing the group of transitorily-engaged selectors through which the said call is transferred, means for moving a plurality of a group of primary connection-extending switches simultaneously when a call is transferred to them, means for stopping the primary connection-extending switches when one primary connection-extending switch reaches an idle trunk, test relays in the primary connection-extending switches, means for actuating only the test relay of the one said primary connection-extending switch that reaches the idle trunk, means for moving a secondary connection-extending switch so as to establish a connection between the idle trunk and the conductor through which the call was extended, and means for disengaging the said transitorily-engaged selector through which the call is transferred the moment the connection between the said idle trunk and the said conductor is established.

41. In an electromechanically controlled telephone system, a source of current, groups of transitorily-engaged selectors, groups of primary connection-extending switches, groups of secondary connection-extending switches, groups of subscribers' stations, trunks connected to all of the said groups of primary connection-extending switches, the trunks connected to the primary connection-extending switches of any primary switch of any primary switch group each leading to a different group of subscribers, conductors connected to the said transitorily-engaged selectors and to the said secondary connection-extending switches, subscribers' stations, means for transferring a call from a subscriber's station through a said conductor and through a transitorily-engaged selector to a group of primary connection-extending switches, group distinguishing means in the primary connection-extending switches for distinguishing the group of transitorily-engaged selectors through which the said call is transferred, means for moving a plurality of a group of primary connection-extending switches simultaneously when a call is transferred to them, means for stopping a primary connection-extending switch when it reaches an idle trunk, means for moving a secondary connection-extending switch, and identifying means by which the secondary connection-extending switch identifies the said conductor through which a call is extended to the said primary connection-extending switches.

42. In an electromechanically controlled telephone exchange system, a source of current, groups of transitorily-engaged selectors, groups of primary connection-extending switches, groups of secondary connection-extending switches, groups of subscribers' stations, trunks connected to all of the said groups of primary connection-extending switches, the trunks connected to a primary connection-extending switch of any primary switch group each leading to a different group of subscribers, an identifying wire peculiar to each transitorily-engaged selector, wires in the primary and secondary connection-extending switches that coöperate with the said identifying wires, conductors connected to the said transitorily-engaged selectors and to the said secondary connection-extending switches, subscribers' stations, means for transferring a call from a subscriber's station through a said conductor and through a transitorily-engaged selector to a group of primary connection-extending switches, group distinguishing means in the primary connection-extending switches for distinguishing the group of transitorily-engaged selectors through which the said call is transferred, means for moving a plurality of a group of primary connection-extending switches simultaneously when a call is transferred to them, means for stopping a primary connection-extending switch when it reaches an idle trunk, means for moving a secondary connection-extending switch, and an identifying relay in the secondary connection-extending switch that is actuated by a current in the identifying wire that is peculiar to the transitorily-engaged selector through which the call was extended, said identifying relay effecting the stoppage of the secondary connection-extending switch so as to interconnect only the said idle trunk and the said conductor that are engaged for the said one and the same call.

43. In an electromechanically controlled telephone system, groups of subscribers' stations, groups of transitorily-engaged selectors corresponding to the said groups of subscribers, groups of trunks, groups of connection-extending switches with sets of fixed contacts, each fixed contact set of each group of connection-extending switches leading to a different trunk of the said groups of trunks, other sets of fixed contacts in the said connection-extending switches, the other sets of fixed contacts of one switch of a group of connection-extending switches being interconnected with the corresponding sets of fixed contacts of the other switches of the same group, movable contacts in the said switches, means by which all of the movable contacts of a said switch are moved simultaneously over the contacts leading to the said trunks and over the said interconnected contacts whenever the switch is actuated, and wires leading from the interconnected sets of corresponding fixed contacts of each group of connection extending switches to the said groups of transitorily-engaged selectors.

44. In an electromechanically controlled telephone system, a set of transitorily-engaged group selectors, a set of connection-extending switches, a plurality of conductors connected to the said transitorily-engaged group selectors and to the connection-extending switches, a set of trunks, contacts in the said transitorily-engaged switches for connecting a said conductor to a said trunk, and non-numerical identifying means by which a said connection-extending switch is prevented from establishing any interconnection between conductors and trunks but an interconnection between the certain said conductor and the certain said trunk.

45. In an electromechanically controlled telephone system, a set of transitorily-engaged group selectors, a set of connection-extending switches, a plurality of conductors connected to the said transitorily-engaged group selectors and to the connection-extending switches, a set of trunks, means in the transitorily-engaged group selectors for connecting a said conductor to a said trunk, and a separate identifying wire extending from each transitorily-engaged group selector to the said connection-extending switches, the identifying wire acting as a means for identifying the said certain conductor among all other similar conductors.

46. In an electromechanically controlled telephone system, a source of current, transitorily-engaged group selectors, primary connection-extending switches, secondary connection-extending switches, trunks connected to the said secondary connection-extending switches, conductors connected to the said transitorily-engaged group selectors and to the said secondary connection-extending switches, subscribers' stations, means for transferring a call from a subscriber's station through a said conductor and through a transitorily-engaged group selector to the primary connection-extending switches, means for moving a plurality of primary connection-extending switches simultaneously when a call is transferred to them, means for stopping a primary connection-extending switch when it reaches an idle trunk, and means for moving a secondary connection-extending switch so as to effect a connection between the idle trunk and the conductor through which the call was extended.

47. In an electromechanically controlled telephone system, a source of current, transitorily-engaged group selectors, primary connection-extending switches, secondary connection-extending switches, trunks connected to the said secondary connection-extending switches, conductors connected to the said transitorily-engaged group selectors and to the said secondary connection-extending switches, subscribers' stations, means for transferring a call from a subscriber's station through a said conductor and through a transitorily-engaged group selector to the primary connection-extending switches, means for moving a plurality of primary connection-extending switches simultaneously when a call is transferred to them, means for stopping the primary connection-extending switches when one primary connection-extending switch reaches an idle trunk, test relays in the primary connection-extending switches, means for actuating only the test relay of the one said primary connection extending switch that reaches the idle trunk, and means for moving a secondary connection-extending switch so as to effect a connection between the idle trunk and the conductor through which the call was extended.

48. In an electromechanically controlled telephone system, a source of current, transitorily-engaged group selectors, primary connection-extending switches, secondary connection-extending switches, trunks, connected to the said secondary connection-extending switches, conductors connected to the said transitorily-engaged group selectors and to the said secondary connection-extending switches, subscribers' stations, means for transferring a call from a subscriber's station through a said conductor and through a transitorily-engaged switch to the primary connection - extending switches, means for moving a plurality of primary connection - extending switches, means for moving a plurality of primary connection - extending switches simultaneously when a call is transferred to them, means for stopping a primary connection-extending switch when it reaches an idle trunk, means for moving a secondary connection-extending switch so as to effect a connection betwen the idle trunk and the conductor through which the call was extended, and means for disengaging the said transitorily-engaged group selector through which the call is transferred the moment the connection between the said idle trunk and the said conductor is effected.

49. In an electromechanically controlled telephone system, a source of current, transitorily-engaged group selectors, primary connection - extending switches, secondary connection-extending switches, trunks connected to the said secondary connection-extending switches, conductors connected to the said transitorily-engaged group selectors and to the said secondary connection-extending switches, subscribers' stations, means for transferring a call from a subscriber's station through a said conductor and through a transitorily-engaged group selector to the primary connection-extending switches, means for moving a plurality of primary connection-extending switches simultaneously when a call is transferred to them, means for stopping the primary connection - extending switches when one primary connection-extending switch reaches an idle-trunk, test relays in the primary connection-extending switches, means for actuating only the test relay of the one said primary connection-extending switch that reaches the idle trunk, means for moving a secondary connection-extending switch so as to effect a connection between the idle trunk and the conductor through which the call was extended, and means for disengaging the said transitorily-engaged group selector through which the call is transferred the moment the connection between the said idle trunk and the said conductor is effected.

50. In an electromechanically controlled telephone system, a source of current, transitorily-engaged group selectors, primary connection-extending switches, secondary connection-extending switches, trunks connected to the said secondary connection-extending switches, conductors connected to the said transitorily-engaged group selectors and to the said secondary connection-extending switches, subscribers' stations, means for transferring a call from a subscriber's station through a said conductor and through a transitorily-engaged group selector to the primary connection-extending switches, means for moving a plurality of primary connection-extending switches simultaneously when a call is transferred to them, means for stopping a primary connection-extending switch when it reaches an idle trunk, means for moving a secondary connection-extending switch, and identifying means by which the secondary connection-extending switch identifies the said conductor through which a call is extended to the said primary connection - extending switches.

51. In an electromechanically controlled telephone system, a source of current, transitorily-engaged group selectors, primary connection-extending switches, secondary connection-extending switches, trunks connected to the said secondary connection-extending switches, an identifying wire peculiar to each transitorily-engaged group selector, wires in the primary and secondary connection-extending switches that coöperate with the said identifying wires, conductors connected to the said transitorily-engaged group selectors and to the said secondary connection-extending switches, subscribers' stations, means for transferring a call from a subscriber's station through a said conductor and through a transitorily-engaged group selector to the primary connection-extending switches, means for moving a plurality of primary connection-extending switches simultaneously when a call is transferred to them, means for stopping a primary connection-extending switch when it reaches an idle trunk, means for moving a secondary connection-extending switch, and an identifying relay in the secondary connection extending switch that is actuated by a current in the identifying wire that is peculiar to the transitorily-engaged group selector through which the call was extended, said identifying relay effecting the stoppage of the secondary connection-extending switch so as to interconnect only the said idle trunk and the said conductor that are engaged for the said one and the same call.

52. In an electromechanically controlled telephone system, a source of current, groups of transitorily-engaged group selectors, groups of primary connection-extending switches, groups of secondary connection-extending switches, groups of subscribers' stations, trunks connected to all of the said groups of primary connection-extending switches, the trunks connected to a primary connection-extending switch of any primary switch group each leading to a different group of subscribers, conductors connected to the said transitorily-engaged group selectors and to the said secondary connection-extending switches, subscribers' stations, means for transferring a call from a subscriber's station through a said conductor and through a transitorily-engaged to a group of primary connection-extending switches, means for moving a plurality of a group of primary connection-extending switches simultaneously when a call is transferred to them, means for stopping a primary connection-extending switch when it reaches an idle trunk, and means for moving a secondary connection-extending switch so as to effect a connection between the idle trunk and the conductor through which the call was extended.

53. In an electromechanically controlled telephone system, a source of current, groups of transitorily-engaged group selectors, groups of primary connection-extending switches, groups of secondary connection-extending switches, groups of subscribers' stations, trunks connected to all of the said groups of primary connection-extending switches, the trunks connected to a primary connection-extending switch of any primary switch group each leading to a different group of subscribers, conductors connected to the said transitorily-engaged group selectors and to the said secondary connection-extending switches, subscribers' stations, means for transferring a call from a subscriber's station through a said conductor and through a transitorily-engaged group selector to a group of primary connection-extending switches, means for moving a plurality of a group of primary connection-extending switches simultaneously when a call is transferred to them, means for stopping the primary connection-extending switches when one primary connection extending switch reaches an idle trunk, test relays in the primary connection-extending switches, means for actuating only the test relay of the one said primary connection-extending switch that reaches the idle trunk, and means for moving a secondary connection-extending switch so as to establish a connection between the idle trunk and the conductor through which the call was extended.

54. In an electromechanically controlled telephone system, a source of current, groups of transitorily-engaged group selectors, groups of primary connection-extending switches, groups of secondary connection-extending switches, groups of subscriber's stations, trunks connected to all of the said groups of primary connection-extending switches, the trunks connected to a primary connection-extending switch of any primary switch group each leading to a different group of subscribers, conductors connected to the said transitorily-engaged group selectors and to the said secondary connection-extending switches, subscriber's stations, means for transferring a call from a subscriber's station through a said conductor and through a transitorily-engaged selector to a group of primary connection-extending switches, means for moving a plurality of a group of primary connection-extending switches simultaneously when a call is transferred to them, means for stopping a primary connection-extending switch when it reaches an idle trunk, means for moving a secondary connection-extending switch so as to effect a connection between the idle trunk and the conductor through which the call was extended, and means for disengaging the said transitorily-engaged group selector through which the call is transferred the moment the connection between the said idle trunk and the said conductor is established.

55. In an electromechanically controlled telephone system, a source of current, groups of transitorily-engaged group selectors, groups of primary connection-extending switches, groups of secondary connection-extending switches, groups of subscribers' stations, trunks connected to all of the said groups of primary connection-extending switches, the trunks connected to a primary connection-extending switch of any primary switch group each leading to a different group of subscribers, conductors connected to the said transitorily-engaged group selectors and to the said secondary connection-extending switches, subscribers' stations, means for transferring a call from a subscriber's station through a said conductor and through a transitorily-engaged group selector to a group of primary connection-extending switches, means for moving a plurality of a group of primary connection-extending switches simultaneously, when a call is transferred to them, means for stopping the primary connection-extending switches when one primary connection-extending switch reaches an idle trunk, test relays in the primary connection-extending switches, means for actuating only the test relay of the one said primary connection-extending switch that reaches the idle trunk, means for moving a secondary connection-extending switch so as to establish a connection between the idle trunk and the conductor through which the call was extended, and means for disengaging the said transitorily-engaged group selector through which the call is transferred the moment the connection between the said idle trunk and the said conductor is established.

56. In an electromechanically controlled telephone system, a source of current, groups of transitorily-engaged group selectors, groups of primary connection-extending switches, groups of secondary connection-extending switches, groups of subscribers' stations, trunks connected to all of the said groups of primary connection-extending switches, the trunks connected to a primary connection-extending switch of any primary switch group each leading to a different group of subscribers, conductors connected to the said transitorily-engaged group selectors and to the said secondary connection-extending switches, subscribers' stations, means for transferring a call from a subscriber's station through a said conductor and through a transitorily-engaged selector to a group of primary connection-extending switches, means for moving a plurality of a group of primary connection-extending switches simultaneously when a call is transferred to them, means for stopping a primary connection-extending switch when it reaches an idle trunk, and means for moving a secondary connection-extending switch, and identifying means by which the secondary connection-extending switch identifies the said conductor through which a call is extended to the said primary connection-extending switches.

57. In an electromechanically controlled telephone exchange system, a source of current, groups of transitorily-engaged group selectors, groups of primary connection-extending switches, groups of secondary connection-extending switches, groups of subscribers' stations, trunks connected to all of the said groups of primary connection-extending switches, the trunks connected to a primary connection-extending switch of any primary switch group, each leading to a different group of subscribers, an identifying wire peculiar to each transitorily-engaged group selector, wires in the primary and secondary connection-extending switches that coöperate with the said identifying-wires, conductors connected to the said transitorily-engaged group selectors and to the said secondary connection-extending switches, subscribers' stations, means for transferring a call from a subscriber's station through a said conductor and through a transitorily-engaged group selector to a group of primary connection-extending switches, means for moving a plurality of a group of primary connection-extending switches simultaneously when a call is transferred to them, means for stopping a primary connection-extending switch when it reaches an idle trunk, means for moving a secondary connection-extending switch, and an identifying relay in the secondary connection-extending switch that is actuated by a current in the identifying wire that is peculiar to the transitorily-engaged group selector through which the call was extended, said identifying relay effecting the stoppage of the secondary connection-extending switch so as to interconnect only the said idle trunk and the said conductor that are engaged for the said one and the same call.

58. In an electromechanically controlled telephone system, a source of current, groups of transitorily-engaged group selectors, groups of primary connection-extending switches, groups of subscribers' stations, trunks connected to all of the said groups of primary connection-extending switches, the trunks connected to a primary connection-extending switch of any primary switch group each leading to a different group of subscribers, conductors connected to the said transitorily-engaged group selectors and to the said secondary connection-extending switches, subscribers' stations, means for transferring a call from a subscriber's station through a said conductor and through a transitorily-engaged selector to a group of primary connection-extending switches, group distinguishing means in the primary connection-extending switches for distinguishing the group of transitorily-engaged group selectors through which the call is transferred, means for moving a plurality of a group of primary connection-extending switches simultaneously when a call is transferred to them, means for stopping a primary connection-extending switch when it reaches an idle trunk, and means for moving a secondary connection-extending switch so as to effect a connection between the idle trunk and the conductor through which the call was extended.

59. In an electromechanically controlled telephone system, a source of current, groups of transitorily-engaged group selectors, groups of primary connection-extending switches, groups of secondary connection-extending switches, groups of subscribers' stations, trunks connected to all of the said groups of primary connection-extending switches, the trunks connected to a primary connection-extending switch of any primary switch group each leading to a different group of subscribers, conductors connected to the said transitorily-engaged group selectors and to the said secondary connection-extending switches, subscribers' stations, means for transferring a call from a subscriber's station through a said conductor and through a transitorily-engaged group selector to a group of primary connection-extending switches, group distinguishing means in the primary connection-extending switches for distinguishing the group of transitorily-engaged group selectors through which the call is transferred, means for moving a plurality of a group of primary connection-extending switches simultaneously when a call is transferred to them, means for stopping the primary connection-extending switches when one primary connection-extending switch reaches an idle trunk, test relays in the primary connection-extending switches, means for actuating only the test relay of the one said primary connection-extending switch that reaches the idle trunk, and means for moving a secondary connection-extending switch so as to establish a connection between the idle trunk and the conductor through which the call was extended.

60. In an electromechanically controlled telephone system, a source of current, groups of transitorily-engaged group selectors, groups of primary connection-extending switches, groups of secondary connection-extending switches, groups of subscribers' stations, trunks connected to all of the said groups of primary connection-extending switches, the trunks connected to a primary connection-extending switch of any primary switch group each leading to a different group of subscribers, conductors connected to the said transitorily-engaged group selectors and to the said secondary connection-extending switches, subscribers' stations, means for transferring a call from a subscriber's station through a said conductor and through a transitorily-engaged selector to a group of primary connection-extending switches, group distinguishing means in the primary connection-extending switches for distinguishing the group of transitorily-engaged selectors through which the call is transferred, means for moving a plurality of a group of primary connection-extending switches simultaneously when a call is transferred to them, means for stopping a primary connection-extending switch when it reaches an idle trunk, means for moving a secondary connection-extending switch so as to effect a connection between the idle trunk and the conductor through which the call was extended, and means for disengaging the said transitorily-engaged group selector through which the call is transferred the moment the connection between the said idle trunk and the said conductor is established.

61. In an electromechanically controlled telephone system, a source of current, groups of transitorily-engaged group selectors, groups of primary connection extending switches, groups of secondary connection-extending switches, groups of subscribers' stations, trunks connected to all of the said groups of primary connection-extending switches, the trunks connected to a primary connection-extending switch of any primary switch group each leading to a different group of subscribers, conductors connected to the said transitorily-engaged group selectors and to the said secondary connection-extending switches, subscribers' stations, means for transferring a call from a subscriber's station through a said conductor and through a transitorily-engaged group selector to a group of primary connection-extending switches, group distinguishing means in the primary connection-extending switches for distinguishing the group of transitorily-engaged group selectors through which the said call is transferred, means for moving a plurality of a group of primary connection-extending switches simultaneously when a call is transferred to them, means for stopping the primary connection-extending switches when one primary connection-extending switch reaches an idle trunk, test relays in the primary connection-extending switches, means for actuating only the test relay of the one said primary connection-extending switch that reaches the idle trunk, means for moving a secondary connection-extending switch so as to establish a connection between the idle trunk and the conductor through which the call was extended, and means for disengaging the said transitorily-engaged group selector through which the call is transferred the moment the connection between the said idle trunk and the said conductor is established.

62. In an electromechanically controlled telephone system, a source of current, groups of transitorily-engaged group selectors, groups of primary connection-extending switches, groups of secondary connection-extending switches, groups of subscribers' lines, trunks connected to all of the said groups of primary connection-extending switches, the trunks connected to the primary connection-extending switches of any primary switch of any primary switch group each leading to a different group of subscribers, conductors connected to the said transitorily-engaged group selectors and to the said secondary connection-extending switches, subscribers' stations, means for transferring a call from a subscriber's station through a said conductor and through a transitorily-engaged group selector to a group of primary connection-extending switches, group distinguishing means in the primary connection-extending switches for distinguishing the group of transitorily-engaged group selectors through which the said call is transferred, means for moving a plurality of a group of primary connection - extending switches simultaneously when a call is transferred to them, means for stopping a primary connection-extending switch when it reaches an idle trunk, means for moving a secondary connection-extending switch, and identifying means by which the secondary connection-extending switch identifies the said conductor through which a call is extended to the said primary connection-extending switches.

63. In an electromechanically controlled telephone exchange system, a source of current, groups of transitorily-engaged group selectors, groups of primary connection-extending switches, groups of secondary connection-extending switches, groups of subscribers' stations, trunks connected to all of the said groups of primary connection-extending switches, the trunks connected to a primary connection-extending switch of any primary switch group each leading to a different group of subscribers, an identifying wire peculiar to each transitorily-engaged group selector, wires in the primary and secondary connection-extending switches that coöperate with the said identifying wires, conductors connected to the said transitorily-engaged group selectors and to the said secondary connection-extending switches, subscribers' stations, means for transferring a call from a subscriber's station through a said conductor and through a transitorily-engaged group selector to a group of primary connection-extending switches, group distinguishing means in the primary connection extending switches for distinguishing the group of transitorily-engaged group selectors through which the said call is transferred, means for moving a plurality of a group of primary connection-extending switches simultaneously when a call is transferred to them, means for stopping a primary connection-extending switch when it reaches an idle trunk, means for moving a secondary connection-extending switch, and an identifying relay in the secondary connection-extending switch that is actuated by a current in the identifying wire that is peculiar to the transitorily-engaged group selector through which the call was extended, said identifying relay effecting the stoppage of the secondary connection-extending switch so as to interconnect only the said idle trunk and the said conductor that are engaged for the said one and the same call.

64. In an electromechanically controlled telephone system, groups of subscribers' lines, groups of transitorily-engaged group selectors corresponding to the said groups of subscribers, groups of trunks, groups of connection-extending switches with sets of fixed contacts, each fixed contact set of each group of connection-extending switches leading to a different trunk of the said groups of trunks, other sets of fixed contacts in the said connection-extending switches, the other sets of fixed contacts of one switch of a group of connection-extending switches being interconnected with the corresponding sets of fixed contacts of the other switches of the same group, wires leading from the interconnected sets of corresponding fixed contacts of each group of connection extending switches to the said groups of transitorily-engaged group selectors and means for connecting the subscribers' lines through the said group selectors to the connection-extending switches and for subsequently extending these lines through the trunks and connection-extending switches.

65. In an electromechanically controlled telephone system, groups of subscribers' lines, groups of trunks, groups of connection-extending switches with sets of fixed contacts, each said fixed contact set of each said group of connection-extending switches leading to a different trunk of the said groups of trunks, other fixed contacts in the said connection-extending switches, the said other fixed contacts of a connection-extending switch of each group being multiply connected with the corresponding fixed contacts of the other switches of the same group, a wire leading from each set of multiply connected contacts of a group of connection-extending switches to a different group of subscribers, a moving magnet in each connection-extending switch, a wire leading from each group of connection-extending switches to all of the said groups of subscribers, and means by which any subscribers may affect a said wire so as to operate a group of connecting-extending switches and establish a connection through a said trunk.

66. In an electromechanically controlled telephone system, groups of subscribers' lines, groups of transitorily engaged switches corresponding to the said groups of subscribers, groups of trunks, groups of connection-extending switches with sets of fixed talking circuit contacts, each set of fixed talking circuit contacts of each said group of connection - extending switches leading to a different trunk of the said groups of trunks, sets of fixed group-distinguishing contacts in the said connection-extending switches, the sets of group distinguishing contacts of one switch of a group of connection extending switches being interconnected with the corresponding sets of group distinguishing contacts of the other switches of the same group, group distinguishing wires leading from the interconnected sets of corresponding group distinguishing contacts of each group of connection - extending switches to the said groups of subscribers and means for transitorily bringing a subscriber's line into operative relation with a connection-extending switch through a transitorily engaged switch and for subsequently connecting the line to the connection-extending switch through a said trunk.

67. In an electromechanically controlled telephone system, groups of subscribers' lines, groups of transitorily-engaged switches corresponding to the said groups of subscribers, groups of trunks, groups of connection extending switches with sets of fixed talking circuit contacts, each set of fixed talking circuit contacts of each said group of connection-extending switches leading to a different trunk of the said groups of trunks, sets of identifying circuit contacts in the said connection-extending switches, a separate identifying wire leading from each transitorily-engaged switch to an identifying circuit contact in each switch of each group of connection extending switches and means for bringing a subscriber's line into transitory operative relation with a connection-extending switch through a transitorily engaged switch and for subsequently connecting the line to the connection-extending switch through a said trunk.

68. In an electromechanically controlled telephone system, groups of subscribers' lines, groups of transitorily-engaged selectors corresponding to the said groups of subscribers, groups of trunks, groups of connection extending switches with sets of fixed talking circuit contacts, each set of fixed talking circuit contacts of each said group of connection-extending switches, leading to a different trunk of the said groups of trunks, sets of identifying circuit contacts in the said connection-extending switches, a separate identifying wire leading from each transitorily-engaged selector to an identifying circuit contact in each switch of each group of connection extending switches and means for bringing a subscriber's line into transitory operative relation with a connection-extending switch through a transitorily-engaged selector and for subsequently connecting the line to the connection-extending switch through a said trunk.

69. In an electromechanically controlled telephone system, a source of current, transitorily engaged selectors, transitorily engaged selector connectors, primary connection extending switches, secondary connection extending switches, trunks connected to the said secondary connection - extending switches, conductors connected to the said transitorily-engaged switches and to the said secondary connection-extending switches, subscribers' stations, means for transferring a call from a subscriber's station through a said conductor and through a transitorily-engaged switch to the primary connection-extending switches, means for moving a plurality of primary connection-extending switches simultaneously when a call is transferred to them, means for stopping a primary connection-extending switch when it reaches an idle trunk, and means for moving a secondary connection-extending switch so as to effect a connection between the idle trunk and the conductor through which the call was extended.

70. In an electromechanically controlled telephone system, a source of current, transitorily engaged selectors, transitorily engaged selector connectors, primary connection extending switches, secondary connection extending switches, trunks connected to the said secondary connection extending switches, conductors connected to the said transitorily-engaged selector connectors and to the said secondary connection extending switches, subscribers' stations, means for transferring a call from a subscriber's station through a said conductor and through a transitorily engaged selector to the primary connection extending switches, means for moving a plurality of primary connection extending switches simultaneously when a call is transferred to them, means for stopping a primary connection-extending switch when it reaches an idle trunk, means for moving a secondary connection extending switch so as to effect a connection between the idle trunk and the conductor through which the call was extended, and means for immediately restoring all of the primary connection-extending switches except the one that has stopped on the said idle trunk to their normal position in readiness for the next call.

71. In an electromechanically-controlled telephone system, groups of subscribers' lines, signaling means, trunks, transitorily engaged first group selectors for selecting any desired group, transitorily engaged subscriber-line-selectors for selecting any desired line, group - selector connectors for transitorily connecting said first selectors to the said trunks, means for advancing signals from the subscribers' lines through the group selectors to any said trunk, subscriber-line-selector-connectors for transitorily connecting the subscriber-line-selectors to said trunks, talking connection switches for establishing talking connections between the said subscribers under the control of said selectors, and means for releasing selectors involved in the control of talking connection switches when these switches have completed a talking connection.

72. In an electromechanically controlled telephone system, subscribers' lines, selectors, primary connection-extending switches, secondary connection-extending switches, trunks, and means by which first a single selector, then a plurality of simultaneously actuated primary connection - extending switches, and subsequently a single secondary connection-extending switch are operated to establish a connection between subscribers' lines through a trunk.

73. In an electromechanically controlled telephone system, subscribers' lines, selectors, primary connection-extending switches, secondary connection-extending switches, trunks, means by which first a single selector, then a plurality of simultaneously-actuated primary connection-extending switches, and subsequently a single secondary connection-extending switch are operated to establish a connection between subscribers' lines through a trunk, means for then establishing a talking connection through only one of the said simultaneously-actuated primary connection - extending switches and means for releasing the said selector the moment the connection through the said trunk is established.

74. In an electromechanically controlled telephone system, subscribers' lines, selectors, primary connection-extending switches, secondary connection-extending switches, trunks, means by which first a single selector, then a plurality of simultaneously-actuated primary connection-extending switches, and subsequently a single secondary connection-extending switch are operated to establish a connection between subscribers' lines, and means for preventing confusion of connections when a plurality of connections are established at the same time.

75. In an electromechanically controlled telephone system, trunks, selectors, primary connection extending switches, secondary connection-extending switches, secondary trunks, and means by which first a single selector, then a plurality of simultaneously-actuated primary connection - extending switches, and subsequently a single secondary connection - extending switch are operated to establish a connection between a said trunk and a secondary trunk.

76. In an electromechanically-controlled telephone system, a plurality of talking circuits, selector connectors for hunting and seizing disengaged and unseized talking circuits, secondary finders coöperating with the said talking circuits, a separate conductor for each selector connector associated with each talking circuit, a connection from each said separate conductor to each said secondary finder, means for actuating the said connectors and finders, signaling means, signal-advancing wires, means by which each of a plurality of simultaneous signals proceeds from a certain different talking circuit through a different selector connector and a different signal-advancing wire to a different secondary finder, and means by which a circuit is closed through a said separate conductor and a said connection in a secondary finder only when this secondary finder reaches the certain talking circuit from which the signal that started it proceeded.

77. In an electromechanically-controlled telephone system, a plurality of talking circuits, selector connectors for hunting and seizing disengaged and unseized talking circuits, secondary finders coöperating with the said talking circuits, a separate conductor for each selector connector associated with each talking circuit, a connection from each said separate conductor to each said secondary finder, means for actuating the said connectors and finders, signaling means, signal-advancing wires, means by which each of a plurality of simultaneous signals proceeds from a certain different talking circuit through a different selector connector and a different signal-advancing wire to a different secondary finder, means by which a circuit is closed through a said conductor and a said connection in a secondary finder only when this secondary finder reaches the certain talking circuit from which the signal that started it proceeded, and means for disengaging a said selector connector when a secondary finder has reached the said certain talking circuit.

78. In an electromechanically-controlled telephone system, a plurality of talking circuits, selector connectors for hunting and seizing disengaged and unseized talking circuits, secondary finders coöperating with the said talking circuits, a separate identifying wire for each selector connector associated with each talking circuit, a connection from each said separate identifying wire to each said secondary finder, means for actuating the said connectors and finders, signaling means, signal-advancing wires, means by which each of a plurality of simultaneous signals proceeds from a certain different talking circuit through a different selector connector and a different signal-advancing wire to a different secondary finder, and means by which a circuit is closed through a said identifying wire and a said connection in a secondary finder only when this secondary finder connects to the certain talking circuit from which the signal that started it proceeded.

79. In an electromechanically-controlled telephone system, a plurality of talking circuits, selector connectors for hunting and seizing disengaged and unseized talking circuits, secondary finders coöperating with the said talking circuits, a separate identifying wire for each selector connector associated with each talking circuit, a connection from each said separate identifying wire to each said secondary finder, means for actuating the said connectors and finders, signaling means, signal-advancing wires, means by which each of a plurality of simultaneous signals proceeds from a certain different talking circuit through a different selector connector and a different signal-advancing wire to a different secondary finder, means by which a completely open circuit is completely closed through a said identifying wire and a said connection in a secondary finder only when this secondary finder connects to the certain talking circuit from which the signal that started it proceeded and means for disengaging a said primary selector connector when a secondary finder connects to the said certain talking circuit.

80. In a system for interconnecting lines, a plurality of conductors, a source of current, a plurality of means for seizing the said conductors, calling means for advancing simultaneous calls to a plurality of said conductors, means by which each conductor in a calling condition is seized by a different conductor-seizing means, connecting means for establishing connections with the said conductors, a set of contacts in each of the said connecting means for each of the said plurality of conductors, interconnecting means for connecting an idle conductor-seizing means with any idle connecting means, sets of wires each connected in multiple to said sets of contacts in the connecting means but each leading to the contacts of only one of the said conductor-seizing means, means for actuating the said connecting means when calls are advanced to the said conductors, wires leading from the said interconnecting means to the connecting means, and an electromagnet in each connecting means that is only energized through a wire from an interconnecting means and through a said wire leading to a conductor-seizing means when the connecting means connects to a said conductor that has been previously seized by a conductor-seizing means with which the connecting means is interconnected.

81. In a system for interconnecting lines, a plurality of conductors, a source of current, conductor-seizing means, calling means for advancing simultaneous calls to a plurality of said conductors, means by which each conductor in a calling condition is seized by a different conductor-seizing means, connecting means for establishing connections with the said conductors, a set of contacts in each of the said connecting means for each of the said plurality of conductors, selectors for connecting an idle conductor-seizing means with any idle connecting means, sets of wires each connected in multiple to said sets of contacts in the connecting means but each leading to the contacts of only one of the said conductor-seizing means, means for actuating the said connecting means when calls are advanced to the said conductors, wires leading from the said selectors to the connecting means, and an electromagnet in each connecting means that is only energized through a wire from a selector and through a said wire leading to a conductor-seizing means when the connecting means connects to a said conductor that has been previously seized by a conductor-seizing means with which the connecting means is interconnected.

82. In a system for interconnecting lines, a plurality of conductors, a source of current, selector-connectors, calling means for advancing simultaneous calls to a plurality of said conductors, means by which each conductor in a calling condition is seized by a different selector-connector, finders for establishing connections with the said conductors, a set of contacts in each of the said finders for each of the said plurality of conductors, group selectors and auxiliary means for connecting an idle selector-connector with any idle finder, sets of wires each connected in multiple to said sets of contacts in the finders but each leading to the contacts of only one of the said selector-connectors, means for actuating the said finders when calls are advanced to the said conductors, and an electromagnet in each finder that is only energized through a said wire leading to a selector-connector when the finder connects to a said conductor that has been previously seized by a selector-connector with which the finder is interconnected.

83. In a system for interconnecting lines, a plurality of conductors, a source of current, conductor-seizing means, calling means for advancing simultaneous calls to a plurality of said conductors, means by which each conductor in a calling condition is seized by a different conductor-seizing means, connecting means for establishing connections with the said conductors, a set of contacts in each of the said connecting means for each of the plurality of conductors, interconnecting means for connecting an idle conductor-seizing means with any idle connecting means, sets of wires each connected in multiple to said sets of contacts in the connecting means but each leading to the contacts of only one of the said conductor-seizing means, means for actuating the said connecting means when calls are advanced to the said conductors, wires leading from the said interconnecting means to the connecting means, an electromagnet in each connecting means that is only energized through a wire from an interconnecting means and through a said wire leading to a conductor-seizing means when the connecting means connects to a said conductor that has been previously seized by a conductor seizing means with which the connecting means is interconnected, and means for disconnecting a conductor-seizing means from a conductor when the conductor has been connected to by a connecting means.

84. In a system for interconnecting lines, a plurality of conductors, a source of current, conductor-seizing means, calling means for advancing simultaneous calls to a plurality of said conductors, means by which each conductor in a calling condition is seized by a different conductor-seizing means, connecting means for establishing connections with the said conductors, a set of contacts in each of the said connecting means for each of the said plurality of conductors, group selectors and auxiliary means for connecting an idle conductor-seizing means with any idle connecting means, sets of wires each connected in multiple to said sets of contacts in the connecting means but each leading to the contacts of only one of the said conductor-seizing means, means for actuating the said connecting means when calls are advanced to the said conductors, an electromagnet in each connecting means that is only energized through a said auxiliary means and through a said wire leading to a conductor-seizing means when the connecting means connects to a said conductor that has been previously seized by a conductor-seizing means with which the connecting means is interconnected, means for disconnecting a conductor-seizing means from a conductor when the conductor has been connected to by a connecting means, and means by which a group selector is connected to another conductor, when the connecting means to which it has been connected, connects to the first mentioned conductor.

85. In a system for interconnecting lines, a plurality of wanted lines, a source of current, wanted-line selectors, conductors, calling means for advancing simultaneous calls from said conductors to a plurality of wanted lines, connecting switches for establishing connections between the said wanted lines and the said conductors, a set of contacts in each of the said connecting switches corresponding to the said plurality of conductors, interconnecting switches for connecting any idle wanted-line selector with any said conductor, sets of contacts in the interconnecting switches, sets of wires each connected in multiple to said sets of contacts in the connecting switches but each leading to the contacts of only one of the said interconnecting switches, means for actuating the said connecting switches when calls are advanced to the said wanted lines, wires leading from the said wanted-line selectors to the said connecting switches, and an electromagnet in each connecting switch that is only energized through a wire from an interconnecting switch and through a said wire leading from a wanted-line selector when the connecting switch connects to a conductor from which the call that actuated it proceeded.

86. In a system for interconnecting lines, a plurality of conductors, a source of current, selector connectors, calling means for advancing simultaneous calls to a plurality of said conductors, means by which each conductor in a calling condition is seized by a different selector connector, secondary finders for establishing connections with the said conductors, a set of contacts in each of the said secondary finders for each of the said plurality of conductors, primary finders for connecting an idle selector connector with any idle secondary finder, sets of identifying wires each connected in multiple to said sets of contacts in the secondary finders but each leading to the contacts of only one of the said selector connectors, means for actuating the said secondary finders when calls are advanced to the said conductors, identifying wires leading from the said primary finders to the secondary finders, an electromagnet in each secondary finder that is only energized through an identifying wire from a primary finder and through a said identifying wire leading to a selector connector when the secondary finder connects to a said conductor that has been previously seized by a selector connector with which the secondary finder is interconnected.

87. In a system for interconnecting lines, a plurality of trunks, a source of current, trunk-seizing means, calling means for advancing simultaneous calls to a plurality of said trunks, means by which each conductor in a calling condition is seized by a different trunk-seizing means, connecting means for establishing connections with the said trunks, a set of contacts in each of the said connecting means for each of the said plurality of trunks, selectors for connecting an idle trunk-seizing means with any idle connecting means, sets of identifying wires each connected in multiple to said sets of contacts in the connecting means but each leading to the contacts of only one of the said trunk-seizing means, means for actuating the said connecting means when calls are advanced to the said trunks, identifying wires leading from the said selectors to the connecting means, and an electromagnet in each connecting means that is only energized through an identifying wire from a selector and through a said identifying wire leading to a trunk-seizing means when the connecting means connects to a said trunk that has been previously seized by a trunk seizing means with which the connecting means is interconnected.

88. In a system for interconnecting lines, a plurality of conductors, a source of current, conductor-seizing means, calling means for advancing simultaneous calls to a plurality of said conductors, means by which each conductor in a calling condition is seized by a different conductor-seizing means, connecting means for establishing connections with the said conductors, a set of contacts in each of the said connecting means for each of the said plurality of conductors, group selectors for connecting an idle conductor-seizing means with any idle connecting means, sets of identifying wires each connected in multiple to said sets of contacts in the connecting means but each leading to the contacts of only one of the said conductor-seizing means, means for actuating the said connecting means when calls are advanced to the said conductors, identifying wires leading from the said group selectors to the connecting means, and an electromagnet in each connecting means that is only energized through a said identifying wire leading to a conductor-seizing means when the connecting means connects to a said conductor that has been previously seized by a conductor seizing means with which the connecting means is interconnected.

89. In a system for interconnecting lines by electromechanically controlled devices, a plurality of conductors, means for establishing a calling condition in a plurality of said conductors, multi-point finders for connecting to said conductors, a plurality of selector-connectors for advancing calls to the said multi-point finders, and discriminating means in the said finders, by which a finder discriminates between a number of conductors in the same condition and identifies and connects to the particular conductor from which it received a call, the said discriminating means comprising a separate wire for each of the said selector-connectors leading from each point of every multi-point finder to a single selector connector and an electromagnet in each multipoint finder whose circuit is closed through a said separate wire.

90. In a system for interconnecting lines by electromechanically controlled devices, a plurality of conductors, a plurality of finders for connecting to the said conductors, calling means for establishing calling conditions in the said conductors, selector connectors for advancing calls to the said finders, a source of test current, and test relays in the said finders for testing the said conductors, each test relay having separate test current paths for each selector connector and one of the said test current paths being energized when a said finder connects to a said conductor.

91. In a system for interconnecting lines by electromechanically controlled devices, a plurality of conductors, a plurality of finders for connecting to the said conductors, calling means for establishing calling conditions in the said conductors, selectors, selector connectors for advancing calls through the said selectors to the said finders, a source of test current, and test relays in the said finders for testing the said conductors, each test relay having separate test current paths for each selector connector and one of the said test current paths being energized when a said finder connects to said conductor.

92. In a system for interconnecting lines by electromechanically controlled devices, a plurality of conductors, a plurality of finders for connecting to the said conductors, calling means for establishing calling conditions in the said conductors, means for advancing calls to the said finders, a source of test current, test relays in the said finders for testing the said conductors, each test relay having separate test current paths for each call-advancing-means and one of the said test current paths being energized when a said finder connects to a said conductor, and means for disengaging a call-advancing means when the finder with which it coöperates has connected to a said conductor 93. In a system for interconnecting lines by electromechanically controlled devices, a plurality of conductors, a plurality of finders for connecting to the said conductors, calling means for establishing calling conditions in the said conductors, selectors, selector connectors for advancing calls through the said selectors to the said finders, a source of test current, and test relays in the said finders for testing the said conductors, each test relay having separate test current paths for each selector connector, and one of the said test current paths being energized when a said finder connects to a said conductor, and means for disengaging a selector connector and selector when the finder, with which they have coöperated, has connected to a said conductor.

94. In a system for interconnecting lines by electromechanically controlled devices, a plurality of conductors, a plurality of finders for connecting to the said conductors, calling means for establishing calling conditions in the said conductors, group selectors for advancing calls to the said finders, a source of test current, test relays in the said finders for testing the said conductors, each test relay having separate test current paths for each group selector, and one of the said test current paths being energized when a said finder connects to a said conductor, and means for disengaging a group selector when the finder with which it has coöperated has connected to a said conductor.

95. In a system for interconnecting lines by electromechanically controlled devices, a plurality of conductors, a plurality of finders for connecting to the said conductors, calling means for establishing calling conditions in the said conductors, wanted-line selectors for advancing calls to the said finders, a source of test current, test relays in the said finders for testing the said conductors, each test relay having separate test current paths for each wanted-line selector, and one of the said test current paths being energized when a said connecting switch connects to a said conductor, and means for disengaging a wanted-line selector when the finder with which it has coöperated has connected to a said conductor.

96. In an electromechanically controlled system for interconnecting lines, groups of lines, a group of switches allotted to each group of lines, group selecting means for selecting any said group of switches, means for advancing simultaneous calls from said groups of lines through said group selecting means to said groups of switches, link circuits, and non-numerical distinguishing means by which a said switch distinguishes between the various groups from which calls proceed and by which said switches simultaneously effect connections through said link circuits only with lines from which they have received a call.

97. In an electromechanically controlled system for interconnecting lines, groups of lines, a group of switches allotted to each group of lines, group selecting means for selecting any said group of switches, means for advancing simultaneous calls from said groups of lines through said group selecting means to said groups of switches, link circuits, a separate set of group distinguishing wires and identifying wires leading from each group selecting means to each group of said switches, and means coöperating with the said wires by which a said switch distinguishes between the various groups from which calls proceed and by which said switches simultaneously effect connections through said link circuits only with lines from which they have received a call.

98. In an electromechanically controlled system for interconnecting lines, a source of current, a first group of talking circuit links, a second group of talking circuit links, selector connectors, finders for connecting circuits of the first group to circuits of the second group, means for simultaneously advancing a plurality of calls from the first group of talking circuit links through the selector connectors to the second group of talking circuit links, test relays in the said finders and contacts in the finders that coöperate with the test relay windings, a separate wire leading from each selector connector to one terminal of each test relay winding, corresponding second wires associated with each selector connector and leading separately to each of the said contacts, and means by which a test relay and its finder effects a connection between a talking circuit of the first group and a talking circuit of the second group by a current flowing through said separate wires leading from a selector connector to both ends of the energizing test relay winding.

99. In an electromechanically controlled system for interconnecting lines, sets of conductors, finders for interconnecting said conductors, selector connectors coöperating with the said finders, call-advancing means for advancing a call from a conductor of one set through a selector connector to a said finder, test relays in the said finders, and a plurality of separate current leads to the said test relays, the lead used for actuating a said test relay and its finder, so as to effect a connection with a conductor from which it receives a call, differing according to the selector connector that coöperates with the test relay.

100. In an electromechanically controlled system for interconnecting lines, sets of conductors, finders for interconnecting said conductors, selector connectors coöperating with the said finders, call-advancing means for advancing a call from a conductor of one set through a selector connector to a said finder, test relays in the said finders, and a plurality of separate current leads to both terminals of the windings of the test relays, the leads used for actuating a said test relay and its finder, so as to effect a connection with a conductor from which it has received a call, differing according to the selector connector that coöperates with the said test relay.

101. In an electromechanically controlled system for interconnecting telephone lines, a group of subscribers' lines, calling means, talking stations, group selectors allotted to said group, finders allotted to said group, means for transferring each of a plurality of simultaneous calls from the subscribers' lines through a group selector to a said finder, non-numerical means by which each finder connects only to the subscriber's line from which it received a call, and means by which a connection is established through a said finder between the calling subscriber to which the finder connects and a wanted subscriber.

102. In an electromechanically controlled system for interconnecting telephone lines, a group of subscribers' lines, calling means, talking stations, group selectors allotted to said group and approximately equal in number to the greatest number of simultaneously-occurring calls; finders allotted to said group and approximately equal in number to the greatest number of simultaneously-desired talking connections, means for transferring each of a plurality of simultaneous calls from the subscribers' lines through a group selector to a said finder, non-numerical means by which each said finder connects only to the subscriber's line from which it received a call, and means by which a connection is established through a said finder between the calling subscriber to which the finder connects and a wanted subscriber.

103. In an electromechanically controlled system for interconnecting telephone lines, a group of subscribers' lines, calling means, talking stations, group selectors allotted to the said group, finders allotted to said group, means for transferring each of a plurality of simultaneous calls from the subscribers' lines through a group selector to a said finder, non-numerical means by which the said finder connects only to the subscriber's line from which it received a call, the said non-numerical means comprising wires each of which is individual to a certain group selector but common to all of the finders, and means by which a connection is established through a said finder between the calling subscriber to which the finder connects and a wanted subscriber.

104. In an electromechanically controlled system for interconnecting telephone lines, a group of subscribers' lines, calling means, talking stations, group selectors allotted to the said group, and approximately equal in number to the greatest number of simultaneously-occurring calls, finders allotted to said group, and approximately equal in number to the greatest number of simultaneously-desired talking connections, means for transferring each of a plurality of simultaneous calls from the subscribers' lines through a group selector to a said finder, non-numerical means by which each finder connects only to the subscriber's line from which it received a call, the said non-numerical means comprising wires each of which is individual to a certain group selector but common to all of the said finders, and means by which a connection is established through a said finder between the calling subscriber to which the finder connects and a wanted subscriber.

105. In an electromechanically controlled system for interconnecting telephone lines, a group of subscribers' lines, calling means, talking stations, group selectors allotted to the said group, primary finders and secondary finders allotted to said group, means for transferring each of a plurality of simultaneous calls from the subscribers' lines through a group selector to a said primary finder, non-numerical means by which a primary finder and a secondary finder connect only to the particular subscriber's line from which the said primary finder received a call, and means by which a connection is established through the said primary and secondary finders between the calling subscriber to which these finders connect and a wanted subscriber.

106. In an electromechanically controlled system for interconnecting telephone lines, a group of subscribers' lines, calling means, talking stations, group selectors allotted to the said group, and approximately equal in number to the greatest number of simultaneously-occurring calls; primary finders and secondary finders allotted to said group, both the primary and secondary finders being approximately equal in number to the greatest number of simultaneously-desired talking connections, means for transferring each of a plurality of simultaneous calls from the subscribers' lines through a group selector to a said primary finder, non-numerical means by which a primary finder and a secondary finder connect only to the particular subscriber's line from which the said primary finder received a call, and means by which a connection is established through the said primary and secondary finders between the calling subscriber to which these finders connect and a wanted subscriber.

107. In an electromechanically controlled system for interconnecting telephone lines, a group of subscribers' lines, calling means, talking stations, group selectors allotted to the said group, primary and secondary finders allotted to the said group, means for transferring each of a plurality of simultaneous calls from the subscribers' lines through a group selector to a said primary finder, non-numerical means by which a primary finder and a secondary finder connect only to the particular subscriber's line from which the primary finder received a call, the said non-numerical means comprising wires each of which is individual to a certain group selector but common to all of the primary finders, and means by which a connection is established through the said primary and secondary finders between the calling subscribers to which these finders connect and a wanted subscriber.

108. In an electromechanically controlled system for interconnecting telephone lines, a group of subscribers' lines, calling means, talking stations, group selectors allotted to the said group and approximately equal in number to the greatest number of simultaneously-occurring calls, non-numerical primary and secondary finders allotted to the said group both the primary and secondary finders being approximately equal in number to the greatest number of simultaneously-desired talking connections, means for transferring each of a plurality of simultaneous calls from the subscribers' lines through a group selector to a said primary finder, non-numerical means by which a primary finder and a secondary finder connect only to the particular subscriber's line from which the primary finder received a call, the said non-numerical means comprising wires each of which is individual to a certain group selector but common to all of the primary finders, and means by which a connection is established through the said primary and secondary finders between the calling subscriber to which these finders connect and a wanted subscriber.

109. In an electromechanically controlled system for interconnecting telephone lines, groups of subscribers' lines, calling means, a set of first group selectors allotted to each group, a set of first primary finders allotted to each group, a set of first secondary finders allotted to each group, a set of second group selectors allotted to each group, a set of second primary finders allotted to each group, a set of second secondary finders allotted to each group, means for transferring each of a plurality of simultaneous calls from a group of subscribers' lines through a first group selector to a said first primary finder, means by which a said first primary finder connects to an idle first secondary finder, non-numerical means by which the first secondary finder connects only to the particular subscriber's line from which the first primary finder received a call, means for advancing each of a plurality of simultaneous calls through a first secondary finder, a first primary finder and a second group selector to a second primary finder, hunting and identifying means by which a said second primary finder connects to a said second secondary finder and the second secondary finder connects only to the particular line from which the second primary finder received a call, and means by which a connection is established through the said first and second primary and secondary finders between the calling line and a wanted subscriber.

110. In an electromechanically controlled system for interconnecting telephone lines, groups of subscribers' lines, calling means, a set of first group selectors allotted to each group, a set of first primary finders allotted to each group, a set of first secondary finders allotted to each group, a set of second group selectors allotted to each group, a set of second primary finders allotted to each group, a set of second secondary finders allotted to each group, means for transferring each of a plurality of simultaneous calls from a group of subscribers' lines through a first group selector to a said first primary finder, means by which the said first primary finder connects to an idle first secondary finder, non-numerical means by which the first secondary finder connects only to the particular subscriber's line from which the first primary finder received a call, the said non-numerical means comprising wires each of which is individual to a first group selector and common to the first primary finder allotted to the same group, means for advancing each of a plurality of simultaneous calls through a first secondary finder, a first primary finder and a second group selector to a second primary finder, hunting and identifying means by which a said second primary finder connects to a said second secondary finder and the second secondary finder connects only to the particular line from which the second primary finder received a call, and means by which a connection is established through the said first and second primary and secondary finders between the calling line and a wanted subscriber.

111. In an electromechanically controlled system for interconnecting telephone lines, groups of subscribers' lines, calling means, a set of first group selectors allotted to each group and equal in number to the greatest number of calls occurring simultaneously in the group; a set of first primary finders allotted to each group, a set of first secondary finders allotted to each group and equal in number to the greatest number of connections required simultaneously in the group; a set of second group selectors allotted to each group and equal in number to the greatest number of calls occurring simultaneously in the group; a set of non-numerical second primary finders allotted to each group, a set of second secondary finders allotted to each group, the number of second primary and secondary finders provided in a group corresponding to the greatest number of simultaneously-required connections in the group, means for transferring each of a plurality of simultaneous calls from a group of subscribers' lines through a first group selector to a said first primary finder, means by which a said first primary finder connects to an idle first secondary finder, non-numerical means by which the first secondary finder connects only to the particular subscriber's line from which the first primary finder received a call, the said non-numerical means comprising wires each of which is individual to a first group selector and common to the first primary finders allotted to the same group, means for advancing each of a plurality of simultaneous calls through a first secondary finder, a first primary finder and a second group selector to a second primary finder, hunting and identifying means by which a said second primary finder connects to a said second secondary finder and the second secondary finder connects only to the particular line from which the second primary finder received a call, and means by which a connection is established through the said first and second primary and secondary finders between the calling line and a wanted subscriber.

112. In an electromechanically controlled system for interconnecting telephone lines, groups of subscribers' lines, calling means, a set of first group selectors allotted to each group and equal in number to the greatest number of calls occurring simultaneously in the group, a set of first primary finders allotted to each group, a set of first secondary finders allotted to each group, the number of first primary finders and the number of first secondary finders provided in a group corresponding to the greatest number of simultaneously-required connections in the group, a set of second group selectors allotted to each group and equal in number to the greatest number of simultaneously-occurring calls in the group, a set of second primary finders and a set of second secondary finders allotted to each group, each of these sets comprising as many switches as are required for the greatest number of connections required simultaneously in the group, means for transferring each of a plurality of simultaneous calls from a group of subscribers' lines through a first group selector to a said first primary finder, means by which a said first primary finder connects to an idle first secondary finder, non-numerical means by which the first secondary finder connects only to the particular subscriber's line from which the first primary finder received a call, the said non-numerical means comprising wires each of which is individual to a first group selector and common to the first primary finders allotted to the same group, means for advancing each of a plurality of simultaneous calls through a first secondary finder, a first primary finder and a second group selector to a second primary finder, hunting and identifying means by which a said second primary finder connects to a said second secondary finder and the second secondary connects only to the particular line from which the second primary finder received a call, and means by which a connection is established through the said first and second primary and secondary finders between the calling line and a wanted subscriber.

In witness whereof I have signed this specification in the presence of two witnesses.

FRITZ ALDENDORFF.

Witnesses:
 HENRY HASPER,
 WOLDEMAR HAUPT.

Copies of this patent may be obtained for five cents each, by addressing the "Commissioner of Patents, Washington, D. C."